US008649824B2

(12) United States Patent
Choi

(10) Patent No.: US 8,649,824 B2
(45) Date of Patent: *Feb. 11, 2014

(54) TERMINAL AND METHOD OF CONTROLLING THE SAME

(75) Inventor: Kyung Dong Choi, Bucheon-si (KR)

(73) Assignee: LG Electronics Inc., Seoul (KR)

( * ) Notice: Subject to any disclaimer, the term of this patent is extended or adjusted under 35 U.S.C. 154(b) by 823 days.

This patent is subject to a terminal disclaimer.

(21) Appl. No.: 12/464,469

(22) Filed: May 12, 2009

(65) Prior Publication Data

US 2009/0298537 A1     Dec. 3, 2009

(30) Foreign Application Priority Data

May 29, 2008   (KR) .................. 10-2008-0050460

(51) Int. Cl.
*H04M 1/00*   (2006.01)
*G09G 3/18*   (2006.01)
*G09G 3/14*   (2006.01)
*G09G 3/34*   (2006.01)

(52) U.S. Cl.
USPC ............... 455/566; 345/38; 345/39; 345/108; 345/111

(58) Field of Classification Search
USPC ........................................ 455/566
See application file for complete search history.

(56) References Cited

U.S. PATENT DOCUMENTS

| | | | |
|---|---|---|---|
| 5,160,920 A | 11/1992 | Harris | |
| 5,469,185 A | 11/1995 | Lebby et al. | |
| 5,798,744 A | 8/1998 | Tanaka et al. | |
| 5,801,758 A | 9/1998 | Heirich | |
| 5,896,575 A | 4/1999 | Higginbotham et al. | |
| 6,132,048 A | 10/2000 | Gao et al. | |
| 6,327,482 B1 | 12/2001 | Miyashita | |
| 6,466,202 B1 | 10/2002 | Suso et al. | |
| 6,662,244 B1 | 12/2003 | Takahashi | |
| 6,753,842 B1 | 6/2004 | Williams et al. | |
| 6,998,772 B2 | 2/2006 | Terumoto | |
| 7,205,959 B2 | 4/2007 | Henriksson | |
| 7,420,585 B2 | 9/2008 | Fredlund et al. | |
| 7,460,108 B2 | 12/2008 | Tamura | |
| 7,504,770 B2 | 3/2009 | Choong | |
| 7,532,173 B2 | 5/2009 | Yamazaki et al. | |
| 7,573,522 B2 * | 8/2009 | Kim ...................... | 348/333.01 |
| 7,724,208 B1 | 5/2010 | Engel et al. | |
| 7,738,912 B1 | 6/2010 | Hawkins et al. | |
| 7,876,288 B1 | 1/2011 | Huang | |
| 8,022,977 B2 | 9/2011 | Kanade et al. | |
| 2002/0094846 A1 | 7/2002 | Kishimoto et al. | |

(Continued)

FOREIGN PATENT DOCUMENTS

| | | |
|---|---|---|
| CN | 1295316 A | 5/2001 |
| CN | 1517972 A | 8/2004 |

(Continued)

*Primary Examiner* — Huy C Ho
(74) *Attorney, Agent, or Firm* — Birch, Stewart, Kolasch & Birch, LLP

(57) ABSTRACT

A terminal and method of controlling the same are disclosed, by which user's convenience for photography using a terminal can be further enhanced. The terminal includes a camera, a display, a user input having a camera shutter key, and a controller for controlling at least one of more menu icons displayed in a standby mode to be displayed by being overlapped with a camera preview image. A see-through image seen through a transparent display can become a camera preview image.

21 Claims, 71 Drawing Sheets

(56) References Cited

U.S. PATENT DOCUMENTS

| | | |
|---|---|---|
| 2004/0017524 A1 | 1/2004 | Li |
| 2004/0100510 A1 | 5/2004 | Milic-Frayling et al. |
| 2004/0189630 A1 | 9/2004 | Huh et al. |
| 2004/0214612 A1 | 10/2004 | Park et al. |
| 2004/0240056 A1 | 12/2004 | Tomisawa et al. |
| 2004/0257473 A1 | 12/2004 | Miyagawa |
| 2005/0001796 A1 | 1/2005 | Liu |
| 2005/0012842 A1 | 1/2005 | Miyagawa et al. |
| 2005/0024339 A1 | 2/2005 | Yamazaki et al. |
| 2005/0030518 A1 | 2/2005 | Nishi et al. |
| 2005/0037815 A1 | 2/2005 | Besharat et al. |
| 2005/0078227 A1 | 4/2005 | Kobayashi et al. |
| 2005/0083642 A1 | 4/2005 | Senpuku et al. |
| 2005/0117096 A1 | 6/2005 | Voloschenko et al. |
| 2005/0183040 A1 | 8/2005 | Kondo et al. |
| 2005/0251760 A1 | 11/2005 | Sato et al. |
| 2005/0264984 A1 | 12/2005 | Lee |
| 2006/0044286 A1 | 3/2006 | Kohlhaas et al. |
| 2006/0044399 A1 | 3/2006 | Fredlund et al. |
| 2006/0079302 A1* | 4/2006 | Kota et al. ............... 455/575.3 |
| 2006/0280363 A1 | 12/2006 | Umeda |
| 2007/0002130 A1 | 1/2007 | Hartkop |
| 2007/0013871 A1 | 1/2007 | Marshall et al. |
| 2007/0075915 A1 | 4/2007 | Cheon et al. |
| 2007/0078598 A1 | 4/2007 | Watanabe et al. |
| 2007/0188439 A1 | 8/2007 | Kimura et al. |
| 2007/0188450 A1 | 8/2007 | Hernandez et al. |
| 2007/0287506 A1* | 12/2007 | Kim et al. ................ 455/566 |
| 2008/0066109 A1 | 3/2008 | Dunning et al. |
| 2008/0106591 A1 | 5/2008 | Border et al. |
| 2008/0129719 A1 | 6/2008 | Jonsson et al. |
| 2008/0204438 A1 | 8/2008 | Song et al. |
| 2008/0220821 A1* | 9/2008 | Okuzako et al. ............... 455/566 |
| 2009/0009628 A1 | 1/2009 | Janicek |
| 2009/0091513 A1 | 4/2009 | Kuhn |
| 2009/0231244 A1 | 9/2009 | Lee |
| 2009/0298546 A1 | 12/2009 | Kim et al. |
| 2010/0039350 A1 | 2/2010 | Wakefield et al. |
| 2010/0039372 A1 | 2/2010 | Futter |
| 2010/0060587 A1 | 3/2010 | Freund |
| 2010/0222110 A1 | 9/2010 | Kim et al. |
| 2011/0171942 A1 | 7/2011 | Kokubo |
| 2013/0044097 A1 | 2/2013 | Kim et al. |

FOREIGN PATENT DOCUMENTS

| | | |
|---|---|---|
| CN | 1551596 A | 12/2004 |
| CN | 1574904 A | 2/2005 |
| CN | 1610874 A | 4/2005 |
| CN | 1949530 A | 4/2007 |
| CN | 101021766 A | 8/2007 |
| EP | 0967511 A1 | 12/1999 |
| EP | 1 100 067 A2 | 5/2001 |
| EP | 1298909 A1 | 4/2003 |
| EP | 1510994 A1 | 3/2005 |
| EP | 1770473 A2 | 4/2007 |
| EP | 1804113 A1 | 7/2007 |
| EP | 1843563 A1 | 10/2007 |
| JP | 61021561 A | 1/1986 |
| KR | 10-0630162 B1 | 12/2005 |
| WO | WO-98/38822 A1 | 9/1998 |
| WO | WO 2007/047685 A2 | 4/2007 |
| WO | WO 2007/138543 A2 | 12/2007 |

* cited by examiner

FIG. 5
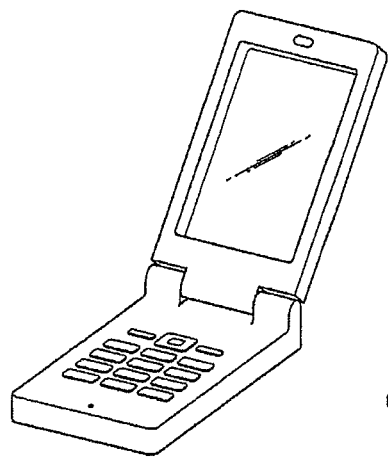
(a)
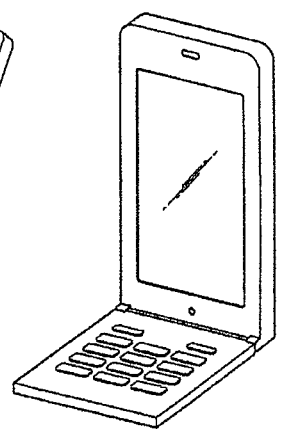
(b)
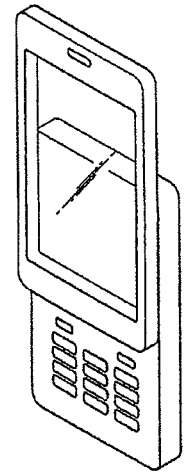
(c)
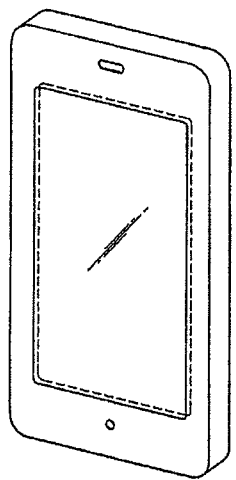
(d)
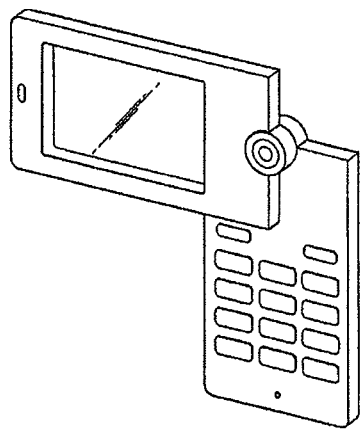
(e)
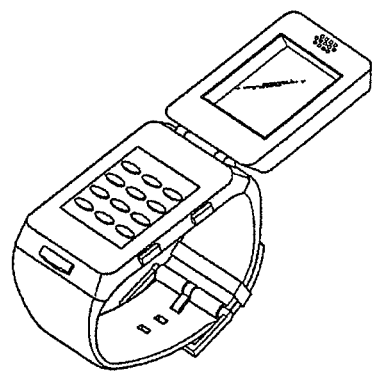
(f)

FIG. 6
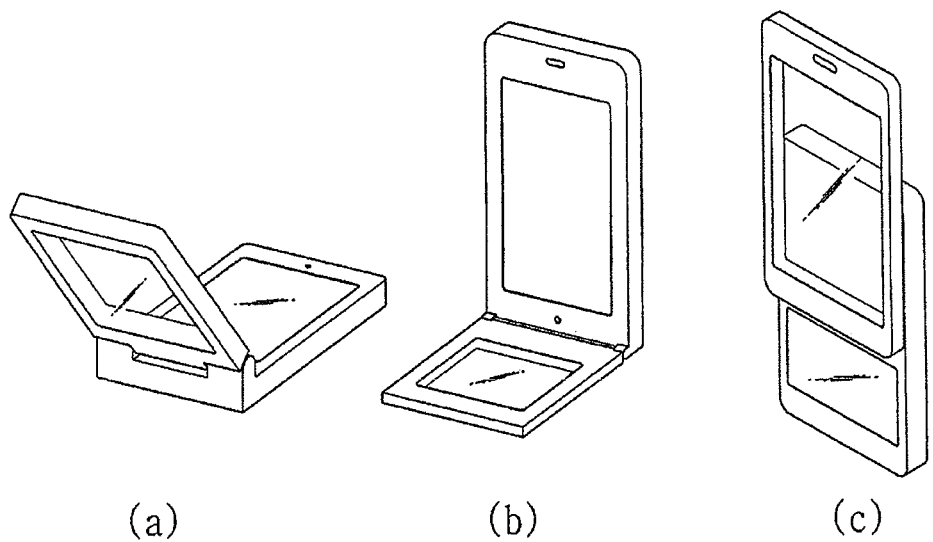
(a)　　　　　(b)　　　　　(c)
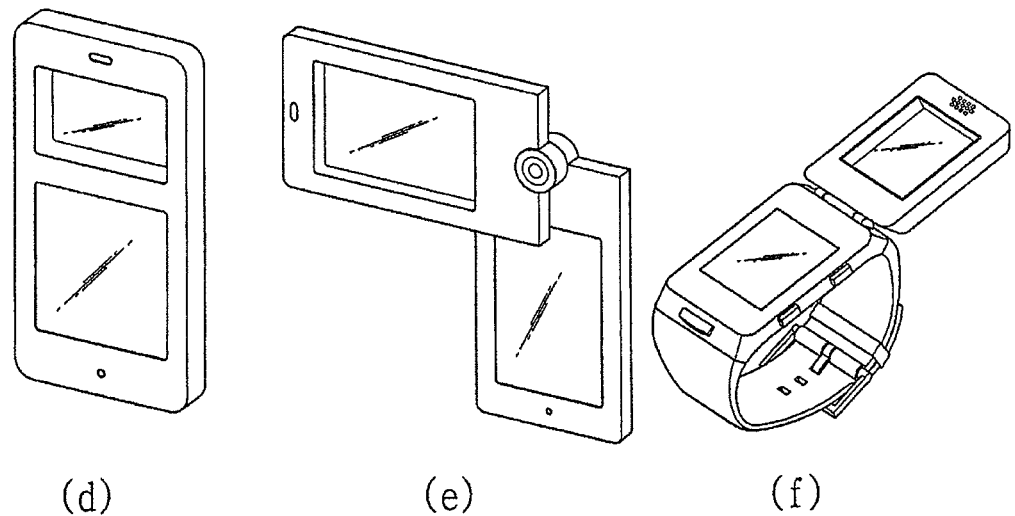
(d)　　　　　(e)　　　　　(f)

(a)  (b)

(a)  (b)

FIG. 9
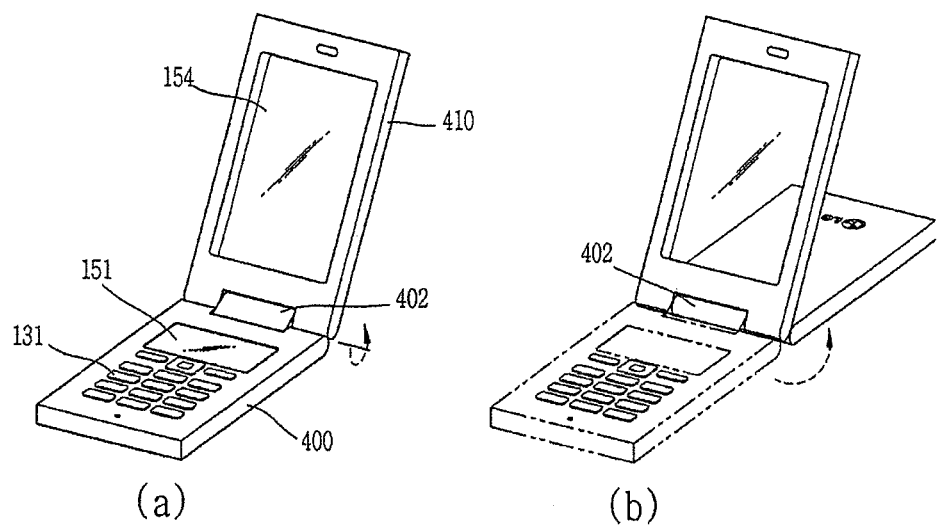
(a)   (b)
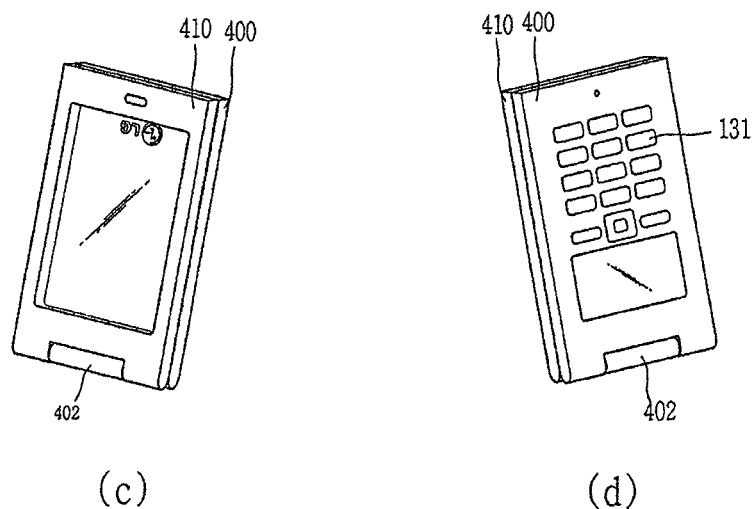
(c)   (d)

FIG. 10
(a) 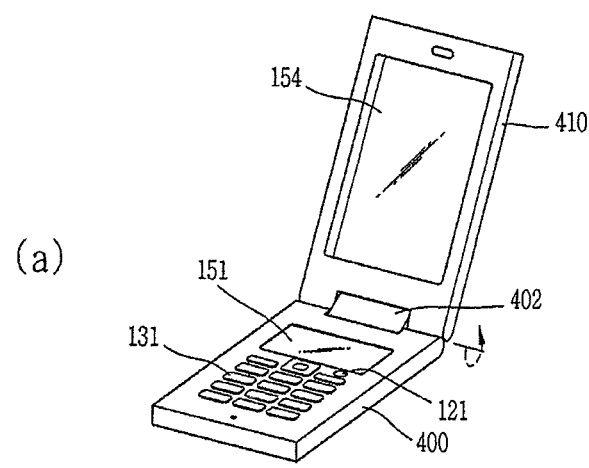
(b) 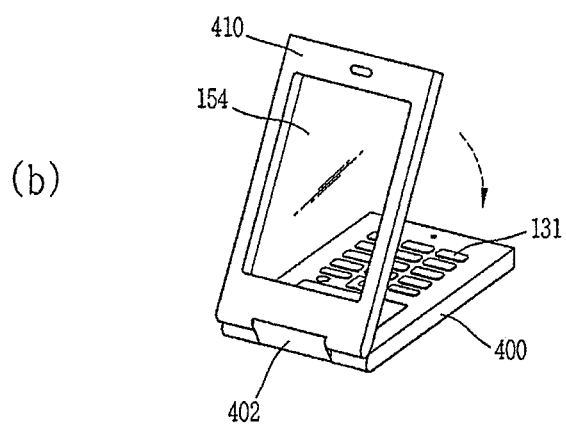
(c) 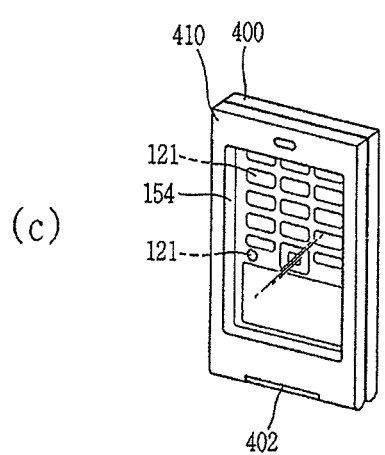

FIG. 12A
(a) 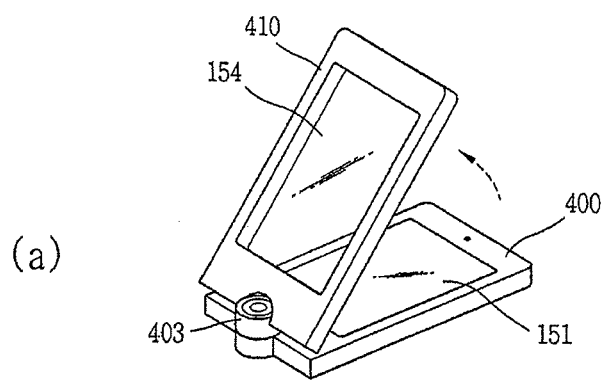
(b) 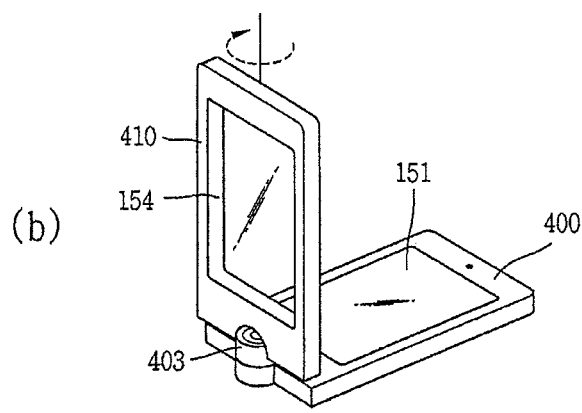
(c) 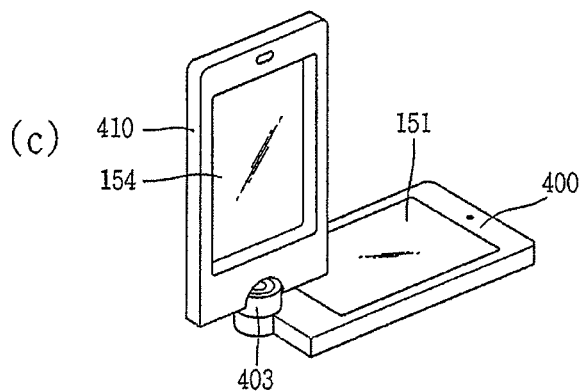

FIG. 15
(a) 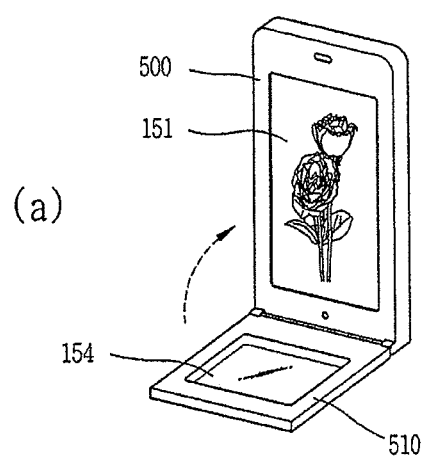
(b) 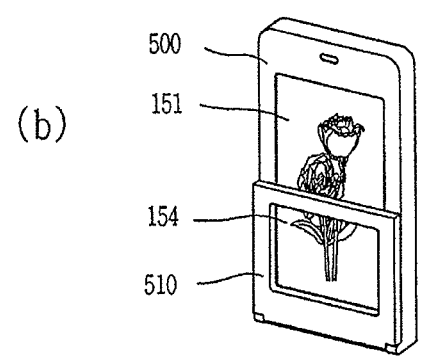

(a)  (b)

FIG. 20
(a) 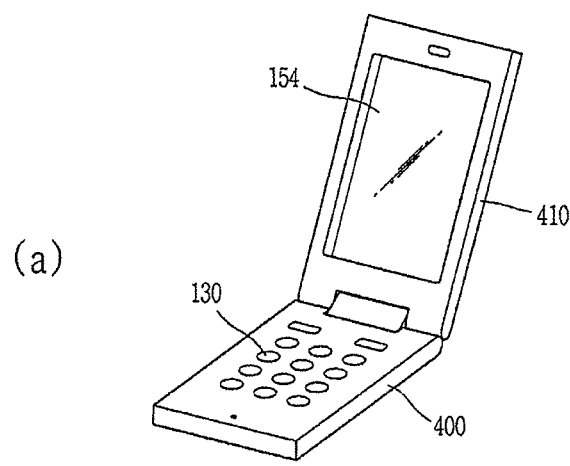
(b) 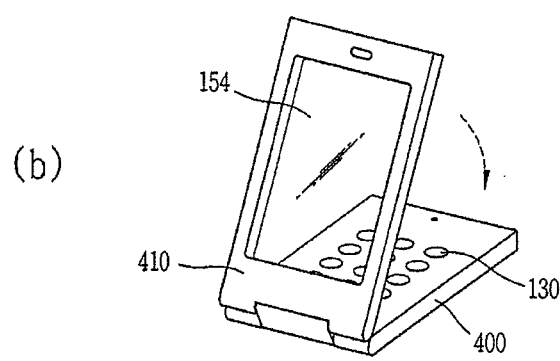
(c) 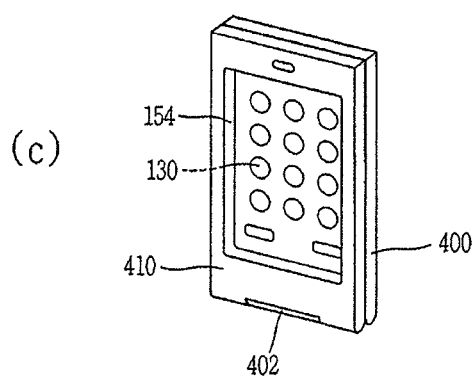

FIG. 21
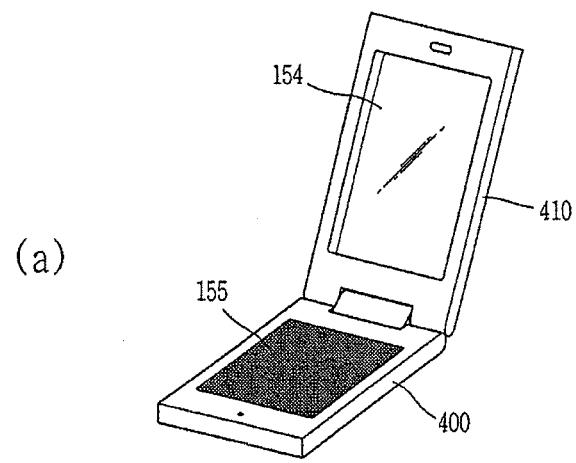
(a)
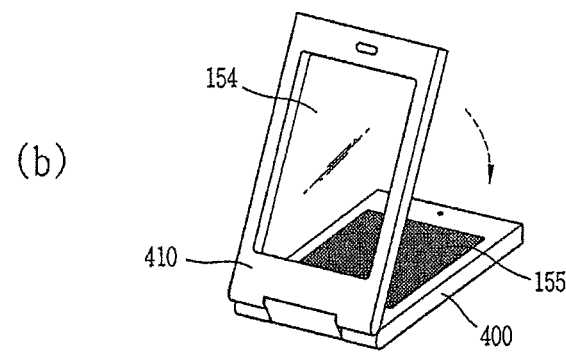
(b)
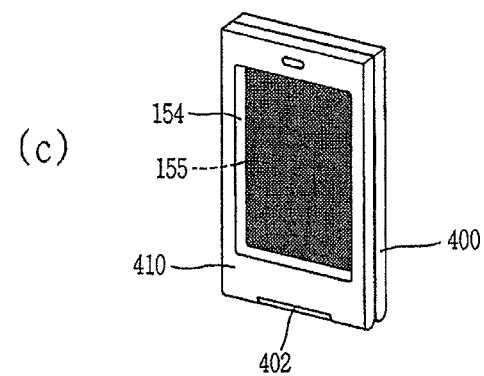
(c)

FIG. 22
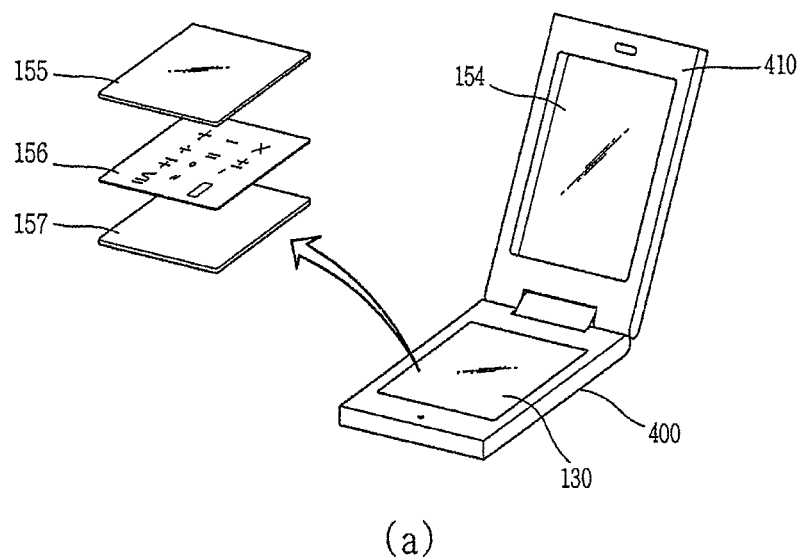
(a)
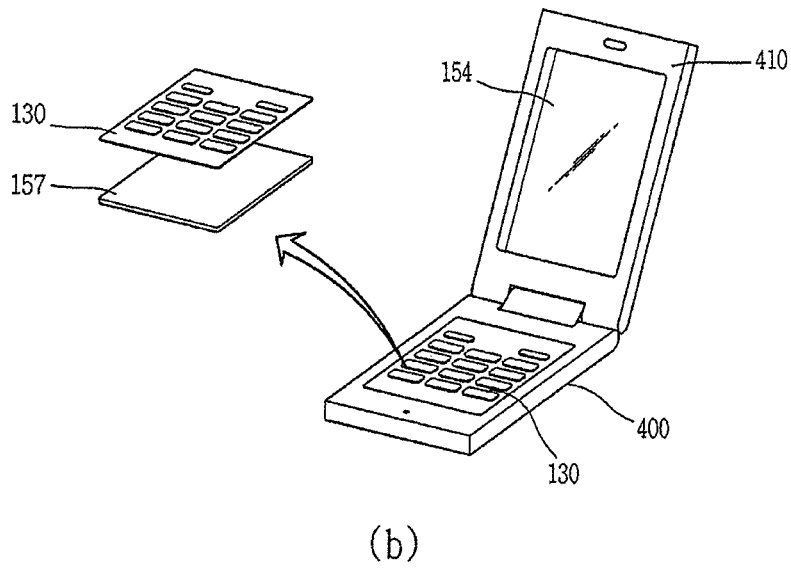
(b)

FIG. 24
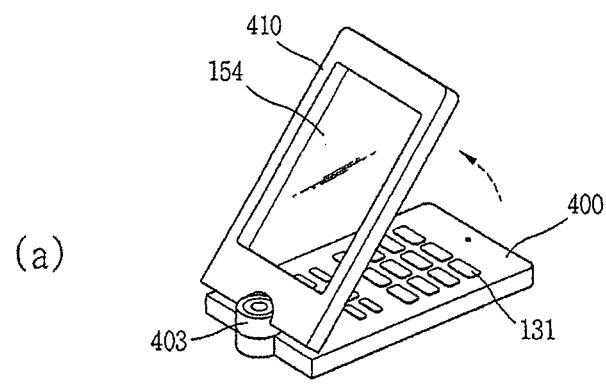
(a)
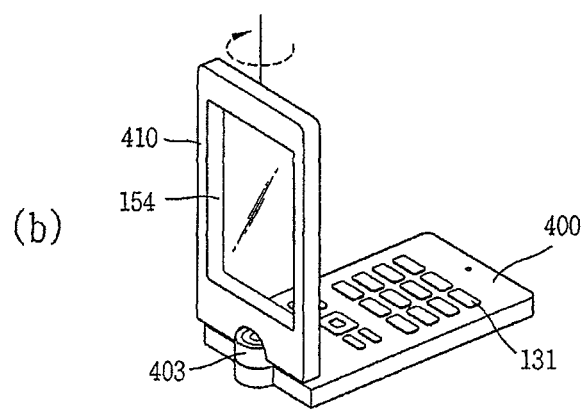
(b)
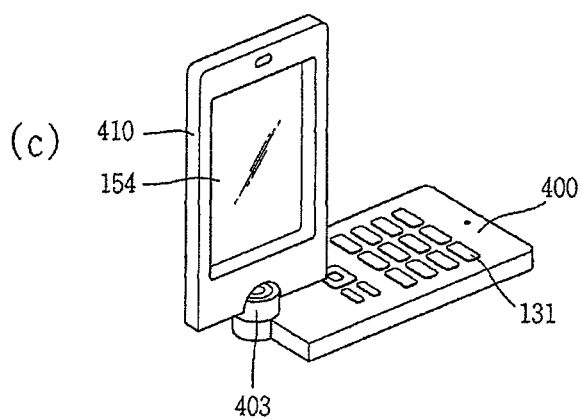
(c)

FIG. 40
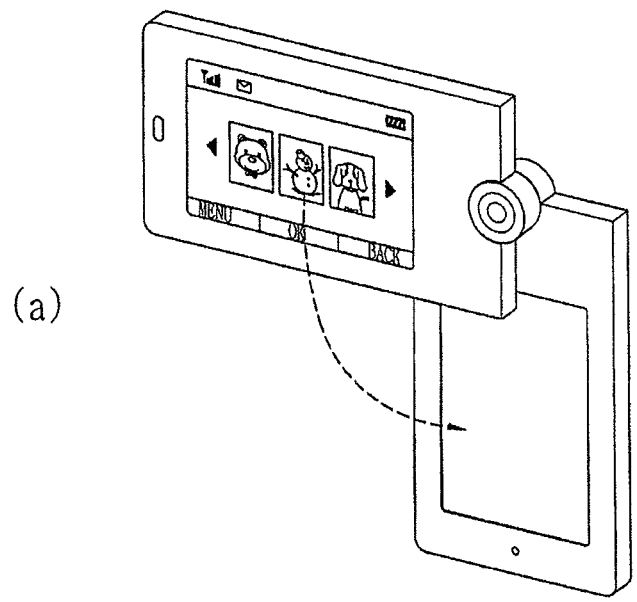
(a)
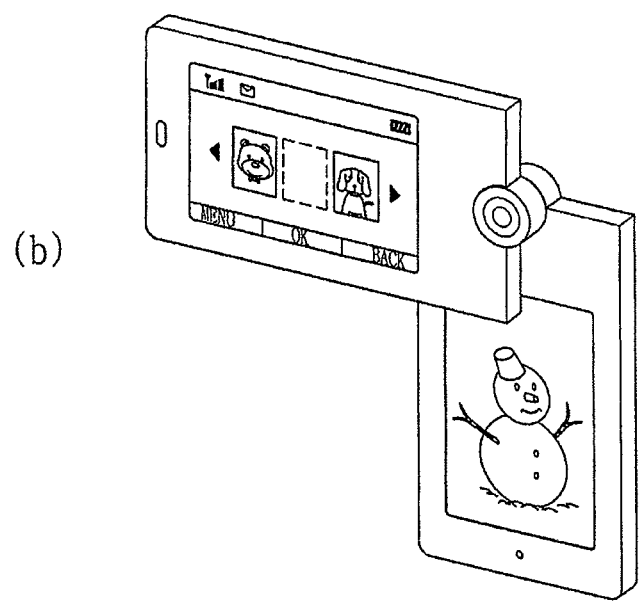
(b)

FIG. 41
(a) 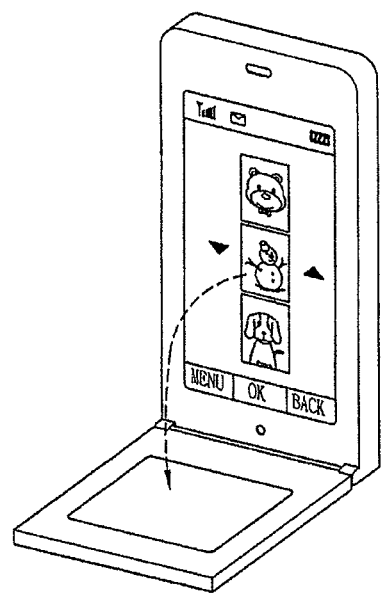
(b) 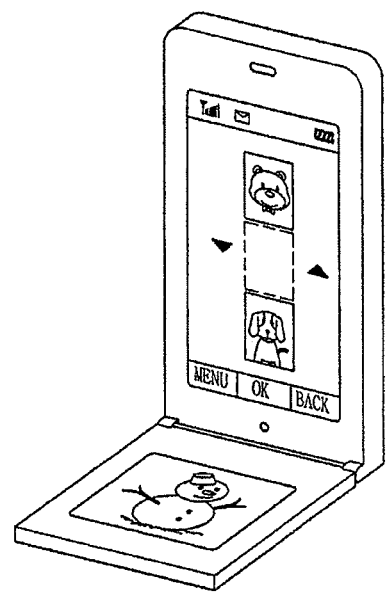

FIG. 42
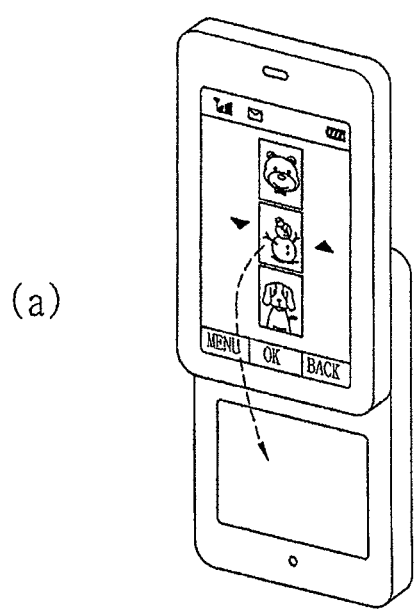
(a)
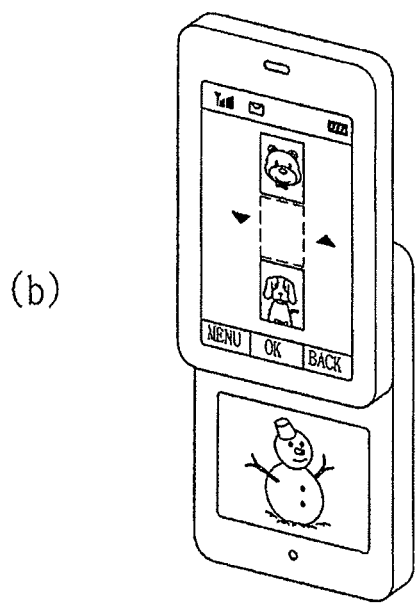
(b)

FIG. 43
(a) 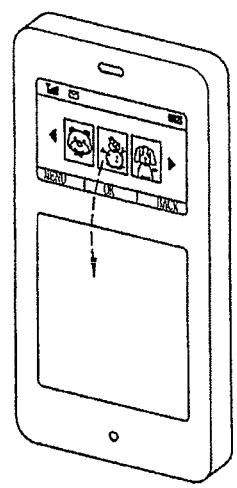
(b) 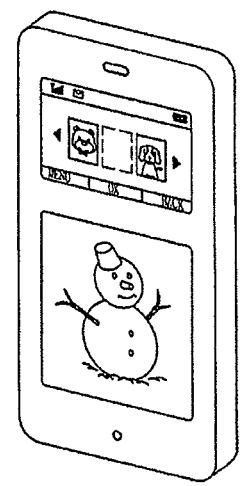

FIG. 44
(a) 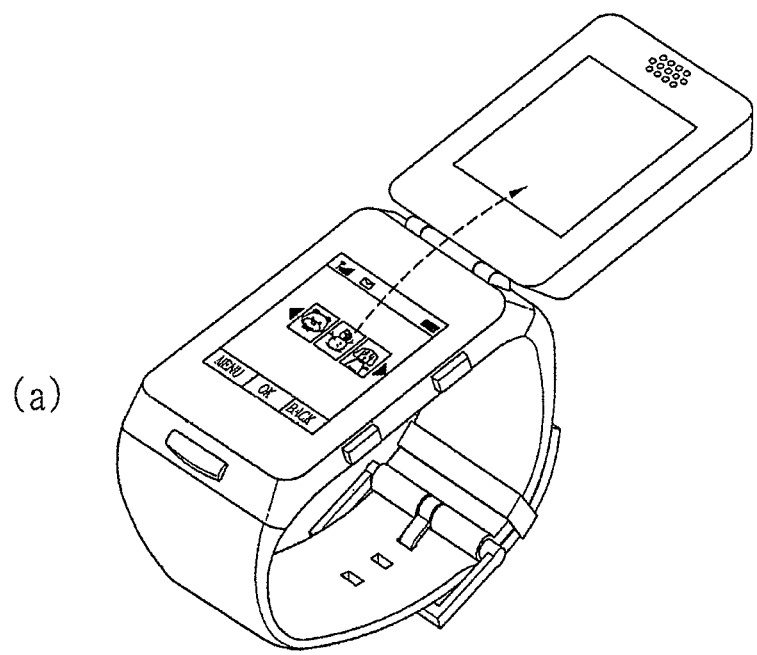
(b) 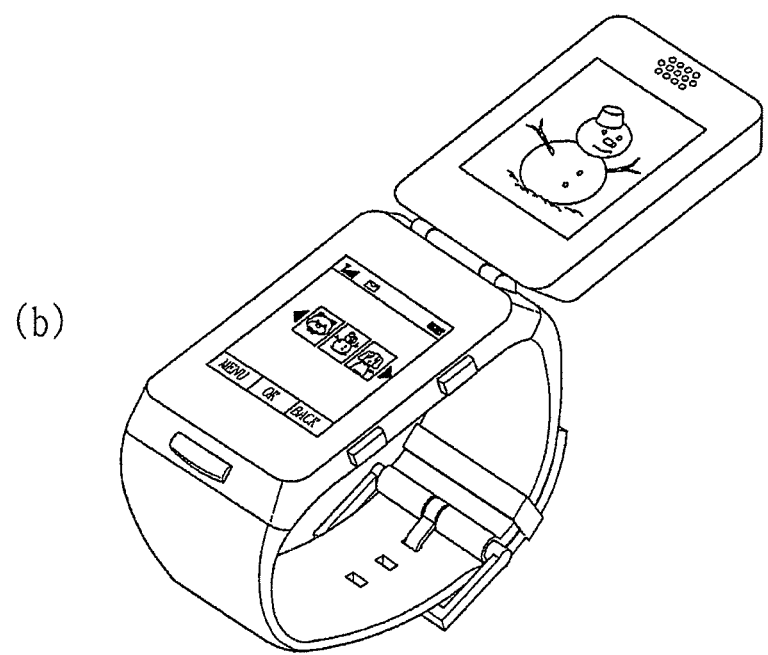

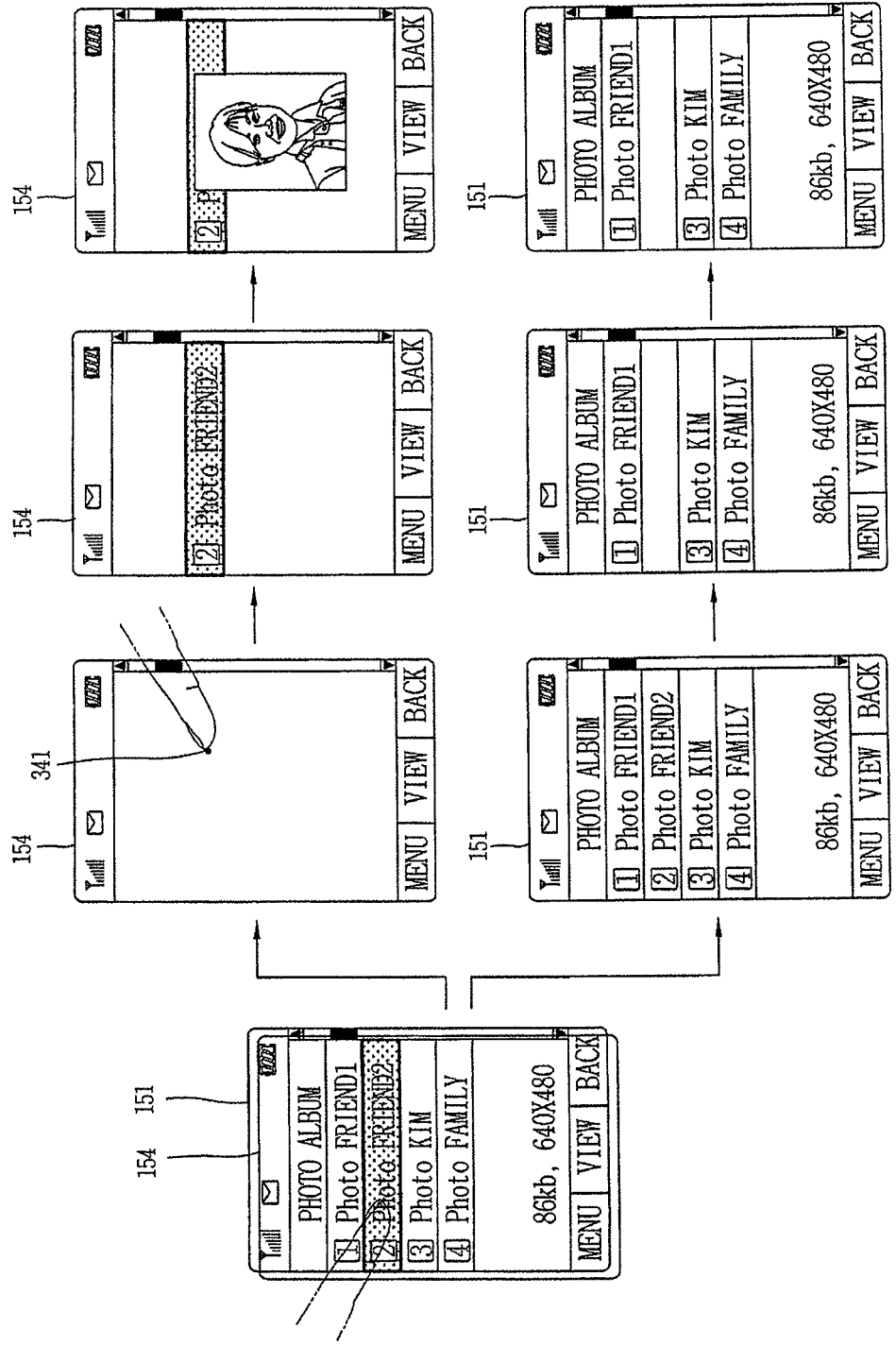

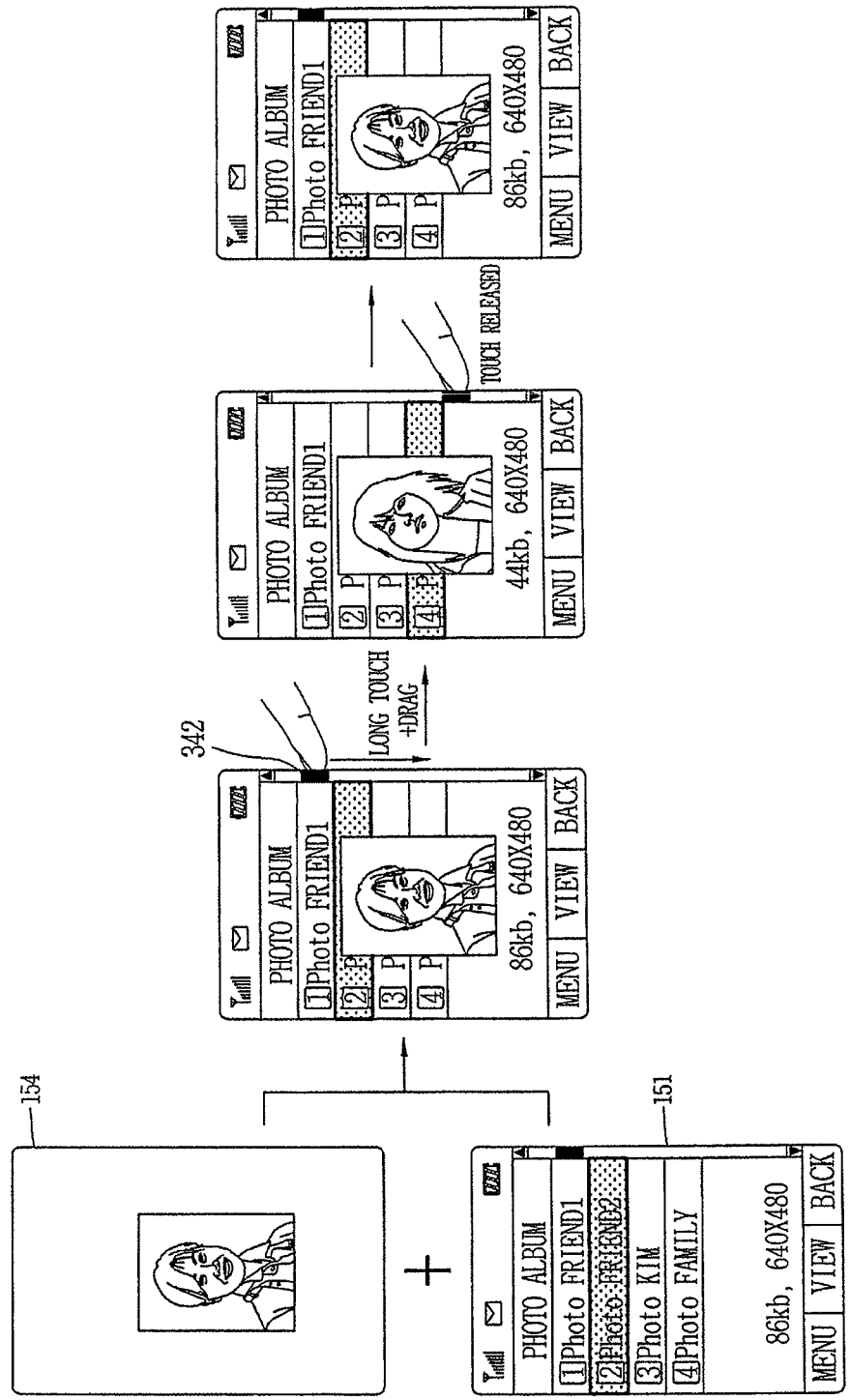

(a)        (b)

(a)  (b)

FIG. 59
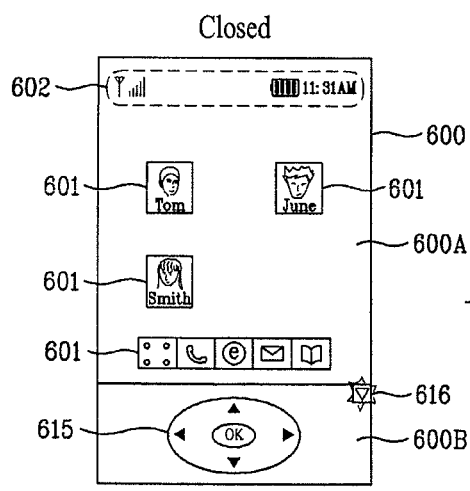
(59-1)
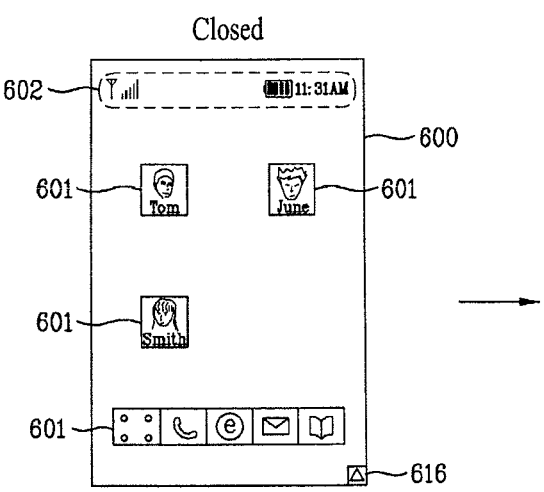
(59-2)
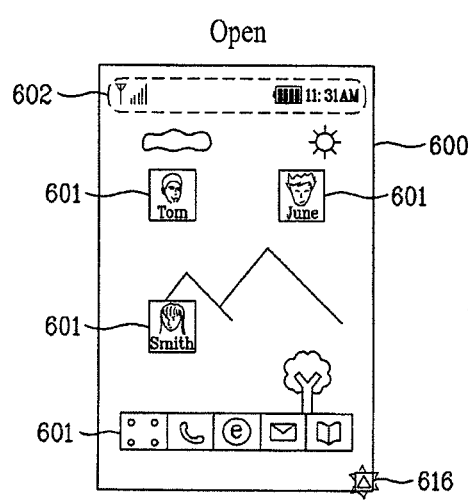
(59-3)
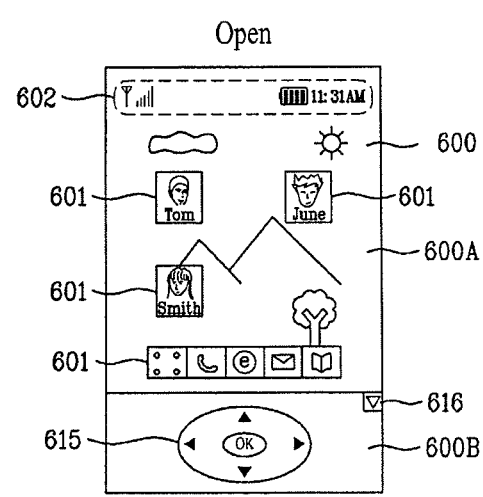
(59-4)

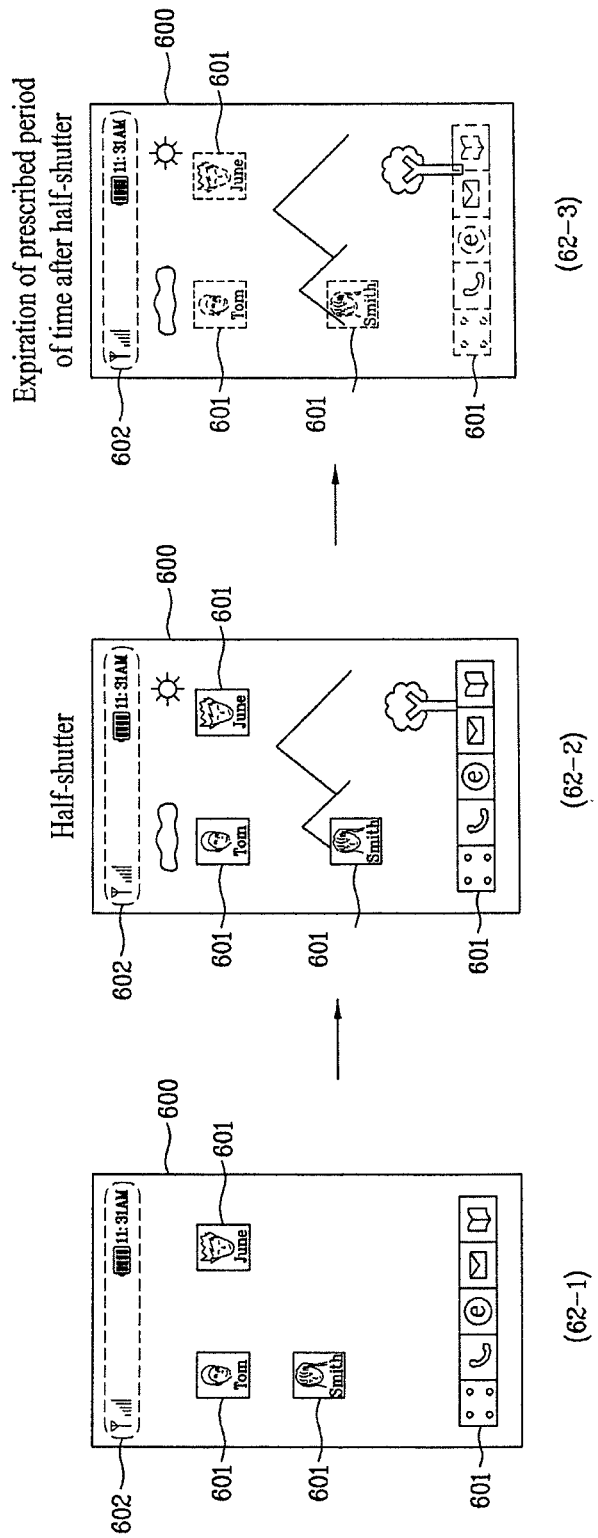

FIG. 63A
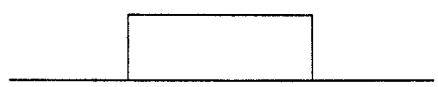
(63A-1)
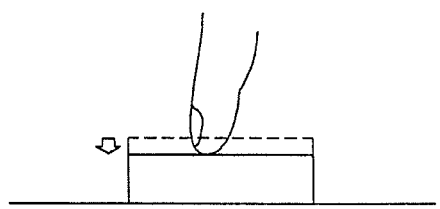
(63A-2)
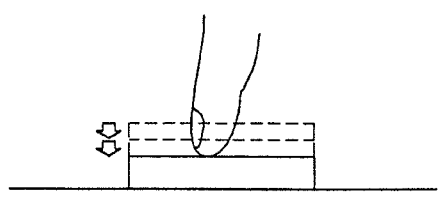
(63A-3)
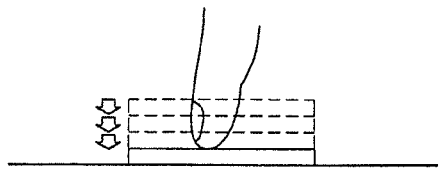
(63A-4)

FIG. 63B
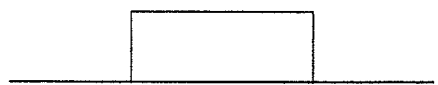
(63B-1)
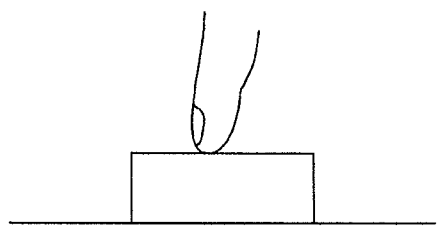
(63B-2)
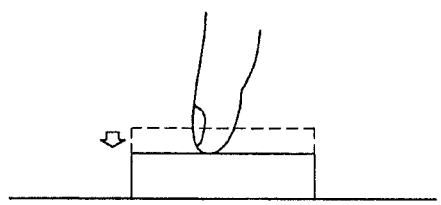
(63B-3)
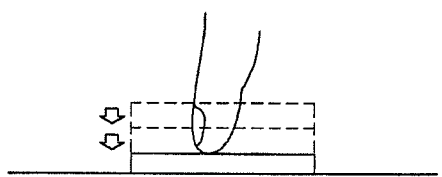
(63B-4)

TERMINAL AND METHOD OF CONTROLLING THE SAME

CROSS REFERENCE TO RELATED APPLICATIONS

This application claims the benefit of the Korean Patent Application No. 10-2008-0050460, filed on May 29, 2008, which is hereby incorporated by reference as if fully set forth herein.

BACKGROUND OF THE INVENTION

1. Field of the Invention

The present invention relates to a mobile terminal and method of controlling the same. Although the present invention is suitable for a wide scope of applications, it is particularly suitable for performing image capturing with further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, the number of users taking pictures using a mobile terminal such as a mobile phone is increasing. And, a photographic function becomes one of major functions of a mobile terminal. Therefore, the demand for a scheme of facilitating a user to manipulate a photographic function of a mobile terminal further rises.

SUMMARY OF THE INVENTION

Accordingly, the present invention is directed to a terminal and method of controlling the same that substantially obviate one or more problems due to limitations and disadvantages of the related art.

An object of the present invention is to provide a terminal and method of controlling the same, by which user's convenience for photography using a terminal can be further enhanced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a terminal according to the present invention includes a camera unit, a display unit, a user input unit having a shutter key for photography, and a control unit controlling at least one menu icons displayed in a standby mode (hereinafter "standby mode menu icons") to be displayed by being overlapped with a preview image obtained for the photography by the camera unit.

In another aspect of the present invention, a terminal includes a camera unit, a transparent display unit, a user input unit having a shutter key for photography, and a control unit controlling an image (hereinafter "a see through image") seen through the transparent display unit to play a role as a preview image for the photography.

In another aspect of the present invention, a method of controlling a terminal includes displaying a preview image for photography and displaying at least one or more icons displayed in a standby mode to be displayed by being overlapped with the preview image.

In a further aspect of the present invention, a method of controlling a terminal includes opening a first body and a second body mutually to enable an image to be seen through a transparent display unit, and controlling the see through image to play a role as a preview image for photography.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is an overview of mobile terminals each having a single TOLED (Transparent Organic Light Emitting Diode) according to an embodiment of the present invention;

FIG. 6 is an overview of mobile terminals each having a dual TOLED according to an embodiment of the present invention;

FIG. 9 is an overview of a mobile terminal having a dual TOLED according to an embodiment of the present invention, which shows a mobile terminal having a folder rotatable by 360°;

FIG. 10 is an overview of a mobile terminal having a dual TOLED according to an embodiment of the present invention, which shows a mobile terminal capable of photographing even when closed;

FIG. 12A and 12B are overviews of a swivel-type mobile terminal having a dual TOLED according to an embodiment of the present invention;

FIG. 15 is another overview of the flip-type mobile terminal of FIG. 13;

FIG. 20 is an overview of a folder-type mobile terminal having a single TOLED according to an embodiment of the present invention;

FIG. 21 is an overview showing a method for inputting information in a folder-type mobile terminal having a single TOLED according to an embodiment of the present invention;

FIG. 22 is an overview showing a configuration of a keypad for a folder-type mobile terminal having a single TOLED according to an embodiment of the present invention;

FIG. 24 is an overview of a swivel-type mobile terminal having a single TOLED according to an embodiment of the present invention;

FIGS. 39 to 44 are overviews showing a method for controlling a display of a mobile terminal having a dual TOLED according to an embodiment of the present invention;

FIGS. 46A to 46C are overviews showing a method for controlling a touching operation under the state that the displays of FIG. 45 are completely overlapped with each other;

FIGS. 58 to 60 are diagrams of display screen configurations for implementing a mobile terminal according to a first embodiment of the present invention;

FIG. 62 is a diagram of display screen configuration for implementing a mobile terminal according to a second embodiment of the present invention;

FIG. 63A and FIG. 63B are diagrams of a shutter key usable for a mobile terminal according to the present invention;

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be used, and structural, electrical, as well as procedural changes may be made without departing from the scope of the present invention. Wherever possible, the same reference numbers will be used throughout the drawings to refer to the same or like parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
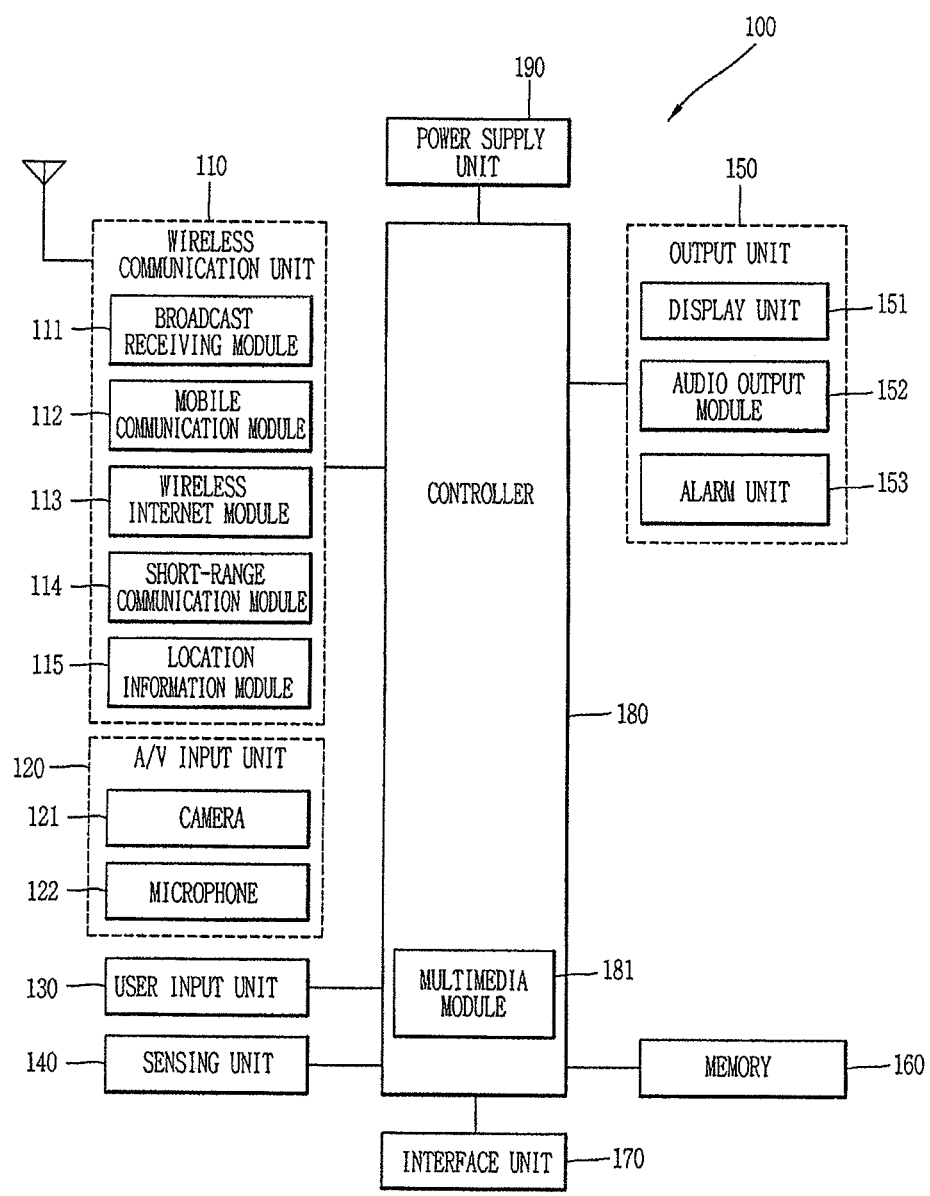
FIG. 1 is a block diagram of a mobile terminal in accordance with an embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wire communication unit. The wireless communication unit 110 and wire communication unit can be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

Examples of broadcast associated information include information associated with a broadcast channel, a broadcast program, a broadcast service provider, etc. For example, the broadcast associated information may include an electronic program guide (EPG) of digital multimedia broadcasting (DMB) and electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. Nonlimiting examples of such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless internet module 113 supports Internet access for the mobile terminal 100. This module may be internally or externally coupled to the mobile terminal 100. Suitable technologies for wireless internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless internet module can be replaced with a wire internet module in non-mobile terminals. The wireless internet module 113 and wire internet module may be commonly referred to as an internet module.

A short-range communication module 114 facilitates relatively short-range communications. Suitable technologies for short-range communication may include, but are not limited to, radio frequency identification (RFID), infrared data association (IrDA), ultra-wideband (UWB), as well as the networking technologies commonly referred to as Bluetooth and ZigBee.

A position-location module 115 identifies or otherwise obtains the location of the mobile terminal 100. This module may be implemented using, for example, global positioning system (GPS) components which cooperate with associated satellites, network components, and combinations thereof.

According to the current technology, the GPS module 115 is able to precisely calculate current 3-dimensional position information based on longitude, latitude and altitude by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the portable device is in a particular mode, such as phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, used by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a transparent OLED, a flexible display and a three-dimensional display.

And, some of them can be configured transparent to view external environment. This can be named a transparent display. One representative example of the transparent displays includes a transparent LCD, transparent OLED (TOLED) and the like.

The mobile terminal 100 may include one or more of displays 151. An example of a two-display embodiment is one in which one display 151 is configured as an internal display viewable when the terminal is in an opened position and a second display 151 configured as an external display viewable in both the open and closed positions.

The touch screen can be configured to detect a touch input pressure as well as a touch input position and size.

Meanwhile, a proximity sensor (not shown in the drawing) can be provided within or around the touch screen. The proximity sensor detects an object approaching a prescribed detecting surface or a presence or non-presence of an object existing around itself using an electromagnetic power or infrared rays without mechanical contact. Hence, the proximity sensor is superior to a contact sensor in lifespan and utilization.

Example for an operational principle of the proximity sensor is explained as follows. First of all, if an object approaches a sensor-detecting surface while an oscillation circuit oscillates a sine radio frequency, an oscillation amplitude of the oscillation circuit attenuates or stops. This change is converted to an electric signal to detect a presence or non-presence of the object. So, even if any material except a metallic comes between the RF oscillation proximity sensor and the object, a proximity switch is able to detect the object to detect without interference with the material.

In spite of not providing the proximity sensor, if the touch screen is electrostatic, it can be configured to detect the proximity of a pointer through an electric field change attributed to the proximity of the pointer.

So, in case that the pointer is placed in the vicinity of the touch screen without being actually contacted with the touch screen, it is able to detect a position of the pointer and a distance between the pointer and the touch screen. For clarity and convenience of explanation, an action for enabling the pointer approaching the touch screen to be recognized as placed on the touch screen is named 'proximity touch' and an action of enabling the pointer to actually come into contact with the touch screen is named 'contact touch'. And, a position, at which the proximity touch is made to the touch screen using the pointer, means a position of the pointer vertically corresponding to the touch screen when the pointer makes the proximity touch.

If the proximity sensor is used, it is able to sense a proximity touch and its pattern (e.g., proximity touch distance, proximity touch direction, proximity touch speed, proximity touch position, proximity touch moving state, etc.). And, it is also able to output information corresponding to the sensed proximity touch action and the proximity touch pattern to the touch screen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153, which includes at least one vibrator, may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video.

Moreover, data for various patterns of vibration and/or sound outputted in case of a touch input to the touch screen can be stored in the memory 160.

As map information can be stored in the memory 160, user's convenience can be further provided in a manner of providing the map information to a user if necessary. Moreover, a recent use history or a cumulative use frequency of each menu in the mobile terminal can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touch screen as characters or images, respectively.

Moreover, the controller 180 is able to perform TTS (text to speech) conversion for converting text to speech or STT (speech to text) conversion for converting speech to text.

A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However such teachings apply equally to other types of mobile terminals.

Figure 2:
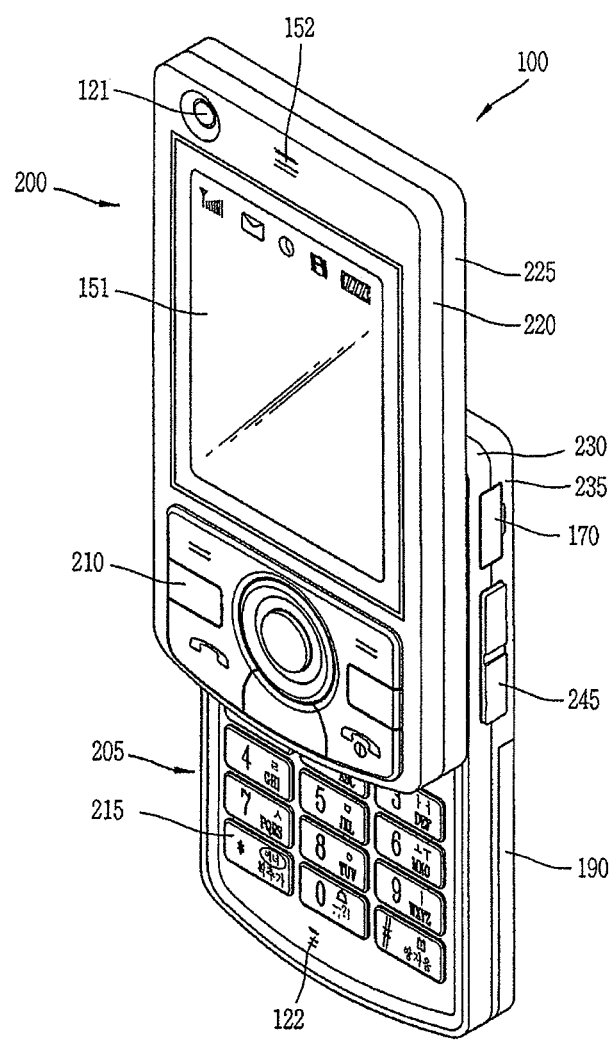
FIG. 2 is a perspective diagram of a front side of a mobile terminal according to an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 described in FIG. 1 may include a first input unit such as function keys and four directional keys 210, a second input unit such as keypad 215 and a third input unit such as side keys 245. The function keys 210 are associated with the first body 200, and the keypad 215 is associated with the second body 205. The keypad includes various keys such as numbers, characters, and symbols to enable a user to place a call, prepare a text or multimedia message, and otherwise operate the mobile terminal 100.

Moreover, a third user input unit 245 includes at least two keys to work as a shutter key for taking pictures and a zoom adjust key, respectively.

The first body 200 slides relative to the second body 205 between open and closed positions. Although not shown in drawings, in case of a folder-type mobile terminal, a first body thereof folds and unfolds relative to a second body thereof between open and closed positions. In addition, in case of a swing-type mobile terminal, a first body thereof swings relative to a second body thereof between open and closed positions.

In a closed position, the first body 200 is positioned over the second body 205 in such a manner that the keypad 215 is substantially or completely obscured by the first body 200. In the open position, user access to the keypad 215 is possible. The function keys 210 are conveniently configured for a user to enter commands such as start, stop and scroll.

The mobile terminal 100 is operable in either a standby mode, in which it is able to receive a call or message and to receive and respond to network control signaling or an active call mode. Typically, the mobile terminal 100 functions in the standby mode in the closed position and in an active mode in the open position. This mode configuration may be changed as required or desired.

The first body 200 is shown formed from a first case 220 and a second case 225. The second body 205 is shown formed from a first case 230 and a second case 235. The first case 230 and second case 235 are usually formed from a suitably rigid material, such as injection molded plastic, or formed using metallic material, such as stainless steel (STS) and titanium (Ti).

In case that the display unit of the first body includes a transparent display, the first rear case 225 of the first body 200 is formed of a transparent material for the transparent display or can be configured to have an open partial area.

One or more intermediate cases may be provided between the first case 230 and second case 235 of one or both of the first body 200 and second body 205. The first body 200 and second body 205 are typically sized to receive electronic components necessary to support operation of the mobile terminal 100.

The first body 200 is shown having a camera 121 and audio output unit 152, which is configured as a speaker, positioned relative to the display 151. The camera 121 may be constructed such that it can be selectively positioned relative to first body 200 such as by rotation or, swiveling.

The function keys 210 are positioned adjacent to a lower side of the display 151, which is shown implemented as an LCD or OLED. The display may also be configured as a touch screen having an underlying touchpad which generates signals responsive to user contact with the touch screen, such as with a finger or stylus.

The second body 205 is shown having a microphone 122 positioned adjacent to the keypad 215 and having side keys 245, which are one type of a user input unit as mentioned above, positioned along the side of second body 205. Preferably, the side keys 245 may be configured as hot keys, such that the side keys are associated with a particular function of the mobile terminal 100. An interface unit 170 is shown positioned adjacent to the side keys 245, and a power supply 190 in a form of a battery is shown located on a lower portion of the second body 205.

Figure 3:
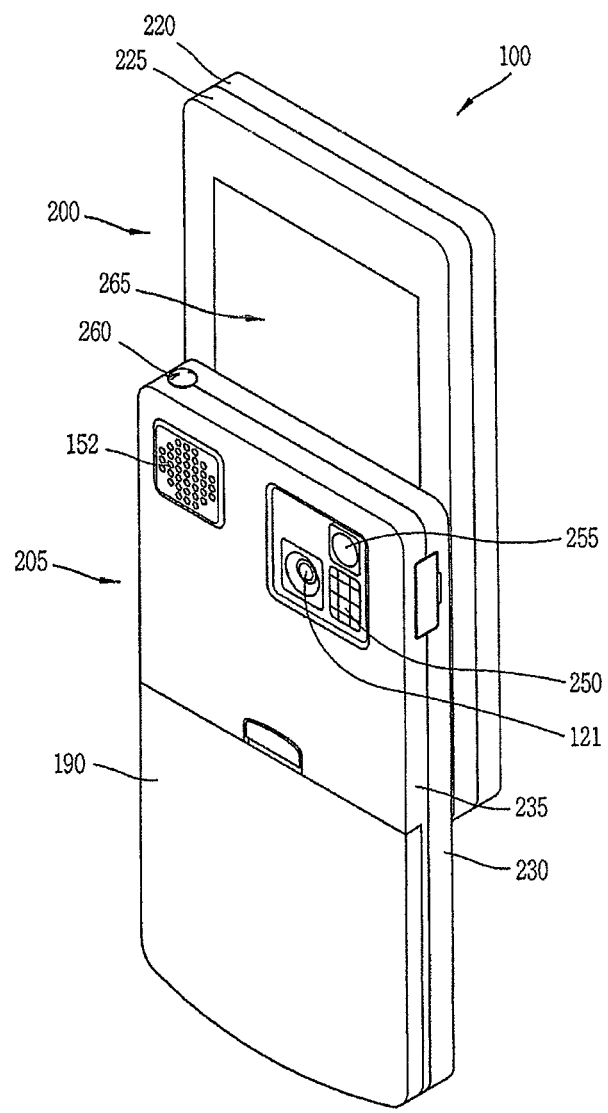
FIG. 3 is a perspective diagram of a backside of the mobile terminal shown in FIG. 2.

FIG. 3 is a rear view of the mobile terminal 100 shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 faces a direction which is opposite to a direction faced by the camera 121 of the first body 200 (FIG. 2). Each of the cameras 121 of the first body 200 and second body 205 may have the same or different capabilities.

In an embodiment, the camera 121 of the first body 200 operates with a relatively lower resolution than the camera 121 of the second body 205. Such an arrangement works well during a video conference, for example, in which reverse link bandwidth capabilities may be limited. The relatively higher resolution of the camera 121 of the second body 205 (FIG. 3) is useful for obtaining higher quality pictures for later use or for communicating with other parties.

The second body 205 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205. The antenna 260 functions in cooperation with the broadcast receiving module 111 (FIG. 1). The antenna 260 may be fixed or configured to retract into the second body 205. The rear side of the first body 200 includes a slide module 265, which slidably couples with a corresponding slide module located on the front side of the second body 205.

It is understood that the illustrated arrangement of the various components of the first body 200 and second body 205 may be modified as required or desired. In general, some or all of the components of one body may alternatively be implemented on the other body. In addition, the location and relative positioning of such components are not critical to many embodiments, and therefore, the components may be positioned at locations which differ from those shown by the representative figures.

The mobile terminal 100 of FIGS. 1-3 may be configured to operate within a communication system which transmits data via frames or packets, including both wireless and wired communication systems, and satellite-based communication systems. Such communication systems use different air interfaces and/or physical layers.

Examples of air interfaces used by the communication systems include example, frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
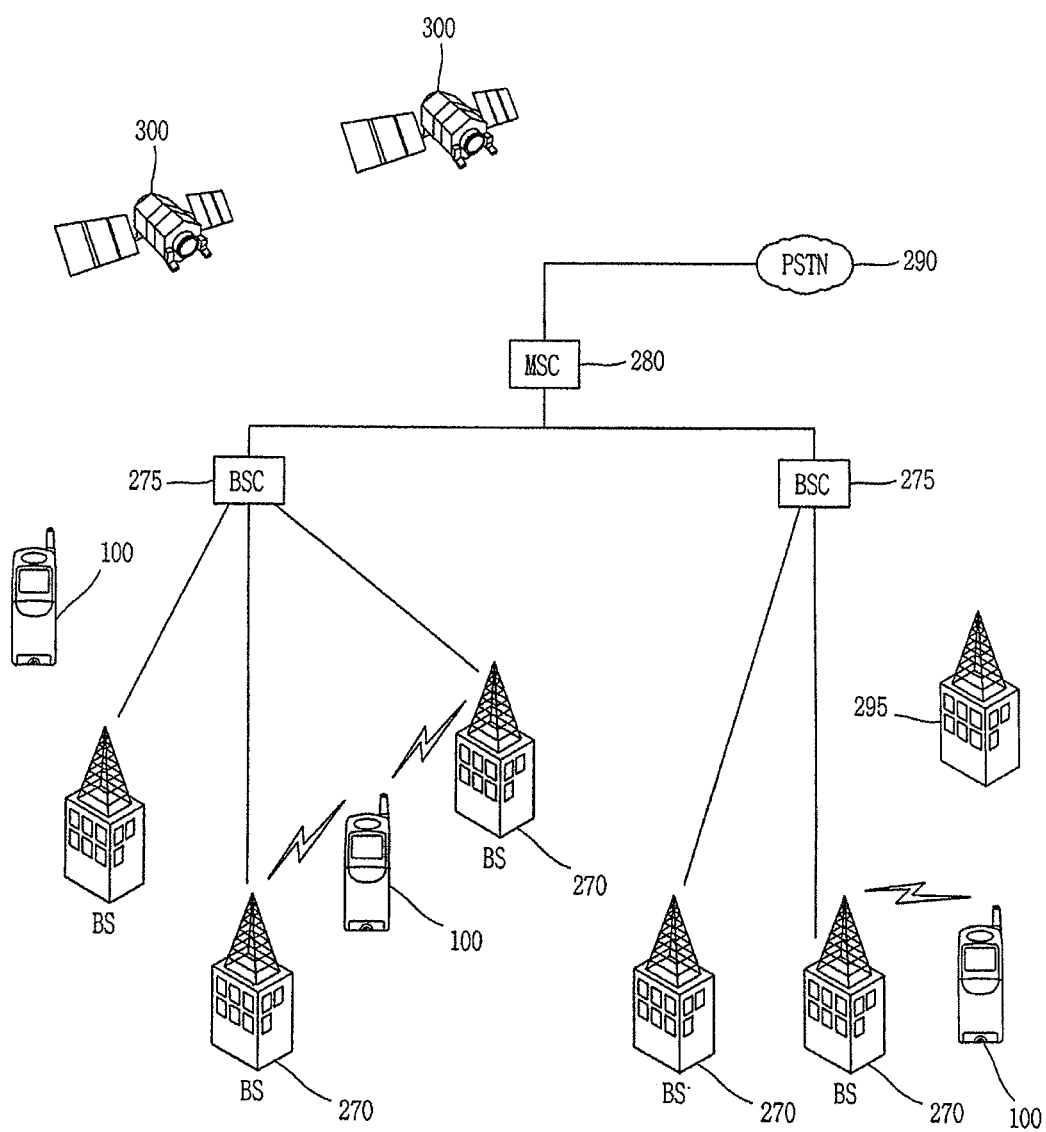
FIG. 4 is a block diagram of a wireless communication system in which a mobile terminal according to the present invention is operable.

Referring to FIG. 4, a CDMA wireless communication system is shown having a plurality of mobile terminals 100, a plurality of base stations 270, a plurality of base station controllers (BSCs) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or XDSL. It is to be understood that the system may include more than two BSCs 275.

Each base station 270 may include one or more sectors, each sector having an omni-directional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations 270 may also be denoted as "cell sites." Alternatively, individual sectors of a given base station 270 may be referred to as cell sites.

A terrestrial digital multimedia broadcasting (DMB) transmitter 295 is shown broadcasting to mobile terminals 100 operating within the system. The broadcast receiving module 111 (FIG. 1) of the mobile terminal 100 may be configured to receive broadcast signals transmitted by the DMB transmitter 295. Similar arrangements may be implemented for other types of broadcast and multicast signaling as discussed above.

FIG. 4 further depicts several global positioning system (GPS) satellites 300. Such satellites facilitate locating the position of some or all of the mobile terminals 100. Two satellites are depicted, but it is understood that useful positioning information may be obtained with greater or fewer satellites.

The position-location module 115 (FIG. 1) of the mobile terminal 100 is typically configured to cooperate with the satellites 300 to obtain desired position information. It is to be appreciated that other types of position detection technology, such as location technology that may be used in addition to or instead of GPS location technology, may alternatively be implemented. Some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 engage in calls, messaging, and other communications.

Each reverse-link signal received by a given base station 270 is processed within that base station 270. The resulting data is forwarded to an associated BSC 275.

The BSC 275 provides call resource allocation and mobility management functionality including soft handoffs between the base stations 270. The BSCs 275 also route the received data to the MSC 280, which provides additional routing services for interfacing with the PSTN 290.

Similarly, the PSTN interfaces with the MSC 280, and the MSC 280 interfaces with the BSCs 275. The BSCs 275 control the base stations 270 to transmit sets of forward-link signals to the mobile terminals 100.

In the following description, structures and interfacing methods for operations and actions of a mobile terminal according to the present invention are explained.

1. Configuration of a Mobile Terminal according to an Embodiment of the Present Invention A mobile terminal according to an embodiment of the present invention will be divided, according to a structure of a display, into a mobile terminal having a dual display and a mobile terminal having a single display. In more detail, FIG. 5 shows various types of mobile terminals each having the single display, and FIG. 6 shows various types of mobile terminals each having the dual display. Each mobile terminal having the dual display and the single display as shown in FIGS. 5 and 6 may be applicable to various types of mobile terminals, including folder-type (a), flip-type (b), slide-type (c), bar-type (d), rotating-type (e) (e.g., swivel-type or swing-type), watch-type (f), or the like.

Hereinafter, a mobile terminal having the single or dual display may have a transparent display. In addition, a non-transparent display may further be provided. The transparent display and the non-transparent display may be configured to be overlapped with each other or be separately provided. That is, the single display shown in FIG. 5 may be configured as one display module having the transparent display and the non-transparent display being overlapped with each other or be implemented only with the transparent display, whereas the dual display shown in FIG. 6 may be configured to have the transparent display and the non-transparent display separately provided.

In addition, in all embodiments, the transparent display may be defined as a Transparent OLED (TOLED), and the non-transparent display may be defined as the display module 151 or a Liquid Crystal Display (LCD). However, the transparent and non-transparent displays are not limited to the TOLED and the LCD, respectively. Also, the transparent display may be a permeable display having both displayable surfaces (e.g., inner surface-outer surface, or lower surface-upper surface). Further, the embodiments disclosed in the present invention may be applied to all types of mobile terminal; however, depending on embodiments, a certain type of mobile terminal may be illustrated, which is appropriate for the sake of explanation.

Dual Display-Folder-Type Mobile Terminal

Figure 7A:
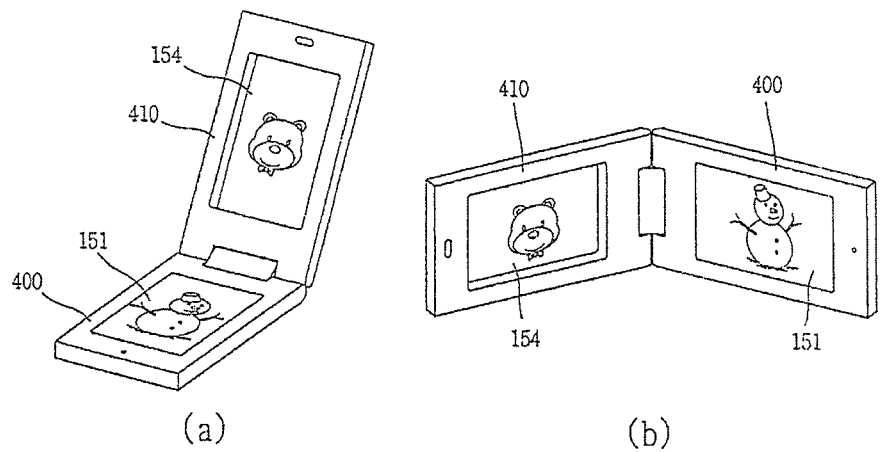
FIGS. 7A and 7B are overviews of a folder-type mobile terminal having a dual TOLED according to an embodiment of the present invention, which shows a mobile terminal having variable directions to display information according a posture of the mobile terminal.
Figure 7B:
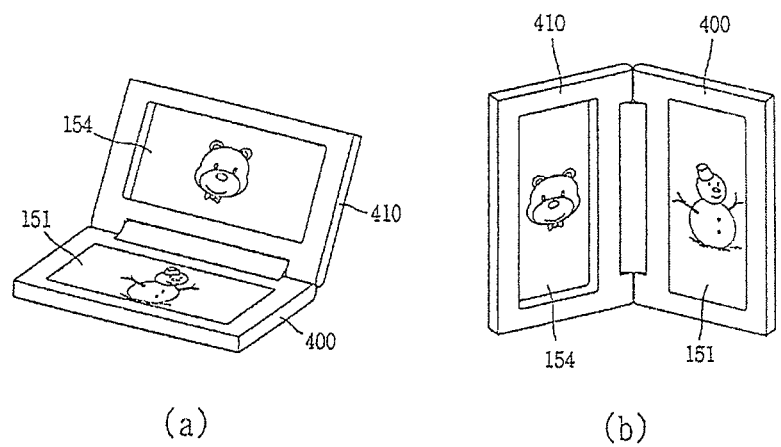

FIGS. 7A and 7B are overviews of a folder-type mobile terminal having a dual transparent display according to an embodiment of the present invention, which shows a mobile terminal having variable directions to display information according to a posture of the mobile terminal. As shown in FIGS. 7A and 7B, a folder-type mobile terminal according to an embodiment of the present invention may be configured such that a TOLED 154 is disposed at a folding portion 410 and a LCD 151 is disposed at a main body portion 400. Further, the LCD 151 may operate as a main display and the TOLED 154 may operate as a sub display.

Such positions of the TOLED 154 and the LCD 151 may also be changed, and accordingly, their functions as the main and sub displays may also be changed. For example, under the open position of the folding portion 410, the TOLED 154 may serve as a main display while the LCD 151 may serve as a sub display. Also, the LCD 151 can display an interactive keypad in one embodiment. In addition, under the closed state of the folding portion 410 of the mobile terminal, if the TOLED 154 independently operates, the operation of the LCD 151 at the main body portion 400 can be blocked such that it cannot interrupt the displaying of the TOLED 154.

Further, the TOLED 154 and the LCD 151 may be overlapped by a touchpad on any one of their upper or lower surface, so as to be useable as touch screens. Hereinafter, although not separately mentioned in every embodiment of the present invention, it is assumed that the TOLED 154 and the LCD 151 function as a touch screen. Also, the folder-type mobile terminal may be configured for its folding portion to be folded (closed) or unfolded (opened) in a vertical direction (i.e., up and down direction) or in a horizontal direction (i.e., right and left direction), according to its posture (i.e., its rotational direction). Thus, the mobile terminal may detect its posture (i.e., the rotational direction) and also rotate information output on the TOLED 154 or the LCD 151 for output according to its detected posture (i.e. the rotational direction).

Figure 8:
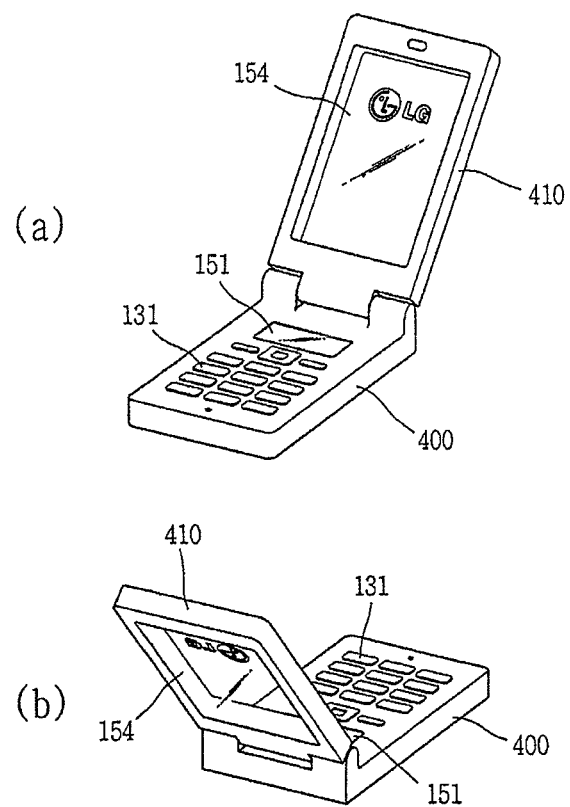
FIG. 8 is an overview of a folder-type mobile terminal having a dual TOLED and a keypad according to an embodiment of the present invention.

In addition, FIG. 7A is an overview illustrating a method for displaying information when the folding portion 410 is open or closed in the vertical direction, and FIG. 7B is an overview illustrating a method for displaying information when the folding portion 410 is open or closed in the horizontal direction. Further, FIG. 8 is an overview of a folder-type mobile terminal having a dual transparent display according to an embodiment of the present invention, which shows a mobile terminal further having a keypad and a display. Also, the mobile terminal shown in FIG. 8 may be configured such that TOLED 154 is disposed at the folding portion 410 and the LCD 151 and keypad of the user input unit 130 are disposed at the main body portion 400. The TOLED 154 may also operate as a main display.

Preferably, the TOLED 154 serving as the main display executes and displays most of functions and operations of the mobile terminal including a multimedia function and communication function. On the other hand, the LCD 151 at the main body portion 400 executes operations associated with the keypad of the user input unit 130 and calls. When the TOLED 154 independently operates under the closed state of the folding portion 410, the emission of backlights in a dome keypad may preferably be prevented, so as to protect the displaying of the TOLED 154 from the interference of the emission.

FIG. 8(*a*) is a perspective view of a front face of the folder-type mobile terminal having a transparent display according to an embodiment of the present invention, and FIG. 8(*b*) is a perspective view of a rear face thereof. Further, FIG. 9 is an overview of a mobile terminal having a dual transparent display according to an embodiment of the present invention, which shows a mobile terminal having a folding portion rotatable by 360°.

Also, the mobile terminal shown in FIG. 9 may be configured to have the TOLED 154 disposed at the folding portion 410 and the LCD 151 and keypad 131 of the user input unit 130 both disposed on the main body portion 400. Also, the TOLED 154 and the LCD 151 can display various types of information by dividing them according to their purposes of use. For instance, the TOLED 154 may display as the main display information related to most of the functions and operations executed in the mobile terminal as well as the multimedia function and the communication function, while the LCD 151 may display as the sub display telephone numbers input for placing a call or additional information.

Further, the mobile terminal according to this embodiment can implement a dual look by configuring a hinge 402 disposed between the folding portion 410 and the main body portion 400 to be rotatable by 360°. That is, as shown in FIGS. 9(*a*) to 9(*d*), the mobile terminal can be folded by rotating the main body portion 400 by 360° around the hinge 402.

Next, FIG. 10 is an overview of a mobile terminal having a dual transparent display according to an embodiment of the present invention, which shows the mobile terminal being capable of photographing in a state of a folder being closed. As shown, the mobile terminal may be configured such that TOLED 154 is disposed at the folding portion 410 and the LCD 151 and keypad 131 of the input unit 130 are both disposed at the main body portion 400. Further, the TOLED 154 may operate as a main display and the LCD 151 may operate as a sub display. For example, the TOLED 154 serving as the main display can display information related to most of the functions and operations of the mobile terminal including the multimedia function and communication function, while the LCD 151 can display a telephone number input for placing a call on the keypad and additional information such as an indicator.

In addition, the mobile terminal may further be provided with the camera 121 disposed between the LCD 151 and the keypad 131. By disposing the camera 121 between the LCD 151 and the keypad 131, a user can photograph an object to be taken or photograph himself in a self-portrait mode not only in the open sate of the folding portion 410 but also in the closed state. This is because the photographing operation can be executed through the TOLED 154.

Also, in the closed state of the folding portion 410, the camera 121 is located at a central portion of the rear side of the TOLED 154. Hence, assuming as mentioned above that a video call is attempted in the closed state of the folding portion 410, another party's image is displayed on the TOLED 154, and the camera 121 is located at the rear side of the other party's image displayed on the TOLED 154. Accordingly, when the user faces the other party's image displayed on the TOLED 154, an effect is generated as if the user directly faces the camera 121. Therefore, the controller 180 can send the user's face image to the other party's terminal by using the camera 121. Thus, the other party can feel like they are directly talking with the user. That is, because the parties are looking directly into the cameras when they are conducting a video call between each other, the parties feel as if they are directly talking to each other.

In another embodiment, a bar-type mobile terminal can be configured such that the camera 121 is disposed at a central portion of a lower side of the TOLED 154 and an object viewed through the TOLED 154 can be photographed. Here, an image (interference image) displayed on the TOLED 154 may be photographed together with the object. In this instance, such image of the object can be compensated using preset compensation data. If the interference image is included in the image of the object by more than a certain reference, the transparency of the TOLED 154 increases such that the interference image can be reduced by a commensurable level.

Also, when using a self-portrait mode, the mobile terminal having the TOLED 154 may be configured to display a preview image of the camera 121 on a non-overlapped portion between the camera 121 and the TOLED 154. For example, when a folding portion having the TOLED 154 is slid up to operate a self-portrait mode in a slide-type mobile terminal, the preview image can be displayed on the slid-up portion of the TOLED 154.

In addition, if other information (e.g., multimedia image information) is being displayed on the TOLED 154, the controller 180 can simultaneously display both the multimedia image information and the preview image of the camera 121 by adjusting the transparency and color of the TOLED 154. Further, an image to be displayed on the TOLED 154 can manually be changed by the user's input. Also, to receive the user's input, the mobile terminal may include a sensor for detecting information such as an inclination, touching, key input, pressure, proximity, voice or the like.

Figure 11:
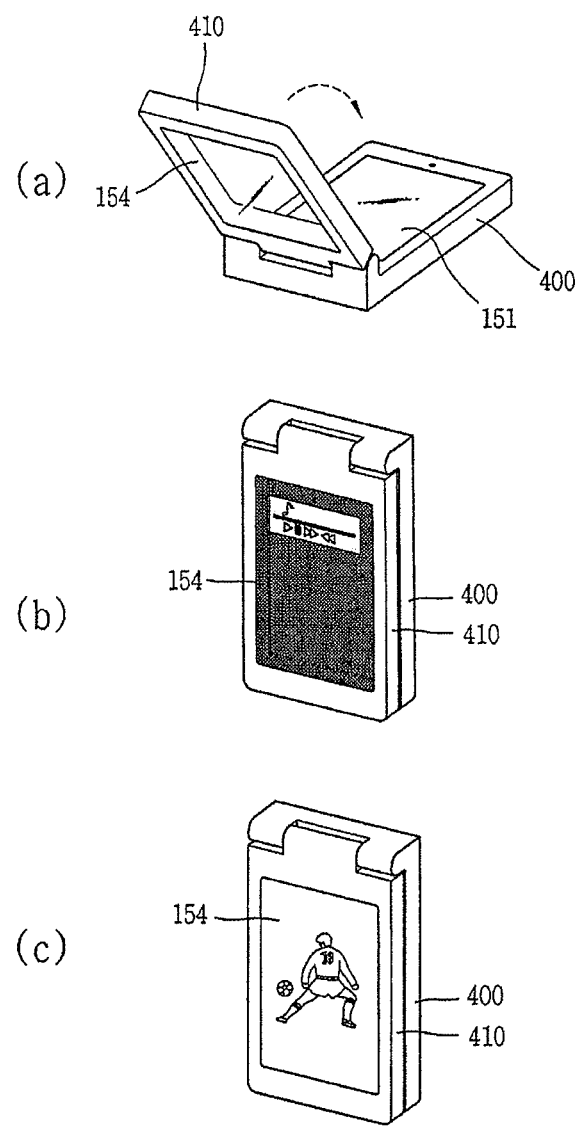
FIG. 11 is a perspective view of a mobile terminal having a dual TOLED according to an embodiment of the present invention, which shows a mobile terminal capable of controlling a size of information output in cooperation with opening/closing of a folder.

Next, FIG. 11 is an overview of a mobile terminal having a dual transparent display according to an embodiment of the present invention, which shows a method for controlling a size of information output in cooperation with the opening or closing of a folding portion.

Further, as shown, the TOLED 154 is disposed on the folding portion 410 and the LCD 151 is disposed on the main body portion 400. Also, each of the TOLED 154 and the LCD 151 may be obscured by a touchpad on their upper surface or a lower surface, so as to operate as a touch screen. As discussed above, any one of the TOLED 154 or LCD 151 may serve as a main display, and the other as a sub display. For example, the TOLED 154 may be used to display menu information for displaying operational states of the mobile terminal or to control a multimedia playback under the closed state of the mobile terminal. Also, the TOLED 154 may serve as a sub display to assist a main display (e.g., LCD 151) according to various scenarios of user interfaces under the open state of the mobile terminal.

Figure 12B:
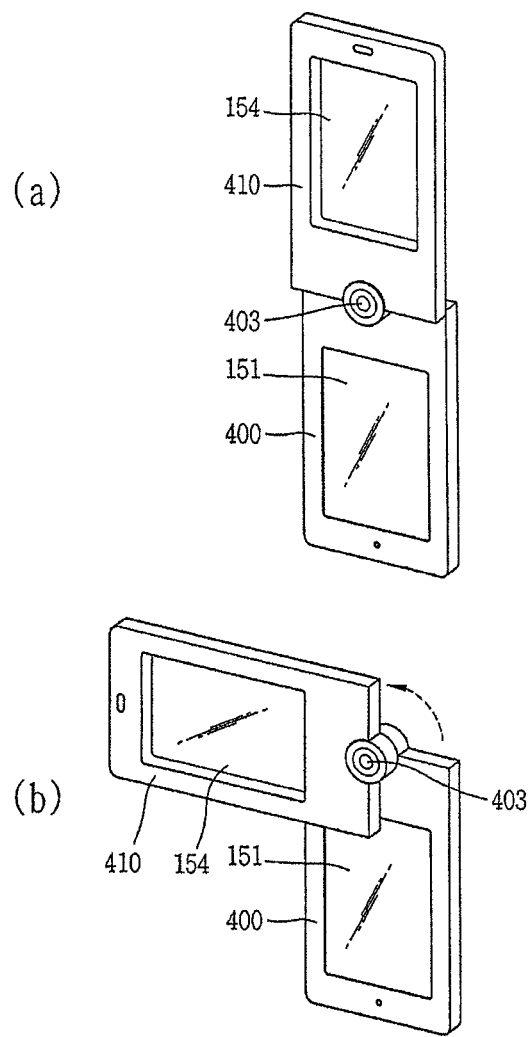

FIGS. 12A and 12B are overviews illustrating a swivel-type mobile terminal having a dual transparent display according to an embodiment of the present invention. As shown in FIGS. 12A and 12B, the swivel-type mobile terminal may be separately provided with the TOLED 154 and LCD 151. Similar to the different types of mobile terminals having the dual display as above, the TOLED 154 and the LCD 151 may serve respectively as main display and sub display so as to display different information from each other.

For example, the TOLED 154 may be used as the main display in the open state of the folding portion 410, the LCD 151 may serve as the sub display to display a keypad in a software configuration. Also, as shown in FIGS. 12A and 12B, the mobile terminal may have a swivel hinge 403 that allows the folding portion 410 to be rotated or moved to a certain angle (or position).

Dual Display-Flip-Type Mobile Terminal

Figure 13:
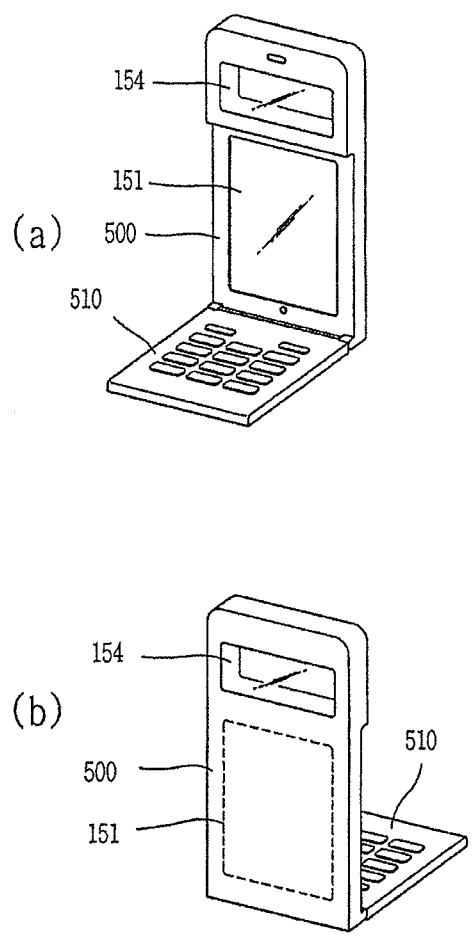
FIG. 13 is an overview of a flip-type mobile terminal having a dual TOLED according to an embodiment of the present invention.

FIG. 13 is an overview illustrating a flip-type mobile terminal having a dual transparent display according to an embodiment of the present invention. As shown in FIG. 13, the flip-type mobile terminal may be configured such that a keypad is disposed on a flip portion 510 and the TOLED 154 and LCD 151 are all disposed on a main body portion 500. Further, the TOLED 154 and the LCD 151 may operate as any of a main display or a sub display. For example, for displaying various information related to the mobile terminal (e.g., a current time, absent calls, message received, additional service related information, and the like) on the TOLED 154, a user can check such information on any portion of a front or rear surface of the mobile terminal even in the closed state.

Figure 14:
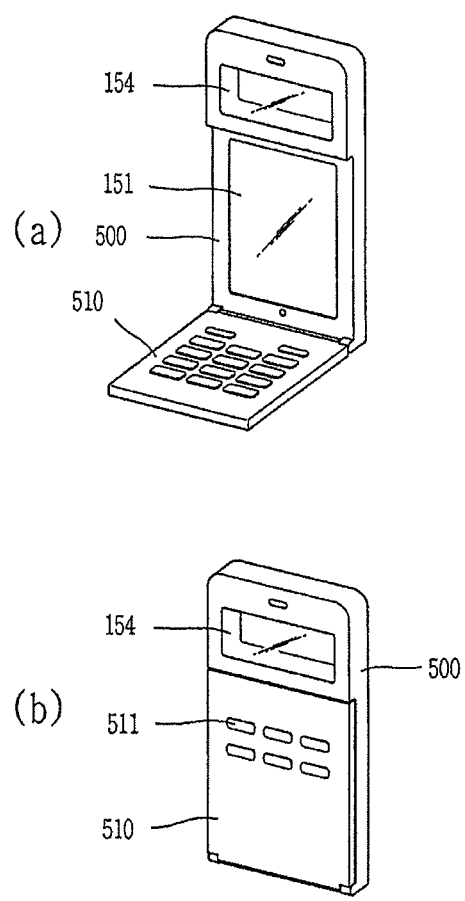
FIG. 14 is another overview of the flip-type mobile terminal of FIG. 13.

Next, FIG. 14 is an overview illustrating another embodiment of the flip-type mobile terminal of FIG. 13, in which a separate sub-keypad 511 may be disposed on an outer surface of the flip portion 510. Such arrangement of the sub-keypad 511 on the outer surface of the flip portion 510 allows the user to control the operation of the mobile terminal with reference to information displayed on the TOLED 154 even in the closed state of the flip portion 510.

Further, FIG. 15 is another overview illustrating the flip-type mobile terminal of FIG. 13. As shown in FIG. 15, the TOLED 154 is disposed on the flip portion 510 and the LCD 11 is disposed on the LCD 151. The TOLED 154 and the LCD 151 may operate as any of a main display or a sub display. For example, assuming that the TOLED 154 operates as a main display in the open state of the flip portion 510, the LCD 151 serves as a sub display so as to display a keypad in a software configuration.

Also, if the TOLED 154 operates as a sub display in the closed state of the flip portion 510, the TOLED 154 can display, for example, a software key for manipulating the mobile terminal, an operational state of the mobile terminal, wireless (radio) information transmitted/received to/from the mobile terminal, and various additional information (e.g., current time, absent calls, message received, additional service related information, and the like).

Dual Display-Slide-Type Mobile Terminal

Figure 16:
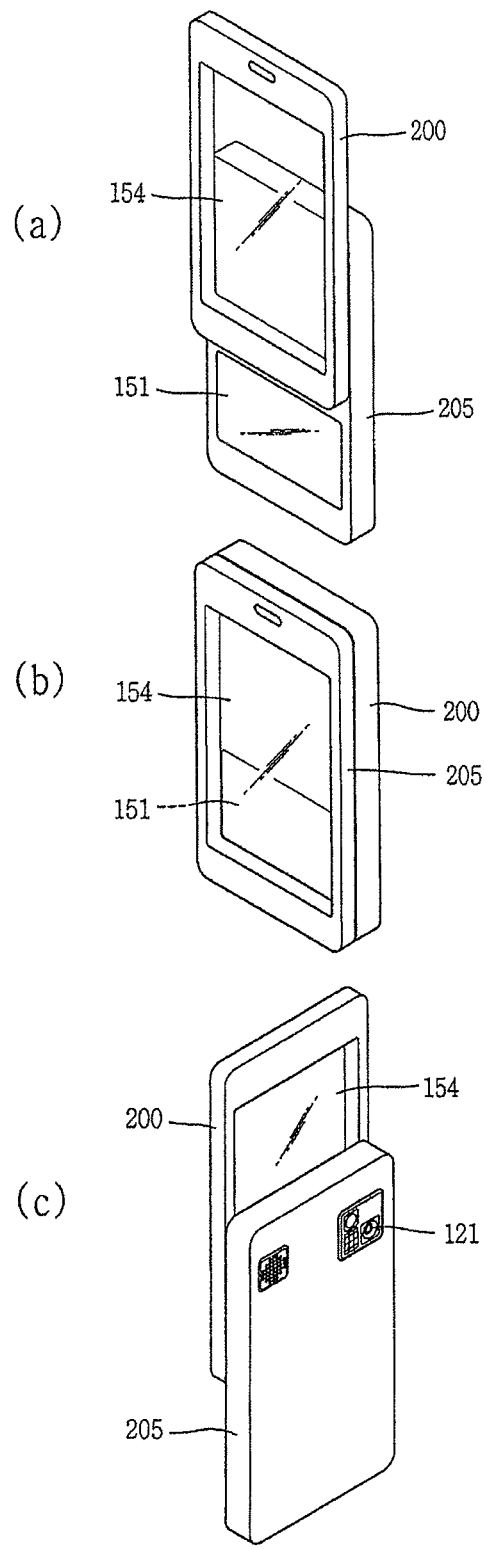
FIG. 16 is an overview of a mobile terminal having a dual TOLED according to an embodiment of the present invention, which shows a method of displaying information on the TOLED in cooperation with opening or closing of a sliding portion of the mobile terminal.

FIG. 16 is an overview illustrating a mobile terminal having a dual transparent display according to an embodiment of the present invention, which shows a method for displaying information on a transparent display in cooperation with the opening or closing of a sliding portion of the mobile terminal.

As shown in FIG. 16, the slide-type mobile terminal may be configured to have TOLED 154 disposed on a first body 200 and the LCD 151 disposed on a second body 205. Further, the TOLED 154 and the LCD 151 may operate as any of a main display or a sub display, and each can display various different types of information. As one example, when the user photographs himself in a self-portrait mode, the user can easily do photograph himself based upon image information output on the TOLED 154.

For example, previously, the user had to photographed himself in the self-portrait mode by using a mirror disposed adjacent to a camera. However, in the embodiment of the present invention, as shown in FIG. 16(c), an image reflected on the camera 121 can be output as a preview image on a partial display region of the TOLED 154 (e.g., a display region seen from the rear side of the mobile terminal when being slid up). Hence, the user can photograph himself more easily by viewing an image displayed on the TOLED 154. Also, as shown in FIG. 16(a), the TOLED 154 transmits an image output on the LCD 151 when the sliding portion is in the closed state. Accordingly, even in the closed state of the sliding portion, it is possible to output and control basic information required to control the mobile terminal.

Dual Display-Bar-Type Mobile Terminal

Figure 17:
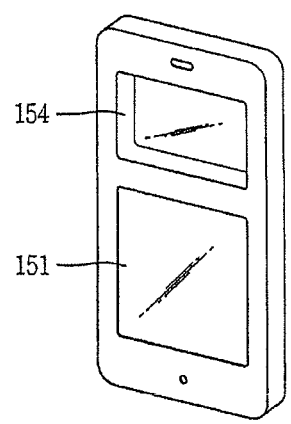
FIG. 17 is an overview of a bar-type mobile terminal having a dual TOLED according to an embodiment of the present invention.

FIG. 17 is an overview illustrating a bar-type mobile terminal having a dual transparent display according to an embodiment of the present invention. As shown in FIG. 17, the bar-type mobile terminal may be configured to have the TOLED 154 disposed on an upper portion of a terminal body and the LCD 151 disposed on a lower portion thereof. Further, the TOLED 154 and the LCD 151 may operate as any of a main display or a sub display, and each can display various different types of information.

Figure 18:
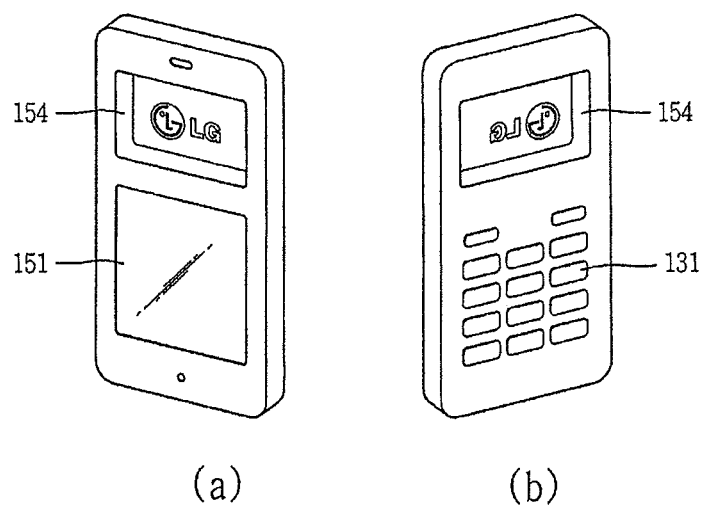
FIG. 18 is an overview of a mobile terminal configured such that the rear surface of the bar-type mobile terminal of FIG. 17 can be used.

FIG. 18 is an overview of another embodiment of the bar-type mobile terminal of FIG. 17, in which the mobile terminal is configured such that its rear surface can be used as another type of mobile terminal. As shown in FIG. 18, the mobile terminal may be configured such that the LCD 151 is disposed below the TOLED 154 on a front surface of the mobile terminal and the keypad 131 is disposed below the TOLED 154 on a rear surface of the mobile terminal. Further, information displayed on the TOLED 154 is provided in order to represent that the information displayed on the front surface of the TOLED 154 is transmitted and displayed on the rear surface. Such information may be displayed by converting or rotating a displaying direction according to the user's manipulation.

Watch-Type Mobile Terminal

Figure 19:
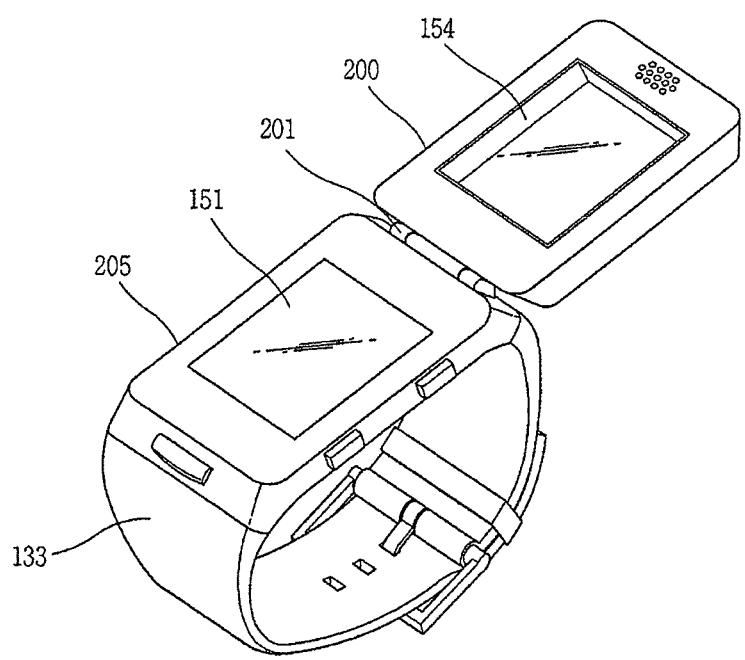
FIG. 19 is an overview of a watch-type mobile terminal having a single TOLED according to an embodiment of the present invention.

FIG. 19 is an overview illustrating a watch-type mobile terminal having a dual transparent display according to an embodiment of the present invention. As shown FIG. 19, the watch-type mobile terminal may include the second body 205 having a watchstrap 133 connected thereto and having the LCD 151, and the first body 200 connected to one side of the second body 205 by a hinge 201 to be open or closed and having the TOLED 154. Hereinafter, the first body 200 may also be referred to as a cover.

Similar to the different types of mobile terminals having the dual display as discussed above, the TOLED 154 and the LCD 151 may operate as any of a main display or a sub display, and each can display various different types of information. Also, because the TOLED 154 is transparent, it can transmit information displayed on the LCD 151 in the closed state of the cover so as to output such information thereon, namely, the first body 200. Also, in the open state of the first body 200, the TOLED 154 and the LCD 151 can display different information from each other. Further, in the open state of the first body 200, the TOLED 154 and the LCD 151 may be used either as displays or keypads.

Single Display-Folder-Type Mobile Terminal

FIG. 20 is an overview illustrating a folder-type mobile terminal having a single transparent display according to an embodiment of the present invention. As shown in FIG. 20, the mobile terminal may be configured to have the TOLED 154 disposed on the folding portion 410 and the keypad 131 disposed on the main body portion 400. The keypad 131 may also be configured as a dome key or have backlights (not shown). Thus, when the folding portion 410 is in the open state, a user can input information by pressing the keypad 131. Conversely, when the folding portion 410 is in the closed state, the user can input information by touching keys on corresponding positions with referring to the positions of the keys on the keypad 131, which is viewable by being transmitted through the TOLED 154.

Next, FIG. 21 is an overview illustrating an information input method in a folder-type mobile terminal having a single transparent display according to an embodiment of the present invention. As shown in FIG. 21, the mobile terminal may be configured to have the TOLED 154 disposed on the folding portion 410 and a keypad or touchpad 155 disposed on the main body portion 400. Further, the TOLED 154 may operate as a touch screen with a touchpad (or touch film) attached on its upper surface or lower surface. In addition, the keypad may include dome keys, or be configured as a printed pattern having various key-like patterns (e.g., numeral keys, navigation keys, symbol keys, character keys, and the like). Also, the keypad or touchpad 155 may be provided with backlights. The backlights may be configured by using Light Emitting Diodes (LEDs) or an Electroluminescence Sheet (EL).

Further, the backlight may automatically be driven by the controller 180 according to the user's manipulation or the opening/closing operation of the folding portion 410. For example, when the folding portion is closed while specific information is being displayed on the TOLED 154, the backlights may not be driven in order to prevent the keypad from being transmitted as a background. Also, in order to prevent the keypad from being transmitted as a background even when the backlights are not driven, the keypad or touchpad 155 may preferably be implemented to be flat or with a dark color. On the other hand, in the open state of the folding portion 410, the user can input information by touching the keypad or touchpad 155. That is, the user can touch the touchpad 155 to input cursive letters or to perform a touch and drag operation when the backlight is not driven.

Next, FIG. 22 is an overview illustrating a configuration of a keypad on a folder-type mobile terminal having a single transparent display according to an embodiment of the present invention. As shown in FIG. 22, the mobile terminal may be configured such that the TOLED 154 is disposed on the folding portion 410. Also, the touchpad 155, various key patterns 156 and an EL 157 for backlights are disposed on the main body portion 400.

In addition, the EL 157 may be a material emitting light onto a space to which an electrical force can come up to. Also, an EL Sheet is a planar light source in a paper form based on EL, and has many advantages that neon or phosphor does not have. As a material in a form of flexible thin-film, it requires low power consumption and can be cut in various forms suitable for applications. Also, the input unit 130 uses multi-layered EL sheets to activate EL sheets suitable for each backlight control algorithm. For example, the EL sheet may be configured as a key pattern combining numeral keys and navigation keys, a symbol key pattern, QWERTY key pattern, and the like. The controller 180 can then activate one of such key patterns according to the user's control or a preset backlight control algorithm. The input unit 130 using the EL sheets may also be implemented by a keypad or by a touchpad.

Figure 23:
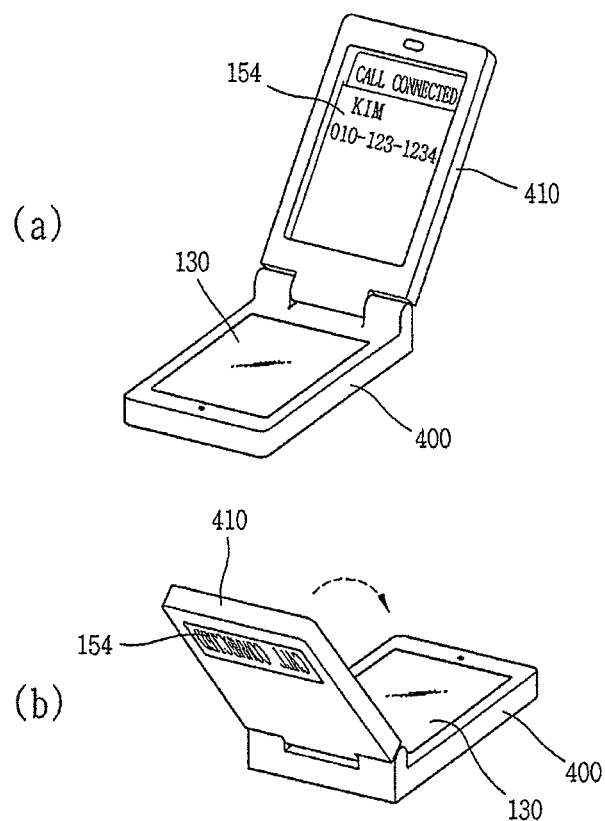
FIG. 23 is an overview of a folder-type mobile terminal having a TOLED according to an embodiment of the present invention, which shows a mobile terminal having a configuration in which information displayed on any one surface of the TOLED can be restricted.

FIG. 23 is an overview illustrating a folder-type mobile terminal having a transparent display according to an embodiment of the present invention, which shows a configuration of the mobile terminal in which information displayed on one surface of the transparent display can be restricted. As shown in FIG. 23(*a*), the mobile terminal may be configured such that the TOLED 154 is disposed on the folding portion 410 and the input unit 130 using a dome keypad, touch keypad, EL sheets or the like is disposed on the main body portion 400.

In the closed state of the mobile terminal, the folding portion 410 is designed to expose part of the TOLED 154 as shown in FIG. 23(*b*). Thus, the part of the TOLED 154 can be exposed to the user. Further, the folding portion 410 according to this embodiment may be provided with the TOLED 154 on both surfaces (i.e., inner surface and outer surface) such that displaying information can be executed both in the open and closed states of the mobile terminal.

FIG. 24 is an overview illustrating a swivel-type mobile terminal having a single transparent display according to an embodiment of the present invention. As shown in FIG. 24, the swivel-type mobile terminal may be configured with the TOLED 154 and the keypad 131 separately disposed and the swivel hinge 403 connecting the folding portion 410 to the main body portion 400. The swivel hinge 403 allows the folding portion 410 to be rotated or moved to a certain angle (or position).

Further, the controller 180 can change a displaying direction of information output on the TOLED 154 according to the rotation of the folding portion 410. In addition, the TOLED 154 is allowed to display on both surfaces thereof. Accordingly, the controller 180 can allow information, which is displayed on a front surface (first surface) of the TOLED 154, to be displayed on a rear surface (second surface) thereof, according to the rotation of the folding portion 410 or the opening/closing of the folding portion 410.

Single Display-Slide-Type Mobile Terminal

Figure 25:
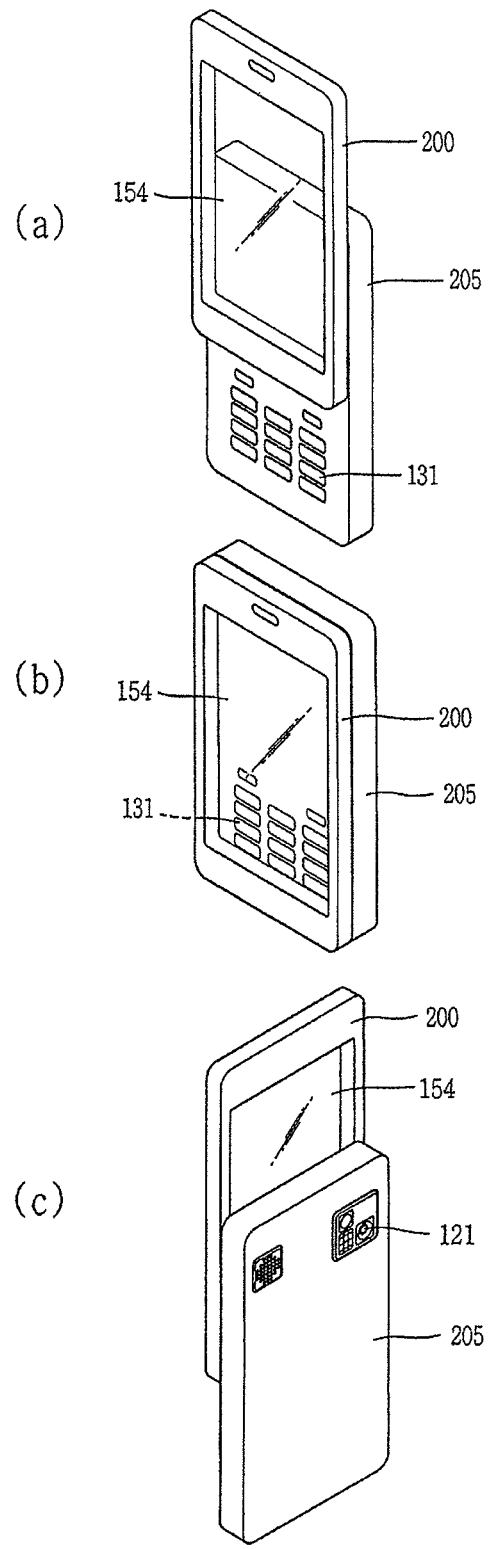
FIG. 25 is an overview of a slider-type mobile terminal having a single TOLED according to an embodiment of the present invention, which shows an information displaying method on the TOLED in cooperation with opening or closing of a sliding portion of the mobile terminal.

FIG. 25 is an overview of a slide-type mobile terminal having a single transparent display according to an embodiment of the present invention, which shows a method for displaying information on the transparent display in cooperation with the opening or closing of a sliding portion. As shown in FIG. 25, the slide-type mobile terminal may be configured to have the TOLED 154 disposed on the first body 200 and the keypad 131 disposed on the second body 205. Also, the camera 121 is disposed at a rear surface of the second body 205.

Thus, when a user wants to photograph himself or herself using the camera 121 disposed at the rear surface, the controller 180, as shown in FIG. 25(*c*), can output an image reflected on the camera 121 as a preview image on a partial display region of the TOLED 154 (i.e., a display region exposed to the rear surface when the mobile terminal is slid open). Accordingly, the user can view his own image displayed on the TOLED 154 so as to photograph himself or herself more easily.

Also, as shown in FIG. 25(*a*), because the keypad 131 disposed on the second body 205 is transmitted through the TOLED 154 when the sliding portion is in the closed state, the user can input information by touching keys on corresponding positions and referring to the positions of the keys transmitted and displayed on the TOLED 154. As such, the basic operations of the mobile terminal can be controlled even in the closed state of the sliding portion.

Single Display-Bar-Type Mobile Terminal

Figure 26:
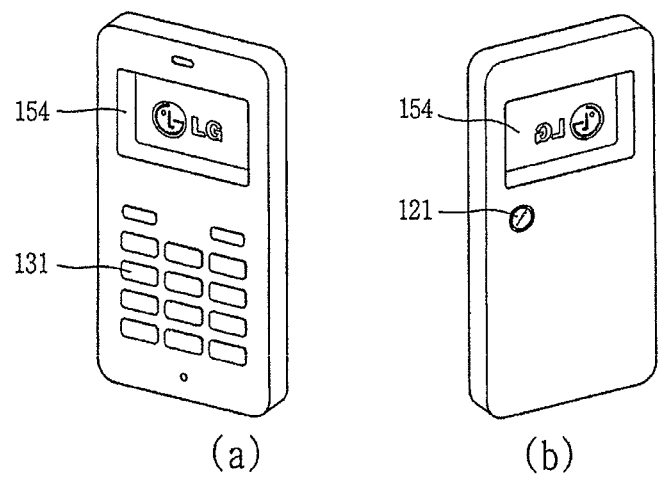
FIG. 26 is an overview of a bar-type mobile terminal having a single TOLED according to an embodiment of the present invention.

FIG. 26 is an overview illustrating a bar-type mobile terminal having a single transparent display according to an embodiment of the present invention. As shown in FIG. 26, the bar-type mobile terminal may be configured to have the TOLED 154 disposed at an upper portion of a front surface of a terminal body and the keypad 131 disposed at a lower portion thereof. The TOLED 154 is also exposed to the rear surface of the mobile terminal.

Figure 27:
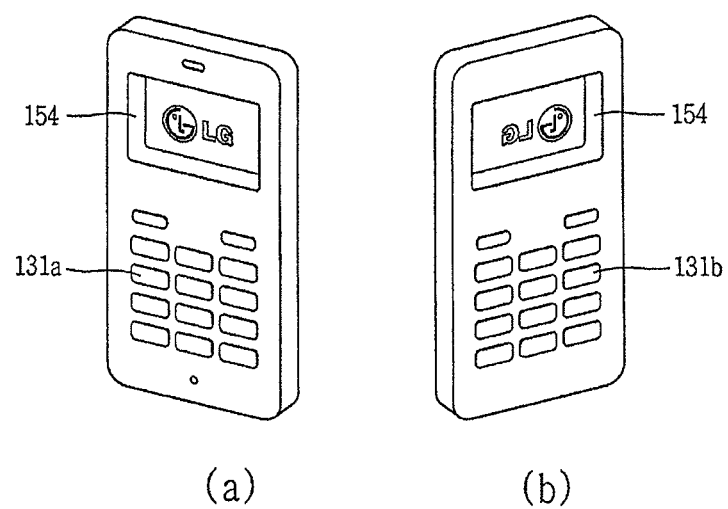
FIG. 27 is an overview of a bar-type mobile terminal having keypads at both surfaces of the mobile terminal of FIG. 26.

Therefore, as shown in FIG. 27, the keypad 131 may further be disposed below the TOLED 154 shown on the rear surface of the terminal body. Accordingly, when an error is generated on a keypad (e.g., 131a) on one surface, the user can use a keypad (e.g., 131b) on another surface. Further, the information displayed on the TOLED 154 is provided in order to represent that information displayed on the front surface of the TOLED 154 is transmitted and displayed on the rear surface thereof. Such information may be displayed on any one of both surfaces of the TOLED 154, according to a keypad which the user manipulates, or be displayed by converting or rotating its displaying direction.

Figure 28:
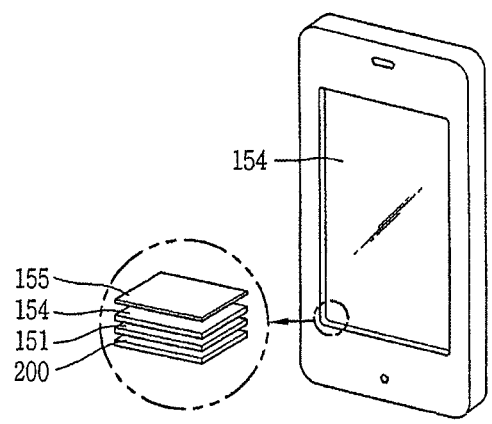
FIG. 28 is an overview showing a configuration of a single display configured by overlapping a TOLED with a non-TOLED.

Next, FIG. 28 is an overview illustrating a configuration of a single display obtained by overlapping a transparent display with a non-transparent display according to an embodiment of the present invention. In this description, a bar-type mobile terminal having such a single display will be described. As shown in FIG. 28, the single display may be configured as a single module in which the TOLED 154 is overlapped with the LCD 151.

Also, a touchpad (or a touch film) 155 may be attached to the upper surface of the module so as to be used as a touch screen. Further, the LCD 151 and TOLED 154 having such a single display may operate as one of a main display or sub display. That is, the LCD 151 and the TOLED 154 may display different information from each other or output the same information, and can make various visual effects according to a method for outputting such information. For example, when a user manipulates and outputs a menu or image, the image or menu can be shown with a cubic effect. In addition, the display may be applied not only to the bar-type mobile terminal but also every type of mobile terminal, such as folder-type, flip-type, slide-type, rotating-type (e.g., swivel-type, swing-type), or the like), or a watch-type.

Figure 29:
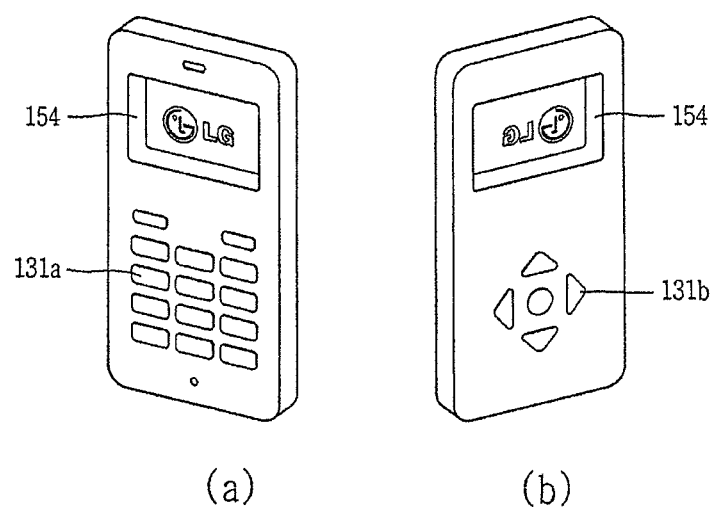
FIG. 29 is an overview of a bar-type mobile terminal having keypads with different functions at both surfaces of the mobile terminal of FIG. 26.

FIG. 29 is an overview of a bar-type mobile terminal having keypads with different functions disposed on both surfaces of the bar type mobile terminal of FIG. 26. As shown in FIG. 29, the mobile terminal is configured to have a first keypad 131a disposed below the TOLED 154 on a front surface of the mobile terminal, and a second keypad 131b disposed below the TOLED 154 on a rear surface of the mobile terminal. Further, information displayed on the TOLED 154 is provided in order to represent that information displayed on the front surface of the TOLED 154 is transmitted and displayed onto the rear surface thereof. Such information may be displayed by converting or rotating its displaying direction according to the user's manipulation.

In addition, the first keypad 131a may have keys for inputting letters and numerals and several short keys for allowing an immediate execution of certain functions. The second keypad 131b may have navigation keys and short keys for allowing an immediate execution of other certain functions. Also, the short keys may be disposed both on the first and second keypads 131a and 131b.

Accordingly, such keys having different functions can be disposed on both of the front and rear surfaces of the mobile terminal such that the keys can be arranged with wider intervals there between, which ensures a simple keypad configuration, thereby preventing key input errors. For example, communication functions can effectively be executed on the surface having the first keypad 131a (e.g., the keypad containing keys for letters and numerals), while various multi-media functions such as playing games can effectively executed on the surface having the second keypad 131b (e.g., the keypad containing navigation keys or function keys).

Watch-Type Mobile Terminal

Figure 30:
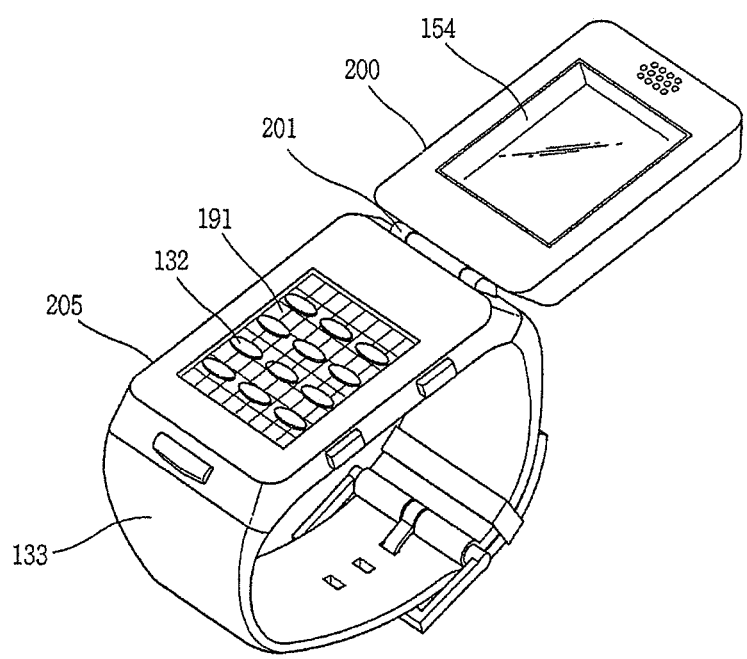
FIG. 30 is an overview of a watch-type mobile terminal having a single TOLED and a solar cell in a rear surface thereof according to an embodiment of the present invention.

FIG. 30 is an overview illustrating a watch-type mobile terminal having a single transparent display and a solar cell on a rear surface thereof according to an embodiment of the present invention. As shown in FIG. 30, the watch-type mobile terminal may include the second body 205 having a watchstrap 133 connected thereto and having a solar cell 191 disposed therein, and the first body 200 connected to one side of the second body 205 by the hinge 201 to be open or closed and having the TOLED 154. The first body 200 may also be referred to as a cover.

In addition, the solar cell 191 is disposed inside the second body 200, and the TOLED 154 is structurally disposed to cover the solar cell 191. The first body 200 having the TOLED 154 may be configured using a sliding unit or the hinge 201 such that one side of the TOLED 154 can be opened or closed with respect to the second body 205. Also, under the closed state of the first body 200, the controller 180 can receive a user's command input via a touchpad disposed on an upper portion (upper surface, upper end, outer side) of the TOLED 154.

In addition, dome keys 132 may be disposed on an upper portion of the solar cell 191. Thus, when the TOLED 154 is opened, the controller 180 can receive a command input by a user using the dome keys 132. The result of the command input using the dome keys 132 can be output on any one of both surfaces of the TOLED 154 according to the control of the controller 180. Further, the solar cell 191 can generate electricity by using light transmitted through the TOLED 154. Also, by arranging the solar cell 191 to receive light transmitted through the TOLED 154, a greater area of the solar cell 191 is ensured, resulting in an increase in an amount of electricity generated.

Figure 31:
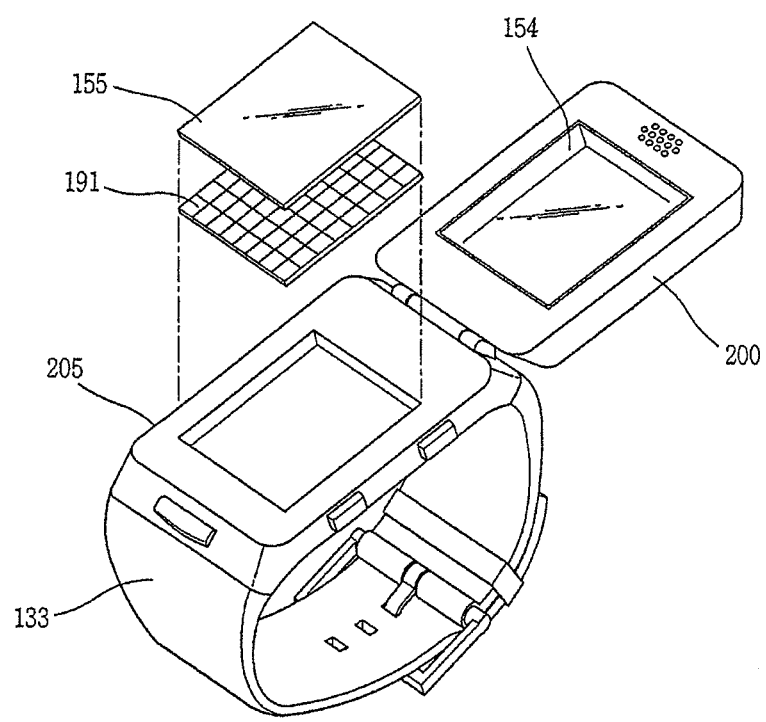
FIG. 31 is an overview of a mobile terminal having a touch pad at an upper surface of the solar cell of FIG. 30.

Next, FIG. 31 is an overview of a mobile terminal having a touchpad on an upper surface of the solar cell of FIG. 30. As shown in FIG. 31, the second body 205 may include the solar cell 191 therein, and a touchpad 155 is disposed on an upper surface of the solar cell 191. Also, the first body 200 having the TOLED 154 may be configured using a sliding unit or the hinge 201 such that at least one side thereof can be opened or closed with respect to the second body 205.

Further, because the solar cell 191 is configured to be structurally covered with the TOLED 154, the solar cell 191 can generate electricity by using light transmitted through the TOLED 154 even in the closed state of the first body 200. In addition, the controller 180 may receive a command input by a user using the touchpad 155 in the open state of the first body 200. The result of the command input using the touchpad 155 can be output on any one of both surfaces of the TOLED 154 according to the control of the controller 180.

Figure 32:
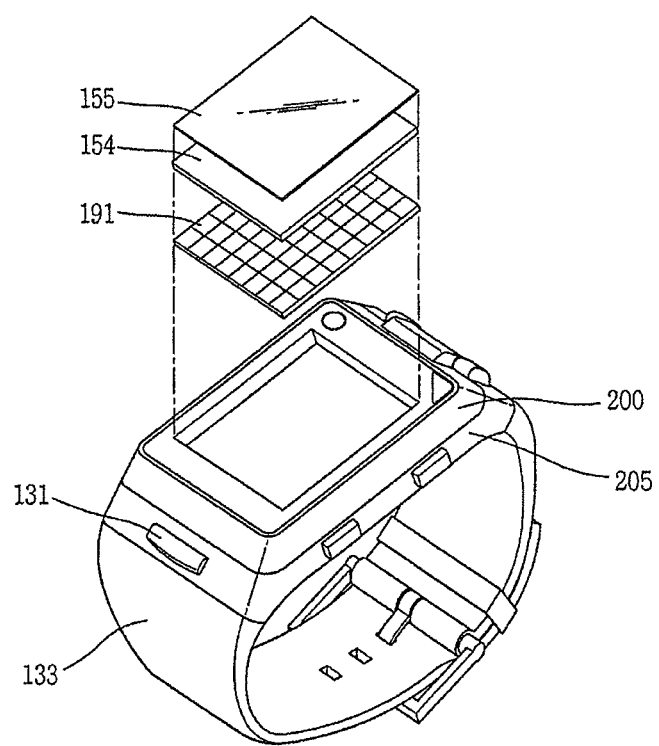
FIG. 32 is an overview of a watch-type mobile terminal having a TOLED according to an embodiment of the present invention, which shows a mobile terminal having a touch pad at an upper surface of the TOLED.

In addition, FIG. 32 is an overview of a watch-type mobile terminal having a transparent display according to an embodiment of the present invention, which shows a mobile terminal having a touchpad on an upper surface of the transparent display. As shown in FIG. 32, the second body 205 may include the solar cell 191 therein, and the first body 200 is overlapped on the second body 205. Further, the first body 200 may include the TOLED 154, which is structurally located on an upper surface of the solar cell 191. The touchpad 155 is also disposed on an upper surface of the TOLED 154.

Therefore, the user can input a command through the touch pad 155 disposed on the upper surface of the TOLED 154. Further, the solar cell 191 can generate electricity using light transmitted through the TOLED 154, regardless of whether or not the TOLED 154 displays information. Also, the amount of transmitted light depends on the transmittance of the TOLED 154, and accordingly the amount of generated electricity may be different. In addition, when the solar cell 191 is configured with black color, the color sensitivity of the TOLED 154 may be effectively improved.

2. Operation of a Mobile Terminal According to an Embodiment of the Present Invention (Manipulation of User Interface (UI))

As mentioned above, a mobile terminal with a single display is configured as a display module in which a transparent display is overlapped with a non-transparent display, and a mobile terminal with a dual display is configured as two display modules in which a transparent display and a non-transparent display are separately disposed.

Further, the folder-type mobile terminal is a representative type of mobile terminal configured to have the dual display. The folder-type mobile terminal can display independent information on each display in cooperation with the opening or closing of a folding portion, or display several information associated with each other by overlapping each display. When displaying such information associated with each other by overlapping each display, a new visual effect can be generated.

Next, the operations and functions of a mobile terminal having the single display configured by overlapping a transparent display with a non-transparent display will be described according to embodiments of the present invention. Further, the operations and functions may be applied to all aforementioned types of mobile terminals (e.g., flip-type, folder-type, bar-type, slide-type, swivel-type and watch-type), etc.

A detailed description will now be given of a display controlling method according to operational states of a mobile terminal having a transparent display according to an embodiment of the present invention, a power saving method, and a display controlling method in connection with a specific function (e.g., a camera function) provided in the mobile terminal.

Screen Displaying Method of the Mobile Terminal with Transparent Display

A method for displaying a screen in a mobile terminal with a transparent display according to an embodiment of the present invention may be divided into a displaying method of the LCD 151 and the TOLED 154, a controlling method related to a touching operation, and a controlling method related to a displaying operation.

Displaying Method of the LCD and TOLED

Next a description will be given of a method in which a user executes a photo album function and selects one image in the album to thereby display the selected image on a preview screen or link the image with another function according to an embodiment of the present invention. Also, in the method, the LCD 151 and the TOLED 154 are defined respectively as a main display and a sub display, and information to be displayed on each display is also classified, so as to provide a cubic effect.

Figure 33:
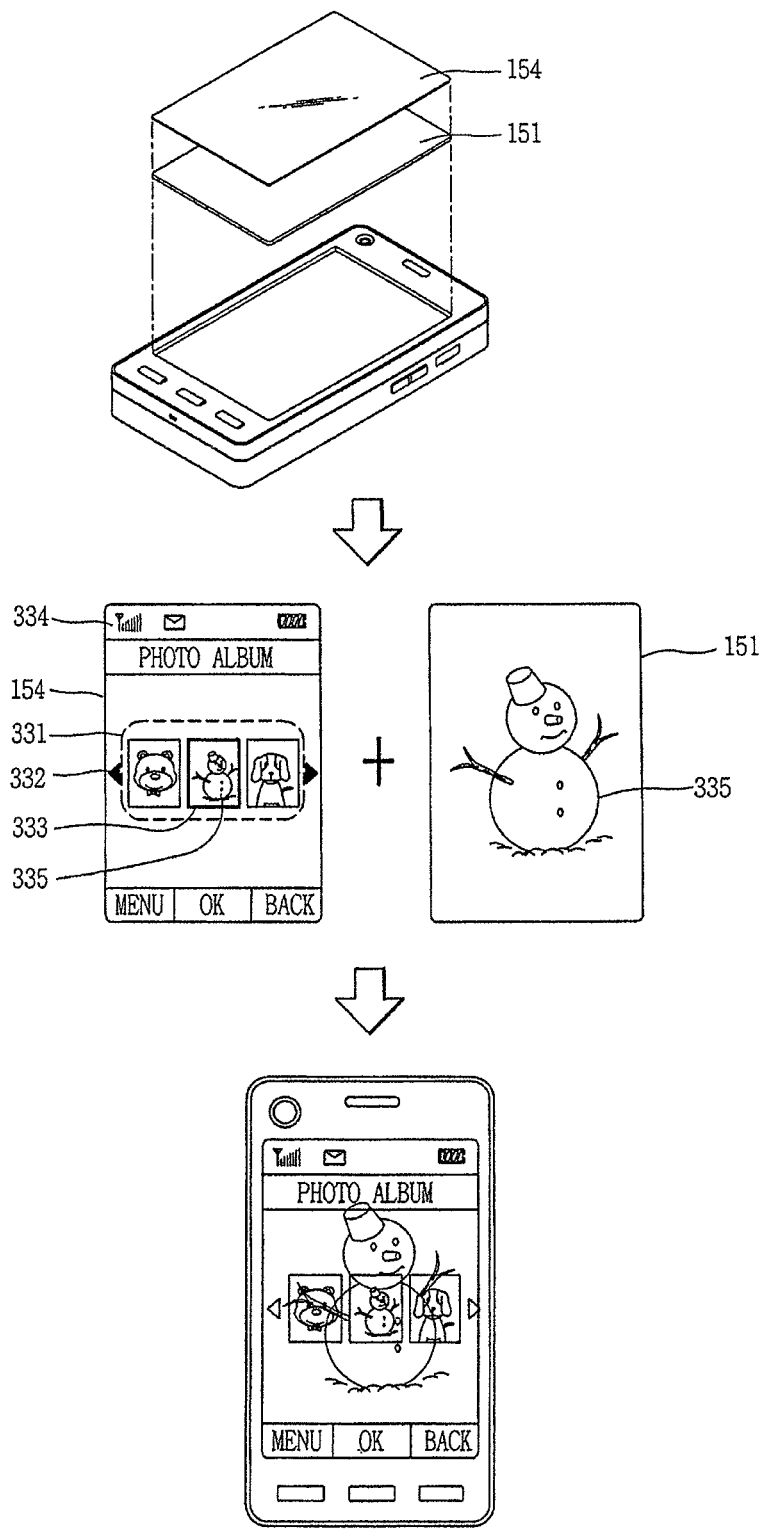
FIGS. 33 to 38 are overviews showing a method for controlling a display of a mobile terminal which has a single TOLED according to an embodiment of the present invention.
Figure 34:
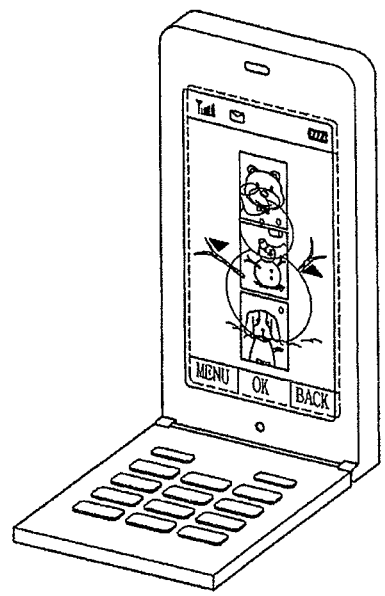
Figure 35:
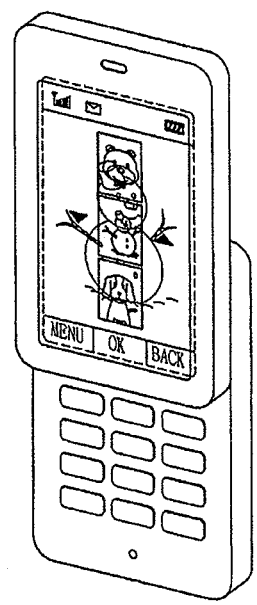
Figure 36:
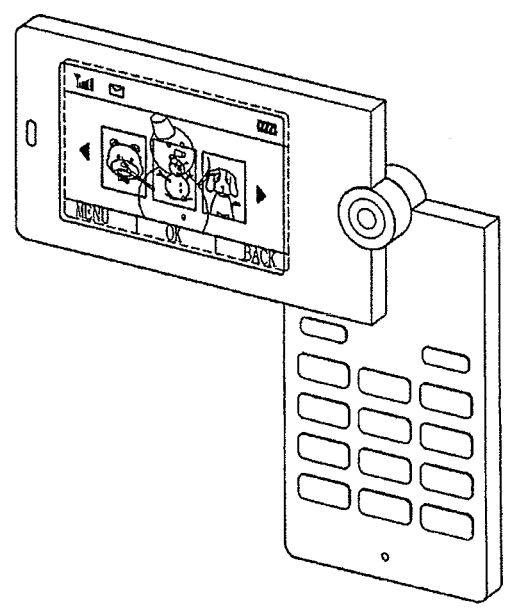
Figure 37:
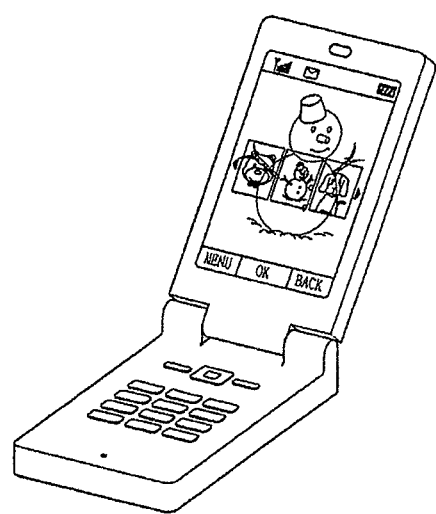
Figure 38:
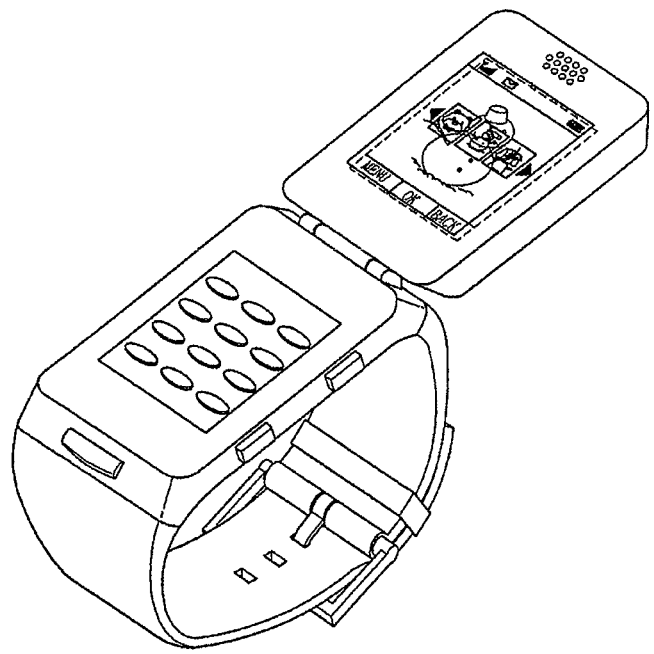

FIGS. 33 to 38 are overviews for illustrating a displaying control method of a mobile terminal having a single transparent display according to an embodiment of the present invention, and particularly, illustrating a displaying control method of the LCD 151 and TOLED 154 when a photo album function is executed. In more detail, Next, a method for controlling a display provided at each type of mobile terminal will be described representatively with respect to the bar-type mobile terminal shown in FIG. 33. As shown in FIG. 33, a display disposed on each type of mobile terminal is configured by overlapping the TOLED 154 and the LCD 151. Further, the controller 180 may display a screen for executing or activating a photo album on the TOLED 154. Also, an indicator 334 for indicating an operational state of the mobile terminal may also be displayed. The screen for executing the photo album may include images 331, navigation keys 332 (hereinafter, referred to as 'software navigation keys') for moving the images 331, and a cursor 333 for selecting one of the images 331.

Also, a user can select one (e.g., image 335) of the images 331 displayed on the photo album execution screen. Further, the controller 180 can display the selected image 335 on the LCD 151 as a preview image. The controller 180 can also change the selected image 335 into an image for an idle screen of the LCD 151. FIGS. 34-38 illustrate the selected image being displayed in different configurations and on different types of mobile terminals.

In addition, the controller 180 can support an animation effect that the selected image is first dropped and then unfolded. Also, because the TOLED 154 has transmittance, even in the state of the photo album execution screen being displayed on the TOLED 154, the user can view the idle screen image set for the LCD 151. On the other hand, when the TOLED 154 is displayable on both of its surfaces, the same operation as aforementioned can be executed by controlling each front and rear surface of the TOLED 154 other than the LCD 151. In addition, a component which controls the displaying operations of the LCD 151 and TOLED 154 according to an embodiment of the present invention may be a multimedia processor or a separate processor having a control function.

Also, the controller 180 can move the object between the TOLED 154 and the LCD 151 based on a double touch operation. For example, the user can touch an object displayed on the TOLED 154 and then touch a portion of the LCD 151. Then, upon receiving a signal corresponding to the double touch operation, the controller 180 moves the object displayed on the TOLED 154 to the LCD 151 are where the user touched the LCD 151. The user can also move the object displayed on the LCD 151 to the TOLED 154 using the reverse procedure. The controller 180 can also automatically move the displayed object between the first and second displays (i.e., the TOLED 154 and the LCD 151) when there is insufficient area on a particular display (i.e., the TOLED 154 and the LCD 151).

Hereinafter, a description will be given of operations of a mobile terminal separately having the transparent display and the non-transparent display in the following embodiments. In addition, the operations of the mobile terminal having the dual display may be applied to all aforementioned types of mobile terminals (e.g., flip-type, folder-type, bar-type, slide-type, swivel-type and watch-type, etc.).

FIGS. 39 to 44 are overviews illustrating a method for controlling a display of a mobile terminal having a transparent display according to an embodiment of the present invention, which shows a method for controlling the LCD 151 and TOLED 154 when executing a photo album function in a mobile terminal having a dual display. In more detail, FIGS. 39 to 44 respectively show a folder-type mobile terminal, a swivel-type mobile terminal, flip-type mobile terminal, slide-type mobile terminal, bar-type mobile terminal, and watch-type mobile terminal.

Figure 39:
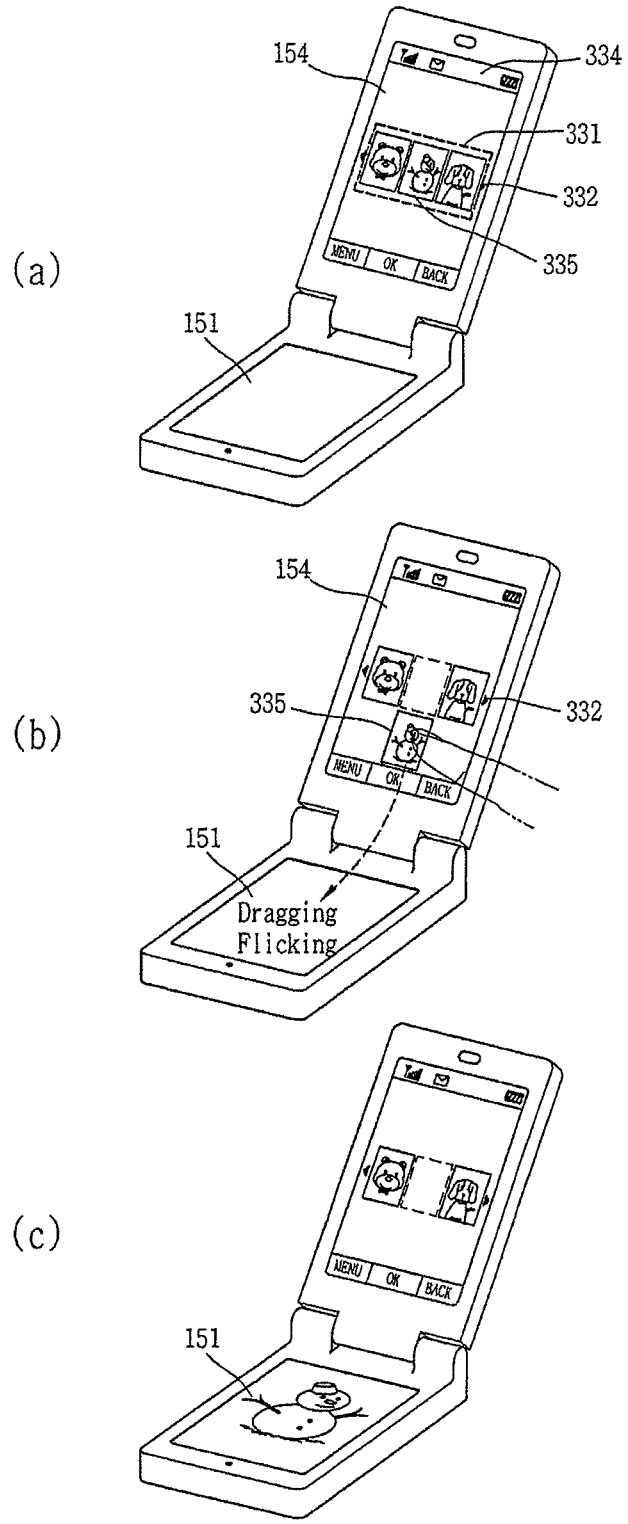

Next, a method for controlling a display provided at each type of mobile terminal will be described representatively with reference to a folder-type mobile terminal shown in FIG. 39. As shown in FIG. 39, in the mobile terminal having the TOLED 154 and LCD 151 separately provided, the controller 180 can display a screen for executing a photo album on the TOLED 154. In addition, the controller 180 may display on the TOLED 154 the images 331, the software navigation keys 332, and the cursor 333 for selecting one of the images 331. The indicator 334 for indicating an operational state of the mobile terminal may also be displayed on the TOLED 154 as shown in FIG. 39.

In addition, the user can select one image (e.g., image 335) of the images 331 displayed on the screen for activating the photo album (see FIG. 39(*a*)), and drag or flick the selected image 335 in a direction from the TOLED 154 to the LCD 151 (see FIG. 39(*b*)). Accordingly, the controller 180 can display the dragged or flicked image 335 on the LCD 151 as a preview image (see FIG. 39(*c*)). Also, the controller 180 can change the selected image 335 to be an idle screen image of the LCD 151. In addition, the controller 180 can provide an animation effect that the selected image 335 is moved onto the LCD 151 to be then unfolded. FIGS. 40-44 illustrate the touching and dragging (or flicking) operation being performed on different types of mobile terminals.

Also, one embodiment of the present invention may separately provide a function key (hereinafter referred to as a screen switching function key) for switching contents respectively displayed on the TOLED 154 and the LCD 151. The screen switching function key may have a toggling function. Also, the screen switching function key may be configured as a software key (or an execution icon) at one side (e.g., an indicator region or the like) of the TOLED 154 or be provided as a hardware key.

Upon selecting the screen switching function key, the controller 180 can change an icon shape of the screen switching function key, and simultaneously switch contents respectively displayed on the TOLED 154 and the LCD 151. That is, the controller 180 can indicate that the screen switching function key has been selected. Afterwards, when the screen switching function key is selected again, the controller 180 converts the screen switching function key into its original shape, and then switches one more time the contents respectively displayed on the TOLED 154 and the LCD 151.

A Method for Controlling a Touching Operation on the LCD and TOLED

The method for controlling the touching operation depends on overlapped states between the LCD 151 and the TOLED 154, including a completely overlapped state, a partially overlapped state and a completely separated state. The mobile terminal having the transparent display according to an embodiment of the present invention uses different touching operations according to the overlapped states between the LCD 151 and the TOLED 154.

Figure 45:
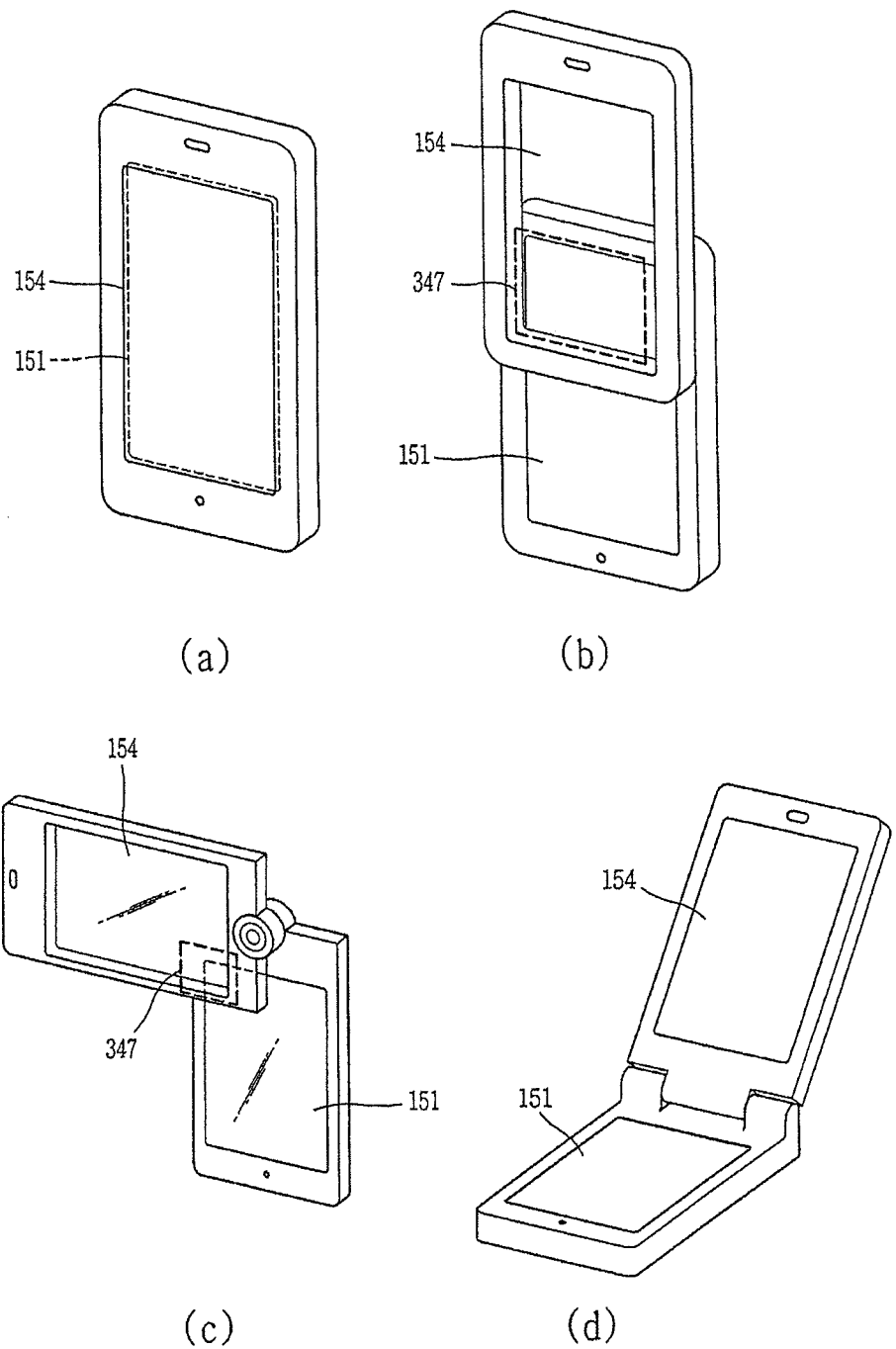
FIG. 45 is an overview of a mobile terminal having a dual TOLED according to an embodiment of the present invention, which shows a method for controlling displays according to an overlapped state between the displays.

FIG. 45 is an overview of a mobile terminal having a dual transparent display according to an embodiment of the present invention, which shows a method for controlling displays according to an overlapped state between the displays. Here, examples will be shown having a completely overlapped state (a), a partially overlapped state (b and c) and a completely separated state (d) between the LCD 151 and the TOLED 154.

Complete Overlapped State between the LCD and TOLED

Figure 46B:
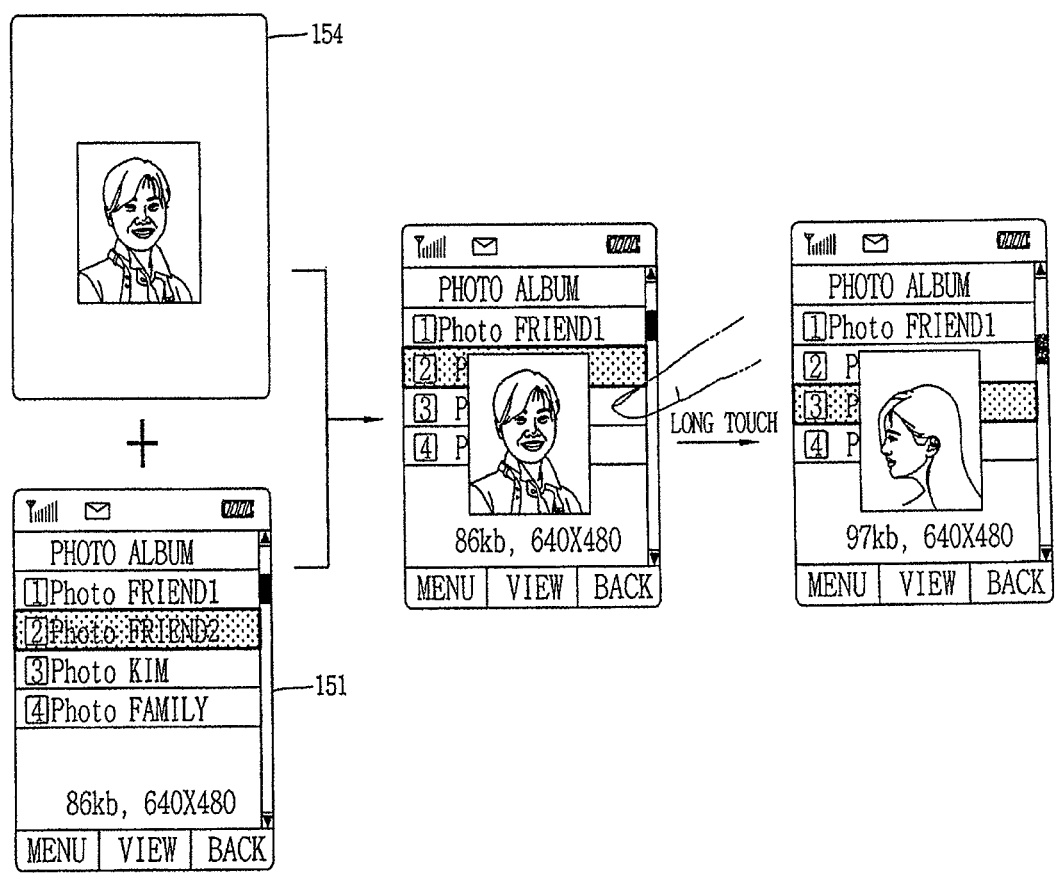

FIGS. 46A to 46C are overviews illustrating a method for controlling a touching operation in the completely overlapped state between each display shown in FIG. 45(*a*). Hereinafter, a touching operation sensed in the state that the TOLED 154 is completely overlapped on the LCD 151 will be described by being divided into a touch (or proximity-touch) operation, long touch operation, long touch-and-drag operation, and the like.

First, as shown in FIG. 46A, upon selecting a photo album function by a user, the controller 180 displays an image list on the LCD 151. Afterwards, when a touch (real touch) or proximity-touch is sensed from the exterior, the controller 180 selects an image corresponding to the corresponding touched point 341. Further, the controller 180 carries the selected image from the LCD 151 onto the TOLED 154 so as to display the selected image on the TOLED 154.

The mobile terminal according to an embodiment of the present invention may have various sensors for performing different sensing functions, and may further have a proximity sensor or tactile sensor provided in the sensing unit 140 for sensing the proximity-touch. As shown in FIG. 46B, if the external touch sensed is a long touch (e.g., a touch lasted for at least two or three seconds), the controller 180 runs or executes the selected image and displays it on the TOLED 154. The long touch may also be used when selectively moving a desired object among objects displayed on the LCD 151 to the TOLED 154. In addition, when the TOLED 154 is displaying many unnecessary objects, a certain touch input may be made to move objects from the TOLED 154 to the LCD 151 for display.

If a dragging operation or action is also sensed together with the long touch from the exterior, the controller 180 may display a preview screen for an image selected by the long touch on the TOLED 154 as shown in FIG. 46C. Afterwards, a selection cursor (or selection bar) 342 of the LCD 151 is moved by the dragging action, and a selected image by the selection cursor 342 is then displayed on the preview screen. After the external touch is not sensed any more, an initial image selected by the long touch action is displayed. The touching operation (i.e., long touch+drag) of FIG. 46C may equally be applied to the case of sensing a sliding (e.g., an operation of proximity-touch corresponding to the dragging) together with a long proximity touch (e.g., proximity touch lasted for at least two or three seconds) from the exterior. Also, upon sensing any touching operation other than the above-mentioned ones, the controller 180 can operate as done in a general method of controlling a touching operation.

In addition, the method for controlling the touching operation in the completely overlapped state may be applied to all types of mobile terminals having the single display (e.g., folder-type, flip-type, slide-type, rotating-type (e.g., swivel-type or swing-type), bar-type, watch-type and the like all having the single display).

Partially Overlapped State between the LCD and TOLED

Figure 47A:
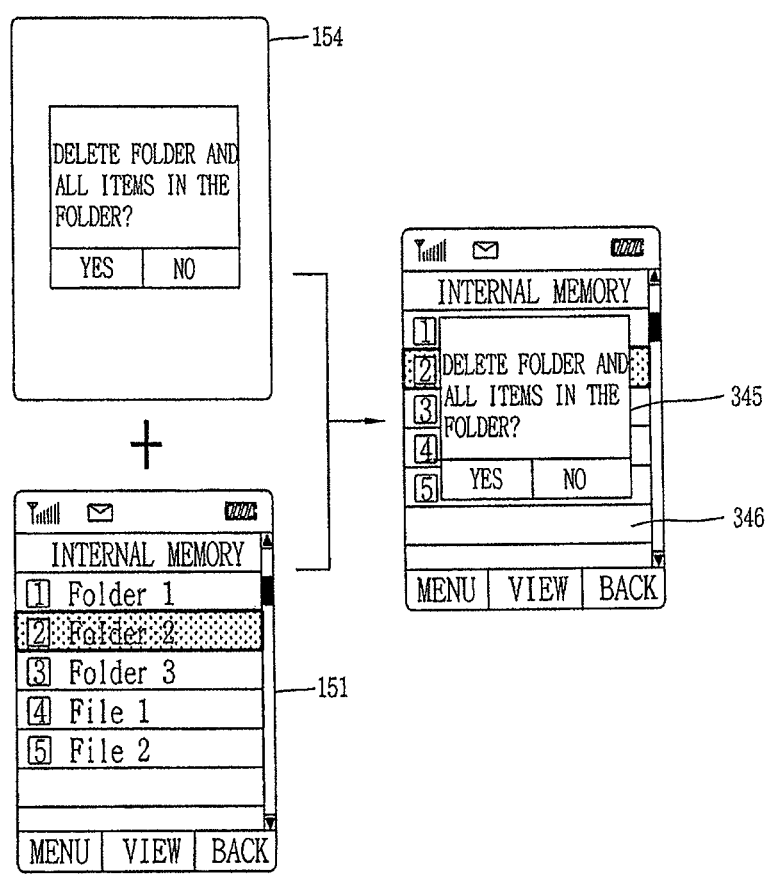
FIGS. 47A and 47B are overviews showing a method for controlling a touching operation under the state that the displays of FIG. 45 are partially overlapped with each other.
Figure 47B:
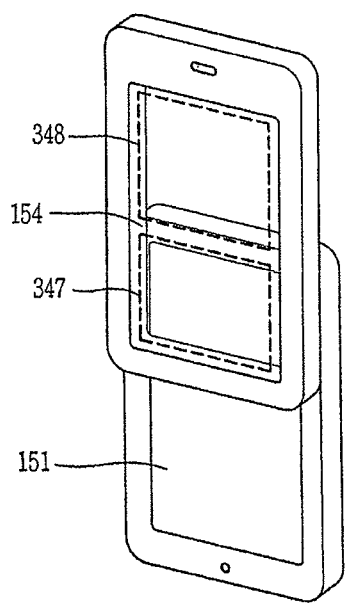

FIGS. 47A and 47B are overviews illustrating a method for controlling a touching operation in a partially overlapped state between each display. Hereinafter, a touching operation sensed in the partially overlapped state will be described by dividing the operation into a touch (or proximity-touch) operation, long touch operation, long touch-and-drag operation, and touch-and-drag operation.

FIG. 47A is an overview illustrating a pop-up selection window region of the TOLED 154. As shown in FIG. 47A, the controller 180 senses an external touch (real touch) or external proximity-touch. Upon sensing the touch, the controller 180 detects a touched point. That is, the controller 180 detects whether a pop-up selection window region has been touched or another region excluding the pop-up selection window has been touched, and thereafter performs a different processing according to the detected touched point.

For example, when a touch is sensed on the pop-up selection window region, the controller 180 may select a certain object (e.g., menu list, execution icon, or the like) and perform the function of the selected object. If the touch is sensed from the other region excluding the pop-up selection window, then the controller 180 may take no action or close or cancel the pop-up selection window.

FIG. 47B shows an overlapped region 347 and a non-overlapped region 348. As shown in FIG. 47B, if a long touch is sensed from the exterior, the controller 180 may perform a different processing depending on whether the touch is sensed on the non-overlapped region 348 or on the overlapped region 347. For example, when a touch is sensed on the non-overlapped region 348, the controller 180 may select a certain object (e.g., menu list, execution icon, or the like) and perform the function of the selected object. If a touch is sensed on the overlapped region 347, the controller 180 may apply the same method of controlling the touching operation as applied in the completely overlapped state.

Also, if a sliding of a proximity-touch is sensed together with the long proximity-touch from the exterior, the processing may be the same as that for the touching operation (i.e., long touch & drag). In addition, when a dragging is sensed together with a real touch from the exterior, the controller 180 may equally apply a method for controlling a touching operation in a separated state between the LCD 151 and the TOLED 154 which will be explained later. Even when a proximity-touch and a sliding of proximity-touch are sensed from the exterior, the controller 180 may equally apply the method for controlling the touching operation in the separated state between the LCD 151 and the TOLED 154.

As mentioned above, the method for controlling the touching operation in the partially overlapped state between the LCD 151 and the TOLED 154 can be applied to mobile terminals having a dual display (e.g., an open state of a slide-type mobile terminal, an open state of a rotating-type (e.g., swivel or swing type) mobile terminal and the like).

Completely Separated State between the LCD and TOLED

Hereinafter, a description will be given of a touching operation sensed in the completely separated state between the LCD 151 and TOLED 154 by being divided into a touch (or proximity-touch) operation, a long touch operation, a long touch-and-drag operation, and the like. Thus, when a real touch (or proximity-touch) or long touch is sensed from the exterior, the controller 180 may select a certain object (e.g., menu list or execution icon) located at the corresponding touched point of the TOLED 154 and perform the function of the selected object.

If a dragging action is sensed together with the real touch from the exterior, the controller 180 may select or move the touch-selected object (e.g., menu list or execution icon) and perform the function of the selected object. For example, the TOLED 154 is allowed to display copied contents (or contents in a clipboard), and such contents are attached onto the LCD 151 by the aforementioned operation (i.e., touch-and-drag action).

As another example, such operation (i.e., touch & drag) is performed to move the object displayed on the TOLED 154 onto the LCD 151. As still another example, such operation (i.e., touch & drag) is performed to enlarge (or reduce) a webpage on the LCD 151, to thusly be displayed on the TOLED 154. Further, a scroll operation may also be available. Also, when a touching operation other than the above-mentioned operations is sensed, the controller 180 may operate the same as done in the general method of controlling a touching operation.

As mentioned above, the method for controlling the touching operation in the separated state between the LCD 151 and the TOLED 154 can be applied to mobile terminals having a dual display (e.g., an open state of a folder type mobile terminal, an open state of a flip type mobile terminal, an open state of a bar type mobile terminal, an open state of a watch type mobile terminal and the like).

Control Method Related to Setting of the LCD and TOLED

One embodiment of the present invention may be configured to generate a separate vibration feedback or sound feedback according to which one of the LCD 151 and TOLED 154 is manipulated. Thus, by differently setting the vibration feedback or sound feedback for the LCD 151 or TOLED 154, it is possible to recognize which display (LCD 151 or TOLED 154) a user has manipulated. For example, in the completely (or partially) overlapped state between the LCD 151 and the TOLED 154, if a user's touch (e.g., a real touch or long touch) is sensed, the controller 180 controls the operation of the LCD 151 or TOLED 154 according to the type of touch input (or according to a user's purpose). Also, the controller 180 may generate different vibration or sound feedbacks when controlling the operation of the LCD 151 and the TOLED 154.

Also, one embodiment of the present invention is configured such that a transmittance, color or brightness of the TOLED 154 can be set according to peripheral circumstances. In order to prevent information displayed on the TOLED 154 from being obscured due to a background reflected on the TOLED 154, the color or brightness of the TOLED 154 can also be controlled according to the peripheral circumstances.

Furthermore, when providing a camera or solar cell at a rear surface of the TOLED 154, in order to solve a problem that the operation of the camera or solar cell is affected by information displayed on the TOLED 154 or transmittance thereof, the transmittance can selectively be controlled with respect to a certain region of the TOLED 154. In addition, the vibration (or sound) feedback related to the TOLED 154 and the control of the transparency, color or brightness of the TOLED 154 according to the peripheral circumstances may automatically be performed by the controller 180 based upon a preset algorithm, or directly be set by a user through an environment setup option.

Concepts of Main/Sub window of the LCD and TOLED

As discussed above, the present invention can operate displays such that the LCD 151 and the TOLED 154 can operate as a main window (or first window) and a sub window (or second window). For better understanding of a displaying method employing such concepts of the main/sub windows, an Internet browsing method will be described as one example. Further, the main and sub windows may be applied to a mobile terminal having a dual display (e.g., folder-type, slide-type, rotating-type (e.g., swivel-type, swing-type), watch-type or the like).

Figure 48:
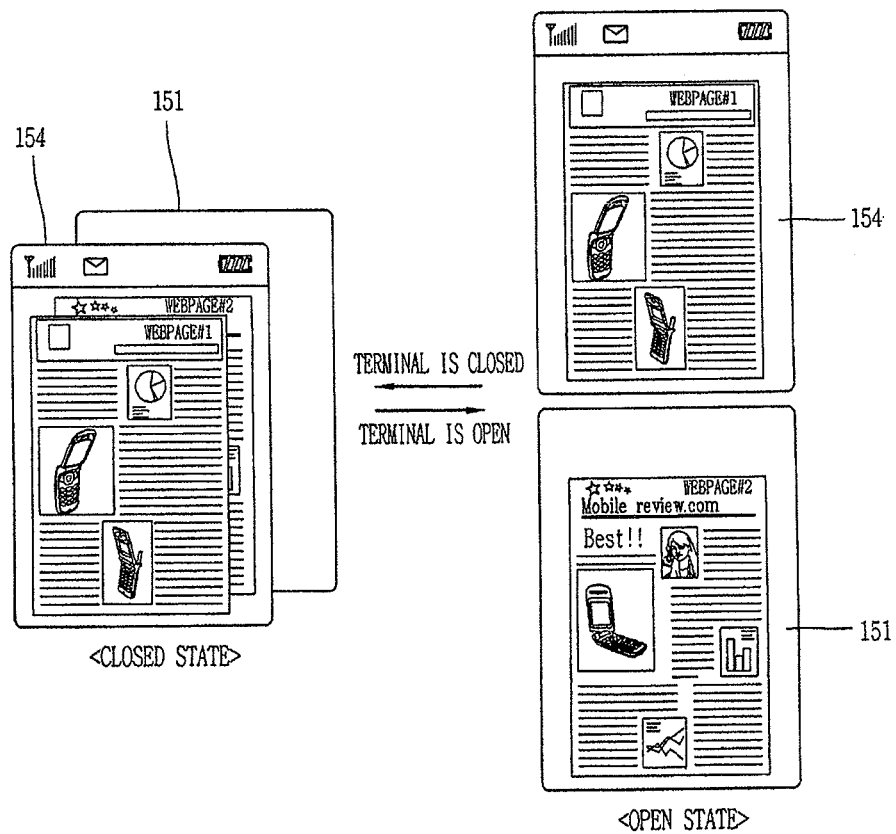
FIG. 48 is an overview showing a web browsing method for describing a main/sub window operation method in a mobile terminal according to an embodiment of the present invention.

FIG. 48 is an overview of a web browsing method for showing a method of operating main and sub windows in a mobile terminal according to an embodiment of the present invention. As shown in FIG. 48, a webpage (e.g., a main webpage) first opened when executing a web browser may be displayed on a main window (e.g., the TOLED 154), and a webpage or pop-up page linked to the first-opened webpage may be displayed on a sub window (e.g., the LCD 151).

Such web pages displayed on the main or sub windows may be displayed in an opposite window according to the environment setup option. Alternatively, when using any one of two displays provided in the mobile terminal, a webpage displayed on a display (e.g., sub window) disposed at a lower side of the mobile terminal may be moved to a display (e.g., main window) disposed at an upper side of the mobile terminal, thereby being displayed on the moved display. For example, upon closing the mobile terminal, a webpage displayed on a sub window may be moved to and displayed a main window.

Figure 49A:
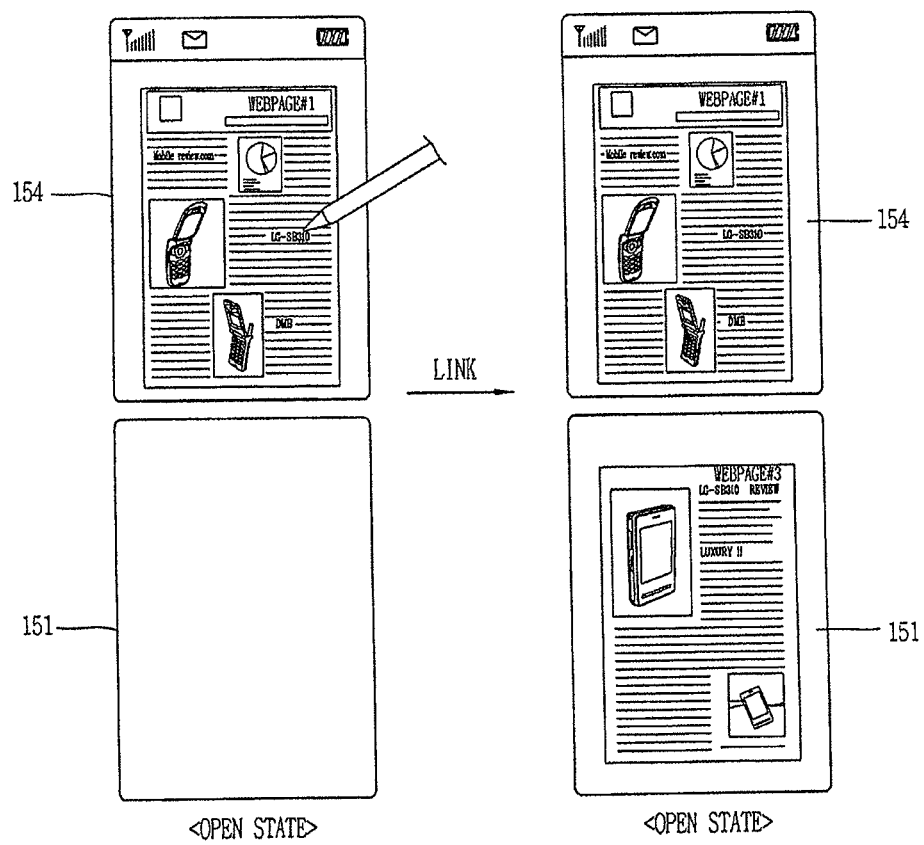
FIGS. 49A and 49B are overviews showing a method for displaying a webpage in cooperation with a main/sub window operation method in a mobile terminal according to an embodiment of the present invention.
Figure 49B:
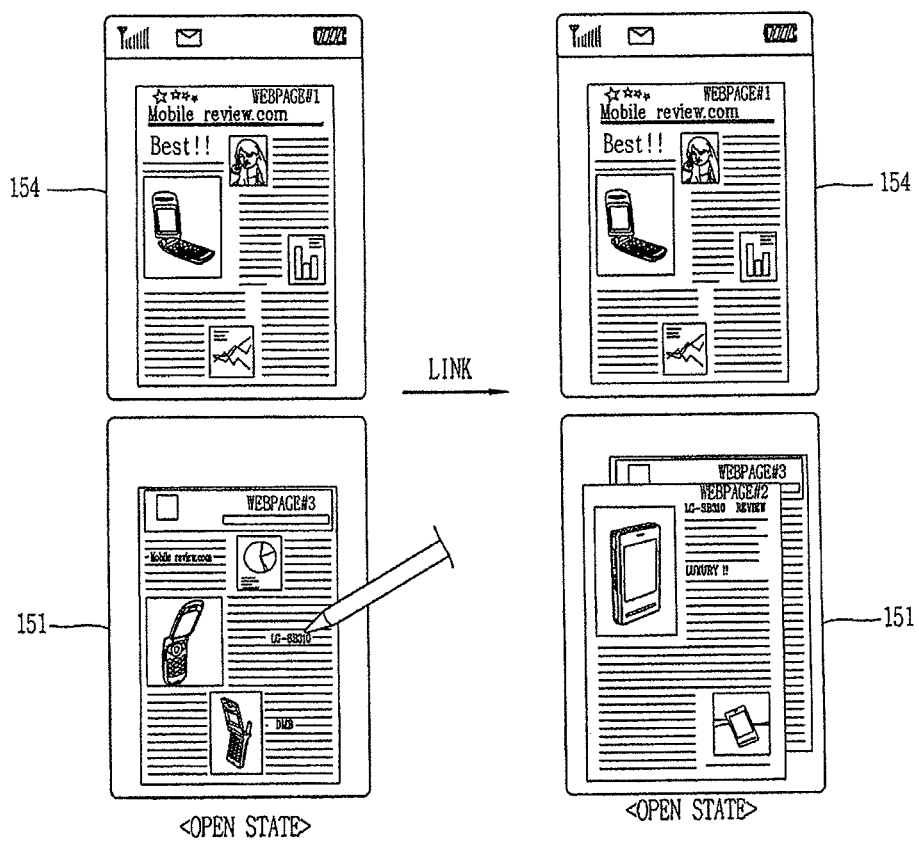

FIGS. 49A and 49B are overviews illustrating a method for displaying a webpage according to a method of operating main and sub windows in a mobile terminal according to an embodiment of the present invention. As shown in FIG. 49A, if a certain text (or certain object) on a webpage #1 displayed on a main window (e.g., the TOLED 154) is selected by a user's touch input (or proximity-touch), the controller 180 may display a webpage (e.g., webpage #3) linked to the text on a sub window (e.g., the LCD 151).

In the state that the sub window (e.g., the LCD 151) is displaying the webpage #3, as shown in FIG. 49B, if a certain text (or object) on the webpage #3 is selected, the controller 180 may display a webpage (e.g., webpage #2) linked to the selected text on the sub window (e.g., the LCD 151), as well as the webpage #3. Further, the main and sub windows may be converted by a user's selection, and also contents displayed on each window may be converted.

In addition, if the user's input is a proximity-touch and touch is sensed on a certain content (e.g., text, English word, image, video, flash or the like) displayed on a main window (e.g., the TOLED 154), the controller 180 may display information related to the corresponding content on a sub window (e.g., the LCD 151). Also, if the proximity distance sensed becomes farther away, the sub window can return to its initial state.

Display Control according to an Open/Closing Operation of the Mobile Terminal

An open/closing operation of a mobile terminal denotes an opening or closing of the mobile terminal, namely, an operation of folding, sliding or rotating (swiveling or swinging) one body of a mobile terminal having at least two bodies, such as folder-type mobile terminal, flip-type mobile terminal, slide-type mobile terminal, rotating-type (swivel or swing-type) mobile terminal, watch-type mobile terminal or the like.

Figure 50A:
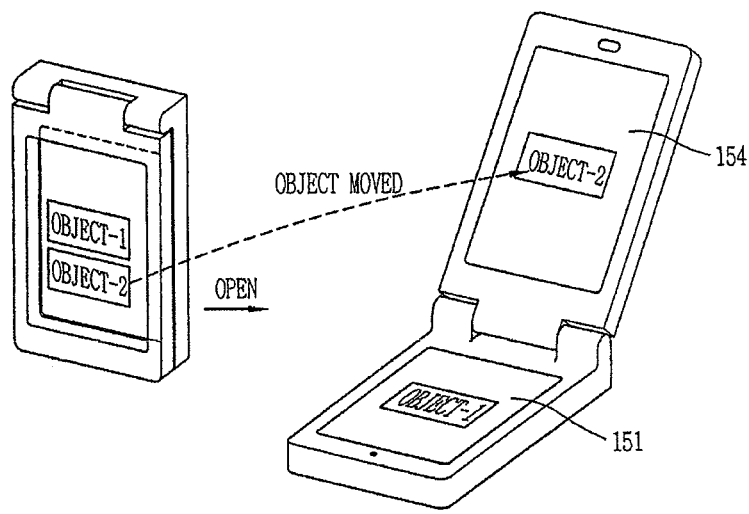
FIGS. 50A and 50B are overviews showing a method for moving a displayed object in cooperation with an open/closing operation of a mobile terminal having a dual TOLED according to an embodiment of the present invention.
Figure 50B:
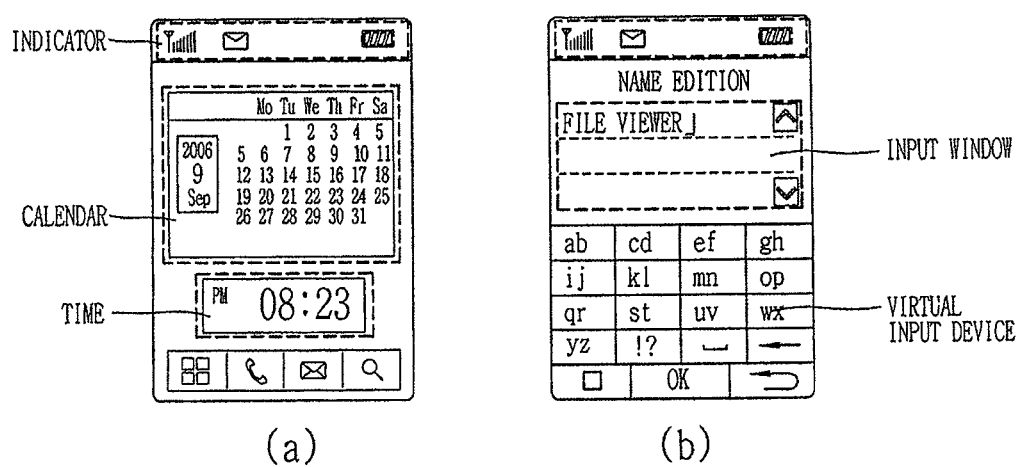

FIGS. 50A and 50B are overviews illustrating a method for moving a displayed object in cooperation with an opening/closing operation of a mobile terminal having a dual transparent display according to an embodiment of the present invention. Upon closing a mobile terminal having the LCD 151 and TOLED 154, information (or objects) displayed on each of the displays are overlapped with each other. Such overlapped information is then displayed on any one of the two displays. Hereinafter, a display having the overlapped information displayed thereon is referred to as 'main display'.

When the mobile terminal is open, the controller 180 moves and displays a part of object displayed on the main display (e.g., the LCD 151) onto a sub display (e.g., the TOLED 154). As such, an object which is moved to each display for display in cooperation with the opening/closing of the mobile terminal is referred to as 'moving object'. The moving object may include an indicator, clock and calendar, as shown in FIG. 50B(a), and further include background memo, multitasking menu, input window and the like.

As shown in FIG. 62B(b), when being displayed on a sub display, an object such as a virtual input unit or device (e.g., keypad or wheel) may be overlapped with other objects on a main display, causing inconvenience of input. Thus, such object is preferably displayed on the main display. That is, the input window is small in size and difficult to be recognized at a glance, and thus it is displayed on the sub display in greater size. The positions of the virtual input device and the input window may be changed to each other for display.

Figure 51A:
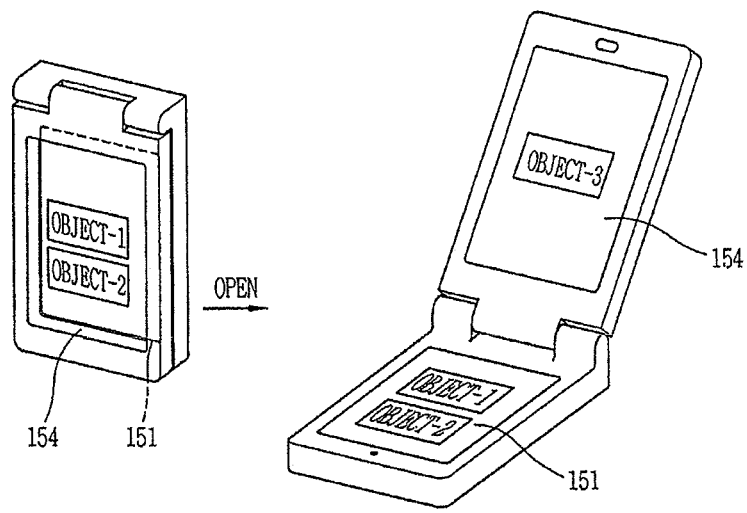
FIGS. 51A and 51B are overviews showing a method for generating a displayed object in cooperation with an open/closing operation of a mobile terminal having a dual TOLED according to an embodiment of the present invention.
Figure 51B:
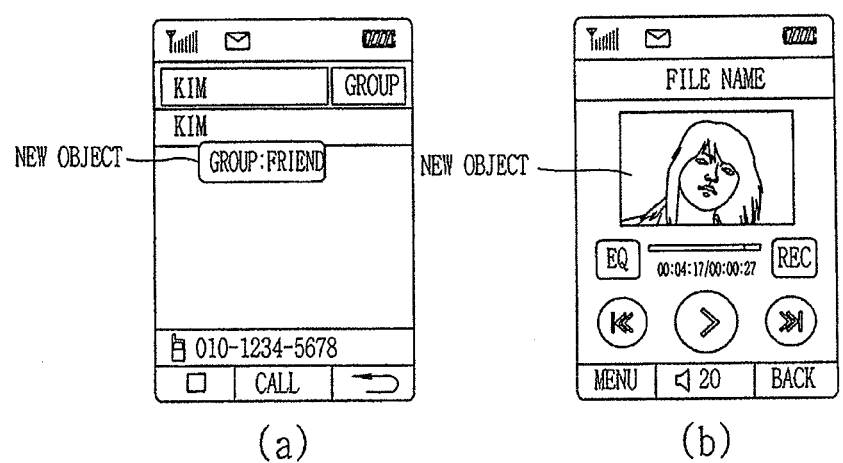
Figure 52:
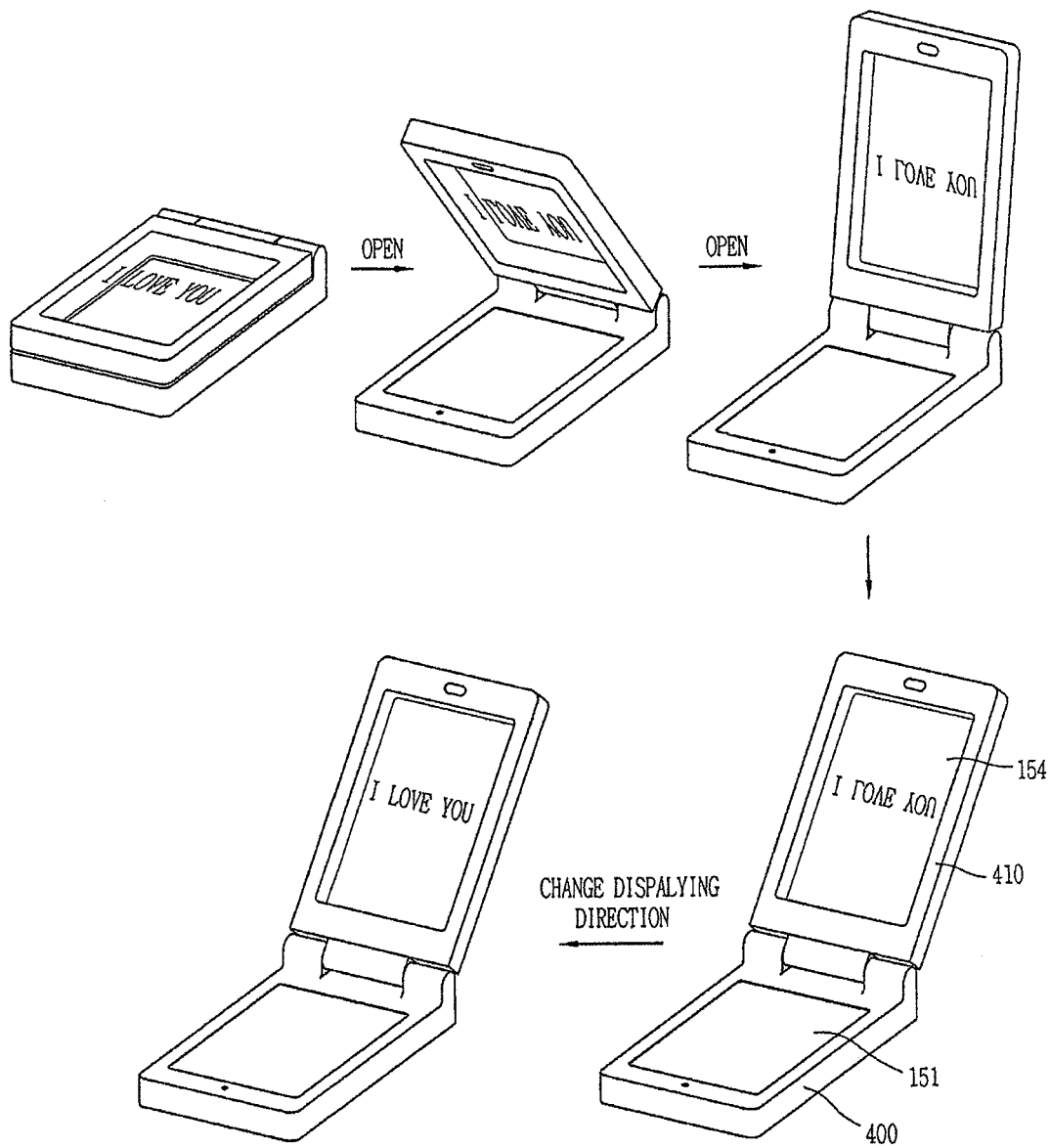
FIGS. 52 and 53 are overviews showing a method for changing an information displaying direction in a mobile terminal having a dual TOLED according to an embodiment of the present invention.
Figure 53:
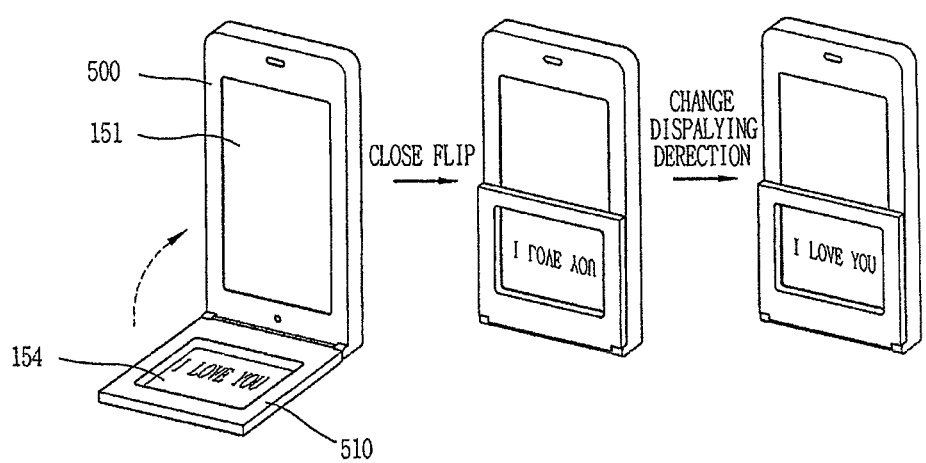
Figure 54:
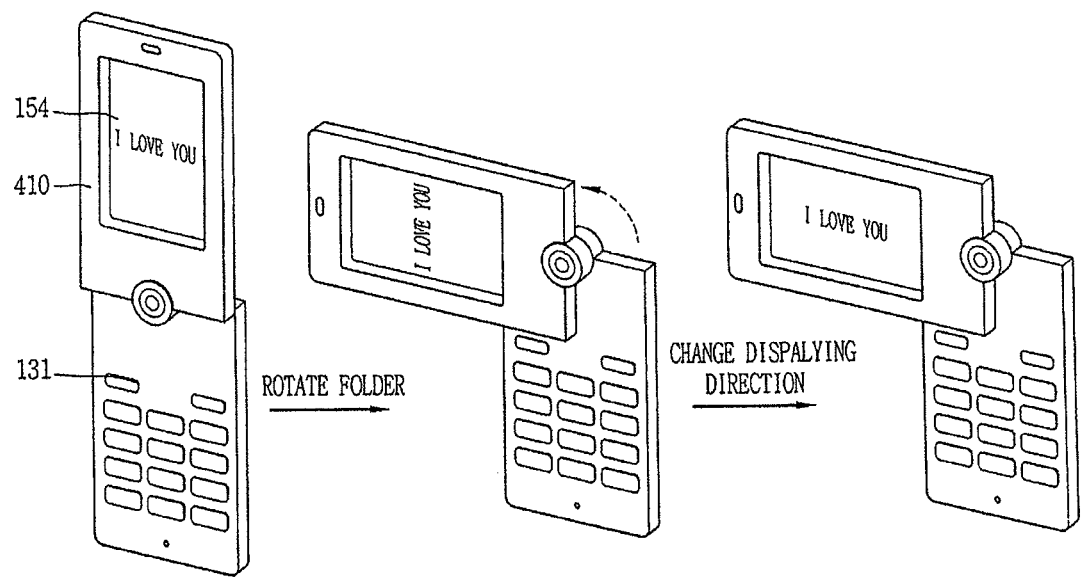
FIGS. 54 and 55 are overviews showing a method for changing an information displaying direction in a mobile terminal having a single TOLED according to an embodiment of the present invention.
Figure 55:
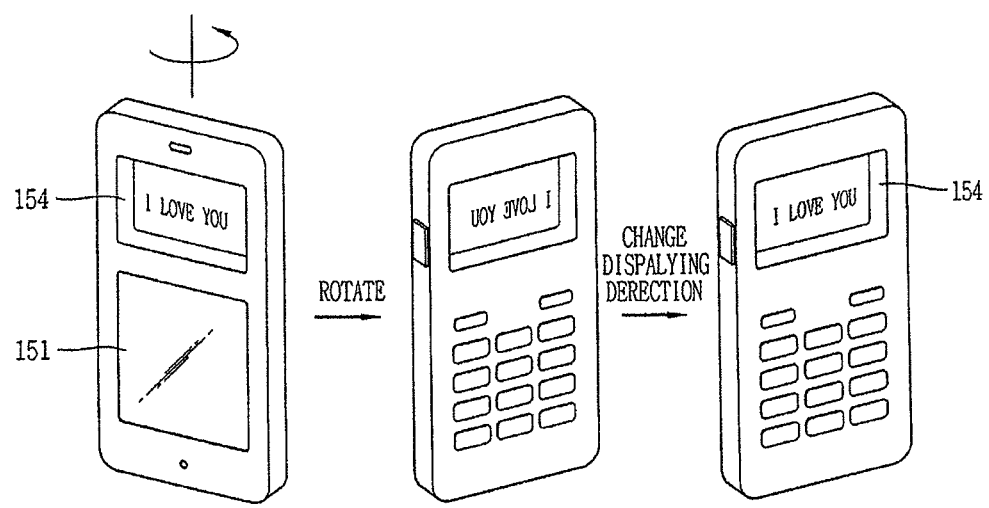

Next, FIGS. 51A and 51B are overviews illustrating a method for generating a displayed object in cooperation with an opening/closing of a mobile terminal having a dual transparent display according to an embodiment of the present invention. As shown in FIG. 51A, upon opening the mobile terminal, an object may be newly generated on a sub display (e.g., the TOLED 154). Such object is referred to as a new object. The new object is not displayed, for example, due to the lack of displaying space when two displays are overlapped with each other.

Then, when the two displays are separated after the mobile terminal is opened, the new object may further be displayed on a sub display (e.g., the TOLED 154). For example, as shown in FIG. 51B, such new objects may include detailed information (additional information) related to specific information, a sub menu for a specific list or multimedia player.

Change in Information Displaying Direction on Screen of Mobile Terminal

A mobile terminal having a transparent display according to an embodiment of the present invention may be configured such that information displayed on a display can be reversed (or rotated) suitable for a user's eye in cooperation with an opening/closing of the mobile terminal (or rotating operation thereof) so as to be displayed. FIGS. 52 to 55 are overviews illustrating a method for changing an information displaying direction in a mobile terminal having a transparent display according to an embodiment of the present invention, which respectively show a folder-type mobile terminal, flip-type mobile terminal, rotating-type (swivel-type or swing-type) mobile terminal and bar-type mobile terminal.

Each type of mobile terminal is configured such that information displayed on a display can be rotated or reversed suitable for a position (pose, posture) of the mobile terminal according to the same method. For example, the controller 180 senses when the folding portion 410 or flip portion 510 starts to be opened. When the folding portion 410 is opened by more than a certain angle, the controller 180 rotates or reverses information displayed on the folding portion 410. The certain angle may be set differently depending on manufacturers or designs of mobile terminals or based on user input.

If the mobile terminal is provided with a tilt sensor (or gyro sensor), a displaying direction of information displayed on any of two displays is changed according to the posture of the mobile terminal detected by the tilt sensor. For example, if the posture of the mobile terminal which was a vertical direction is changed into a horizontal direction, the information displaying direction of the mobile terminal can be changed from the vertical direction into the horizontal direction. Also, the mobile terminal according to the present invention may be provided with a separate software key (or hardware key) for allowing a user to selectively change the information displaying direction.

Automatic Execution of Specific Function Based Upon Opening/Closing of the Mobile Terminal When a mobile terminal in which a locking function has been set to protect private information or prevent others from using the terminal, the controller 180 automatically displays a pop-up window to allow an input of a password, and releases the locked state of the mobile terminal when an accurate password is input. When the locking function is not yet released, if the mobile terminal is closed again, the controller 180 closes the pop-up window to obtain the password. Further, when the locking function has been set in order to simply prevent an unintended touch input or to protect a screen, when the mobile terminal is opened, the controller 180 may automatically release the locked state without requiring a password input, and automatically reset such locking function when the mobile terminal is closed.

Figure 56:
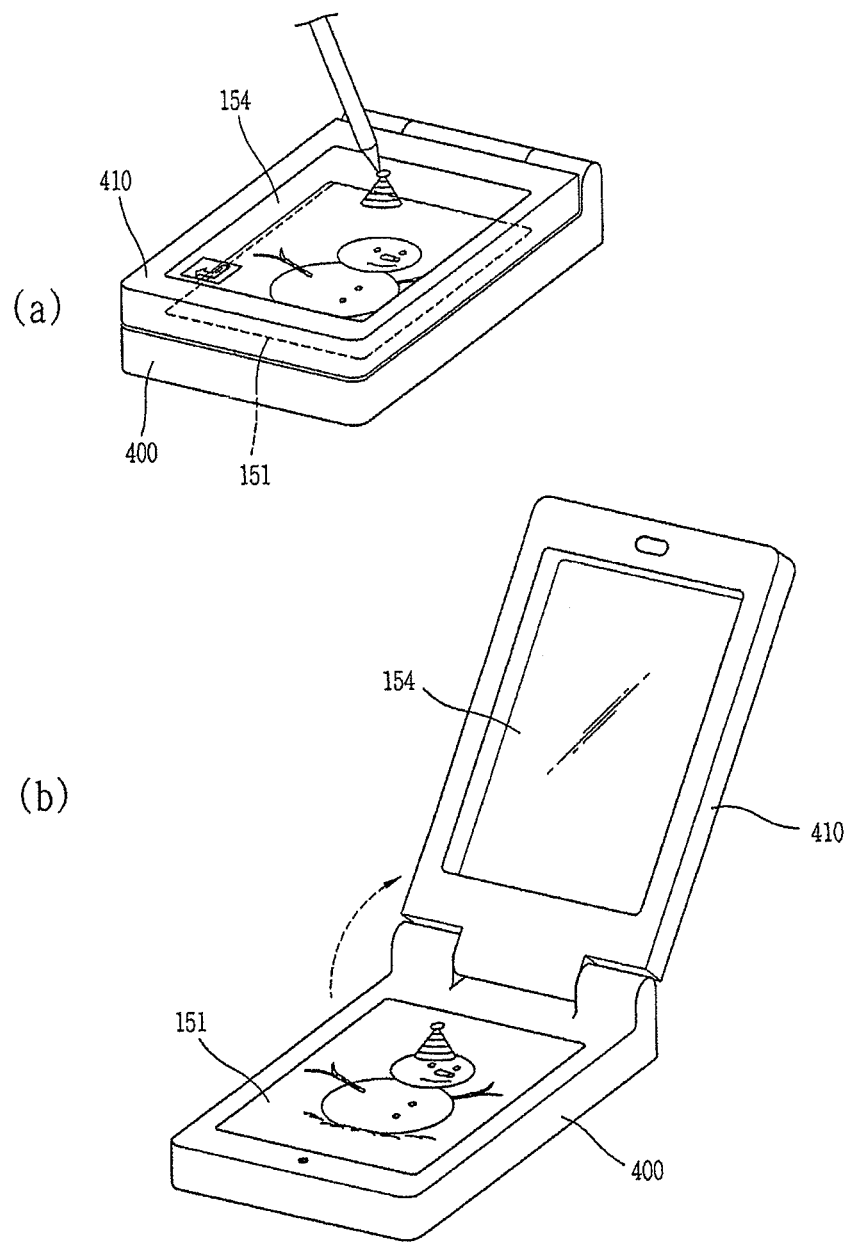
FIG. 56 is an overview showing an operation related to the movement of a displayed object executed in cooperation with an open/closing operation of a mobile terminal having a dual TOLED according to an embodiment of the present invention.

Next, FIG. 56 is an overview illustrating operations related to the movement of a displayed object executed in cooperation with the opening/closing of a mobile terminal having a dual transparent display according to an embodiment of the present invention, and more particularly, illustrating a function of automatically reflecting an image edited on the TOLED 154 onto an image displayed on the LCD 151.

As shown in FIG. 56(*a*), it is assumed that a folder-type mobile terminal is in a closed state and an image editor is being executed on the TOLED 154. Further, a user may refer to an image displayed on the LCD 151 which is transmitted through the TOLED 154, and draw or edit a specific image (e.g., cap or hat image) related to the image (e.g., snowman image) displayed on the LCD 151 through the image editor. Also, while the user draws or edits the image, such drawing operation may not directly affect the image displayed on the LCD 151.

During the drawing operation, if it is sensed the folding portion 410 is open, the controller 180 can apply the drawn image on the TOLED 154 onto the image displayed on the LCD 151. For example, the cap or hat image is displayed (attached) onto the head of the snowman image displayed on the LCD 151. When the folding portion 410 is closed, the controller 180 can move the image back to the TOLED 154 (i.e., release the image). As such, the user can repeat the application and release an image during the drawing operation by opening or closing the folding portion 410. The user can also determine if the drawn image is correctly disposed over the image on the LCD 151 and drawn as desired. The controller 180 may also keep the drawn image on the LCD 151 based on a preset condition, user input, tactile input, etc. That is, once the user is satisfied with the drawn image, the user can input a preset condition to instruct the controller 180 to maintain the drawn image on the LCD 151.

In addition to the above-mentioned functions, a mobile terminal according to embodiments of the present invention can output information associated with dually executed functions through a dual display (e.g., the TOLED 154 and the LCD 151). For example, the mobile terminal may output both navigation and a digital multimedia broadcast, perform both navigation and web browser functions, perform a dual electronic book (e-BOOK) function, display an original picture during picture edition, automatically display a list of devices for transmission, display a dual webpage, and the like.

Display Controlling Method for Saving Power

A mobile terminal according to an embodiment of the present invention may also control the TOLED 154 according to external environments, such as a peripheral illumination, peripheral color, time slot and the like. In more detail, the mobile terminal may adjust a background transparency of the TOLED 154 according to the peripheral illumination sensed by an illumination sensor. For example, when the peripheral illumination increases, the mobile terminal decreases the background transparency of the TOLED 154, whereas increasing the background transparency when the peripheral illumination decreases.

In addition, the mobile terminal my sense the peripheral color by a color sensor and an image sensor. Accordingly, if a color which is equal to the sensed peripheral color exists in an information object displayed on the TOLED 154, the mobile terminal may adjust a brightness and saturation of the corresponding color. The mobile terminal may also adjust the background transparency of the TOLED 154 according to time slots. For example, the mobile terminal may decrease the background transparency of the TOLED 154 in a daytime slot having a higher peripheral illumination, while increasing it in a nighttime slot having a lower peripheral illumination.

3. Embodiments for Method of Controlling a Mobile Terminal according to the Present Invention In the following description, embodiments for a controlling method implemented in the above-configured mobile terminal are explained with reference to the accompanying drawings. It is understood that the following embodiments are available independently or by being combined with each other. And, it is also understood that the following embodiments are available by being combined with the aforesaid user interface (UI) operations.

In the following embodiments, a display screen of the display module 151 will be indicated by a reference number 600.

First Embodiment

First of all, a method of controlling a mobile terminal according to a first embodiment of the present invention is explained with reference to FIGS. 57 to 60 as follows.

Figure 57:
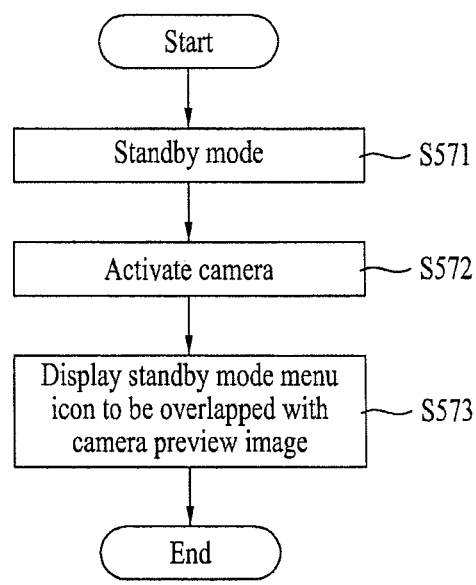
FIG. 57 is a flowchart for a method of controlling a mobile terminal according to a first embodiment of the present invention.
Figure 58:
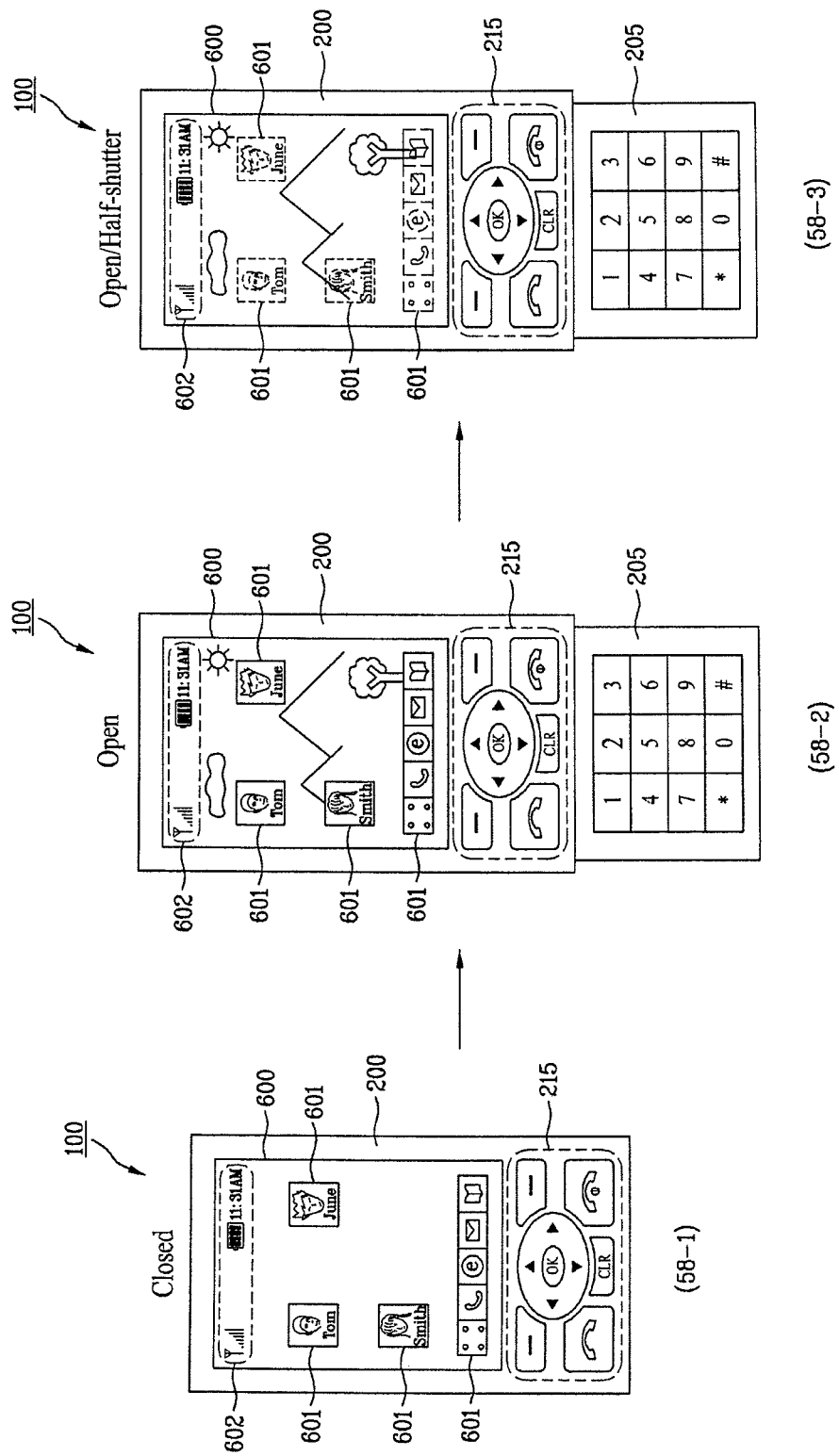
Figure 60:
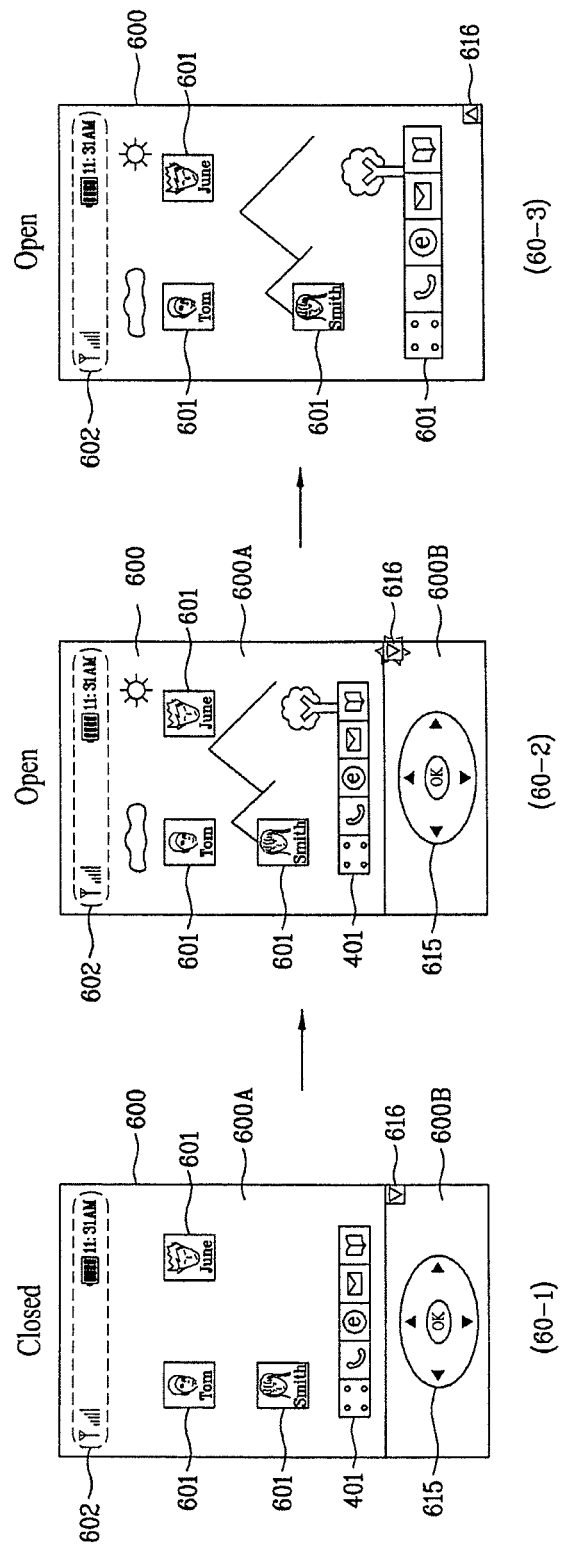

FIG. 57 is a flowchart for a method of controlling a mobile terminal according to a first embodiment of the present invention, and FIGS. 58 to 60 are diagrams of display screen configurations for implementing a mobile terminal according to a first embodiment of the present invention.

Referring to (58-1) of FIG. 58, the mobile terminal 100 is in a standby mode [S571]. The first and second bodies 200 and 205 of the mobile terminal 110 are closed to each other. And, at least one menu icons 601 in standby mode (hereinafter, "standby menu icons") are being displayed on the display screen 600 of the mobile terminal 100.

Subsequently, when the mobile terminal 100 is in the standby mode, the camera 121 becomes activated [S572]. The camera 121 can be activated in various ways. For instance, referring to (58-2) of FIG. 58, if the first and second bodies 200 and 205 are mutually open, the camera 121 can be activated. Alternatively, although the first and second bodies 200 and 205 are not mutually open, the camera can be activated if a specific manipulation (e.g., pushing a side key) of the user input unit 130 is performed.

If so, the activated camera 121 generates a preview image for taking pictures (still picture and/or moving picture). The controller 180 controls the generated preview image to be displayed on the display screen 600 and controls at least one of the standby mode menu icons 601 to be displayed on the preview image [S573]. In this case, the icons 601 may be non-transparent.

Subsequently, the shutter key (e.g., side key) for taking pictures is half pressed (or half shutter). If so, as shown in (58-3) of FIG. 58, the standby mode menu icons 601 on the preview image are displayed semi-transparently. In (58-3) of FIG. 58, exemplarily shown is that the standby mode menu icons 601 are displayed semi-transparent. By way of non-limiting the example, the icons 601 can be configured fully transparent.

If the icons 601 are semi-transparent before the shutter key is half pressed, the icons 601 can be configured to become further semi-transparent or fully transparent after the shutter key has been half pressed.

As the shutter key is half pressed (half shutter), when the icons 601 turn semi-transparent or fully transparent, they can be configured to become semi-transparent or fully transparent gradually (i.e., by fade-out) or instantaneously.

If the shutter key is half pressed, it is able to configure at least one of an auto-focus function and an auto-exposure function to be executed. If the shutter key is full pressed (full shutter), the preview image is captured.

Meanwhile, in (58-2) of FIG. 58, after the camera 121 has been activated, if the shutter key is not operated for a prescribed period of time, the camera 121 becomes deactivated and the preview image can be configured to disappear from the display screen 600.

Although not shown in the drawing, when the icons 601 becomes semi-transparent or full transparent, various indicators 602 on the display screen 600 can be configured to become semi-transparent or full transparent together with the icons 601.

In case that the display module 151 is configured to include a touch screen, the above embodiment can be modified into more various types. This will be explained with reference to FIG. 59 and FIG. 60. In the following description, a display screen of the touch screen 151 will be indicated by a reference number 600. In the following drawings, the body of the mobile terminal is omitted but the display screen is depicted only if necessary.

Referring to (59-1) of FIG. 59, the touch screen 600 can be divided into two areas, i.e., a first area 600A and a second area 600B. Optionally, the mobile terminal 100 includes two display units to be responsible for the first and second areas 600A and 00B, respectively.

In the first area 600A, the image of the touch screen 600 shown in (58-1) of FIG. 58 can be configured as it is. In the second area 600B, the user input unit 215 of the first body 200 shown in (58-1) of FIG. 58 can be implemented as a touch icon type or other type of user input. Therefore, in case that the touch screen 600 is configured as shown in FIG. 59, it is able to configure that the user input unit 215 of the first body is omitted. In FIG. 59, exemplarily shown is that a navigation key of the user input unit 215 of the first body 200 is configured in the second area 600B only.

An area adjust icon 616 can be provided to the touch screen 600 to make the second area 600B disappear from the touch screen 600 and to have the first area 600A occupy a whole area of the touch screen 600. In (59-1) of FIG. 59, the area adjust icon 616 is provided to the second area 600B. Yet, the area adjust icon 616 can be provided to the first area 600A.

The area adjust icon 616 is touched.

If so, referring to (59-2) of FIG. 59, the second area 600B disappears from the touch screen 600 and the first area 600A occupies the whole area of the touch screen 600.

Subsequently, when the mobile terminal 100 is in a standby mode, the camera 121 becomes activated. As mentioned in the foregoing description, when the first and second bodies 200 and 205 are mutually open, the camera 121 can be activated for example.

If so, referring to (59-3) of FIG. 59, a preview image of the camera 121 is displayed on the touch screen 600 and at least one of the standby mode menu icons is displayed by being overlapped with the preview image.

The area adjust icon 616 is touched.

If so, referring to (59-4) of FIG. 59, the touch screen 600 is divided into the first area 600A and the second area 600B. The preview image of the camera is displayed on the first area 600A and the navigation key 615 is displayed on the second area 600B.

Meanwhile, it is not necessary for the camera to be activated only if the second area 600B does not exist on the touch screen. This will be explained with reference to FIG. 60 as follows.

Referring to (60-1) of FIG. 60, the touch screen 600 is divided into two areas, i.e., into a first area 600A and a second area 600B. Details of the first and second areas 600A and 600B described with reference to FIG. 59 will be cited for clarity and convenience of this disclosure.

Subsequently, when the mobile terminal 100 is in a standby mode, the camera 121 becomes activated. As mentioned in the foregoing description, the camera 121 can be activated when the first and second bodies 200 and 205 enter a mutually open state.

If so, referring to (60-2) of FIG. 60, the preview image of the camera 121 is displayed on the first area 600A and at least one of the standby mode menu icons is displayed by being overlapped with the preview image.

The area adjust icon 616 is touched.

If so, referring to (60-2) of FIG. 60, the second area 600B disappears from the touch screen 600 and the first area 600A occupies a whole area of the touch screen 600.

The process for taking pictures in displaying the preview image of the camera is already explained with reference to FIG. 58. Therefore, details with reference to FIG. 59 and FIG. 60 are omitted for clarity and convenience of the description of this disclosure.

Second Embodiment

The above-described first embodiment is relatively and suitably applicable to such a mobile terminal including two bodies as a slide type terminal, a folder type terminal, a swing type terminal and the like. Further, the present invention is applicable to such a mobile terminal including a single body only as a bar type mobile terminal. Second embodiment of the present invention relates to an example suitable for the bar type terminal. Yet, it is understood that the second embodiment of the present invention is applicable to all kinds of mobile terminals as well as the bar type mobile terminal.

A method of controlling a mobile terminal according to a second embodiment of the present invention is explained with reference to FIG. 61 and FIG. 62 as follows. In the second embodiment of the present invention, it is not mandatory for the display module 151 to include the touch screen.

Figure 61:
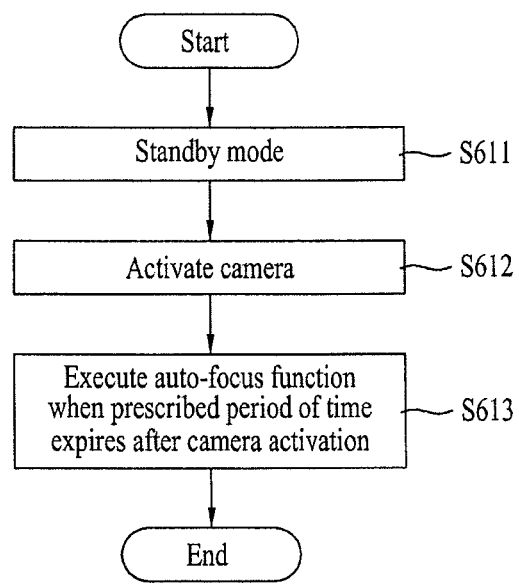
FIG. 61 is a flowchart for a method of controlling a mobile terminal according to a second embodiment of the present invention.

FIG. 61 is a flowchart for a method of controlling a mobile terminal according to a second embodiment of the present invention, and FIG. 62 is a diagram of display screen configuration for implementing a mobile terminal according to a second embodiment of the present invention.

Referring to (62-1) of FIG. 62, the mobile terminal is in a standby mode and a plurality of standby mode menu icons 601 are displayed on the display screen 600 [S611].

The shutter key is half pressed (half shutter). If so, the camera becomes activated [S612].

Referring to (62-2) of FIG. 62, a preview image of the camera is displayed on the display screen 600 and at least one of the standby mode menu icons 601 is displayed by being overlapped with the preview image.

After the shutter key has been half pressed, a prescribed period of time expires.

Referring to (62-3) of FIG. 62, as the standby mode menu icons 601 turns to be semi-transparent or full transparent, an auto-focus function is executed [S613].

If the shutter key is full pressed, the preview image of the camera is captured.

Generally, the shutter key is operable by two steps including a half shutter and a full shutter. If the shutter key is enhanced to be operable by three steps, the second embodiment of the present invention can be implemented more conveniently. This is explained in detail with reference to FIG. 63A and FIG. 63B as follows.

FIG. 63A and FIG. 63B are diagrams of a shutter key usable for a mobile terminal according to the present invention.

Referring to (63A-1) of FIG. 63A, the shutter key is not manipulated yet.

Referring to (63A-2) of FIG. 63A, the shutter key is pressed into a first depth. If so, the preview image of the camera in the aforesaid embodiment is displayed on the display screen 600 and at least one of the standby mode menu icons is displayed by being overlapped with the preview image.

Referring to (63A-3) of FIG. 63A, the shutter key is pressed into a second depth. If so, the standby mode menu icons turn to be semi-transparent or full transparent and an auto-focus function is executed. Namely, the operation of pressing the shutter key into the second depth corresponds to the half shutter of the first embodiment of the present invention.

Referring to (63A-4) of FIG. 63A, the shutter key is pressed into a third depth. If so, the preview image is captured. Namely, the operation of pressing the shutter key into the third depth corresponds to the full shutter of the first embodiment of the present invention.

In FIG. 63A, the 3-step shutter is implemented according to the shutter depths. Yet, it is unnecessary for the 3-step shutter to be implemented according to the shutter depth only. This is explained with reference to FIG. 63B as follows.

Referring to (63B-1) of FIG. 63B, the shutter key is not manipulated yet. Unlike the shutter key shown in FIG. 63A, the shutter key of FIG. 63B can be configured to include a touch sensor provided to its surface.

Referring to (63B-2) of FIG. 63B, the shutter key is simply touched instead of being pressed. As the corresponding touch is recognized, the preview image of the camera in the foresaid embodiment is displayed on the display screen 600 and one of the standby mode menu icons is displayed by being overlapped with the preview image.

Referring to (63B-3) of FIG. 63B, the shutter key is pressed into a first depth. If so, the standby mode menu icons turn to be semi-transparent or fully transparent and an auto-focus function is executed. Namely, the operation of pressing the shutter key into the first depth corresponds to the half shutter of the first embodiment of the present invention.

Referring to (63B-4) of FIG. 63B, the shutter key is pressed into a second depth. If so, the preview image is captured. Namely, the operation of pressing the shutter key into the second depth corresponds to the full shutter of the first embodiment of the present invention.

Third Embodiment

If the display module includes a transparent display module, the present invention can be implemented for user's enhanced convenience. This is explained as a third embodiment of the present invention.

In the following description, a method of controlling a mobile terminal according to a third embodiment of the present invention is explained with reference to FIG. 64 and FIG. 65. In the third embodiment, assume that the display module 151 includes a touch screen. Yet, according to the second embodiment of the present invention, it is not mandatory for the display module 151 to include the touch screen.

Figure 64:
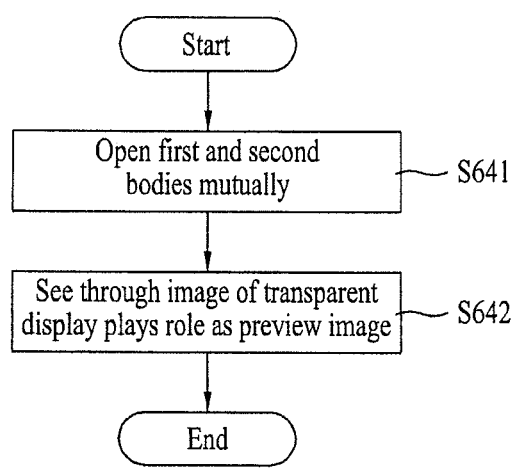
FIG. 64 is a flowchart for a method of controlling a mobile terminal according to a third embodiment of the present invention.
Figure 65:
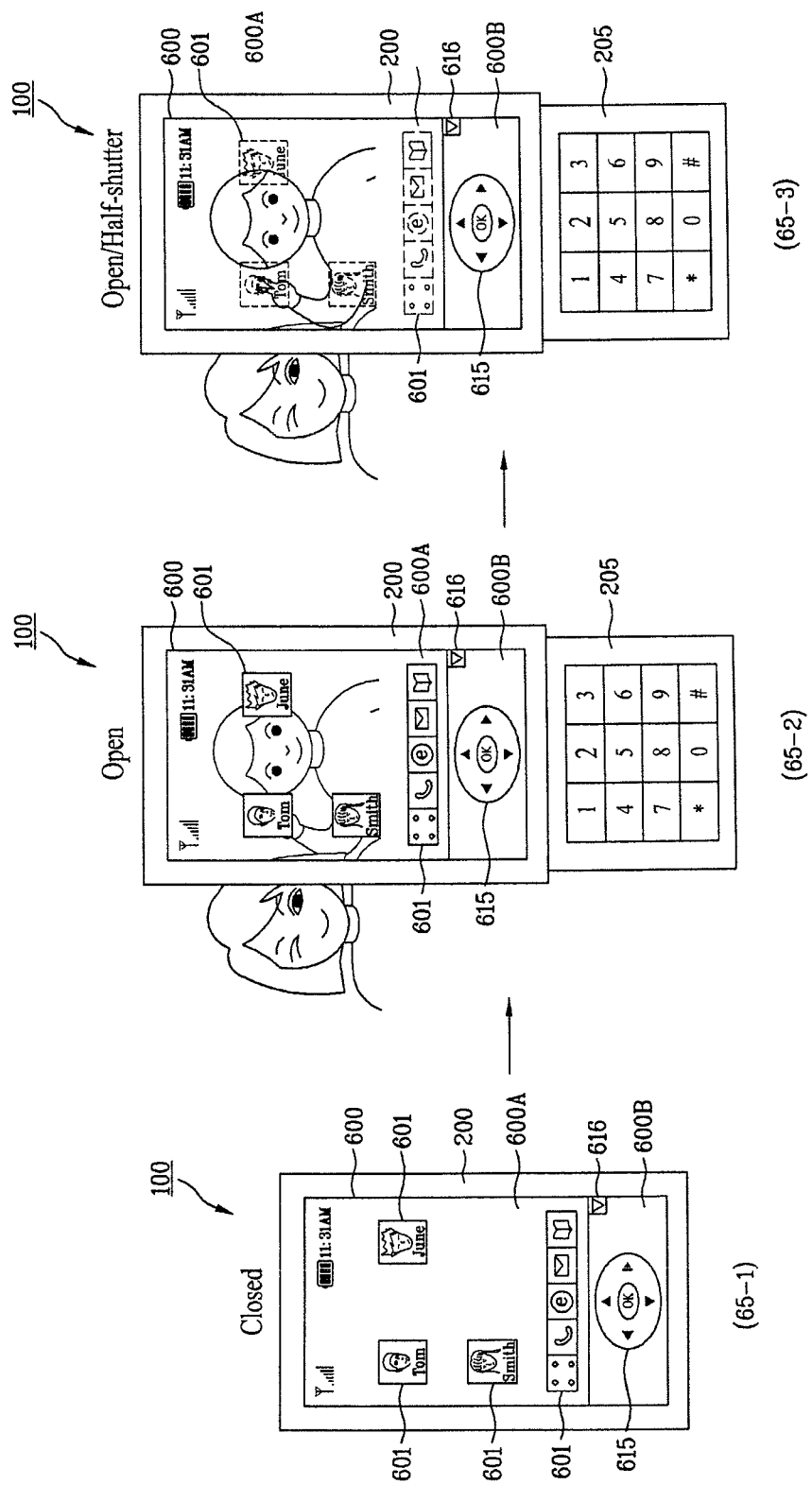
FIG. 65 is a diagram of display screen configuration for implementing a mobile terminal according to a third embodiment of the present invention.

FIG. 64 is a flowchart for a method of controlling a mobile terminal according to a third embodiment of the present invention, and FIG. 65 is a diagram of display screen configuration for implementing a mobile terminal according to a third embodiment of the present invention.

Referring to (65-1) of FIG. 65, the mobile terminal 100 is in a standby mode. And, the first and second bodies 200 and 205 of the mobile terminal 100 are mutually closed.

The touch screen 600 is divided into a first area 600A and a second area 600B. An image of the standby mode (i.e., standby image) is displayed on the first area 600A and a navigation key 615 is displayed on the second area 600B, for example. And, at least one or more standby mode menu icons 601 are displayed on the first area 600A.

Both of the first and second areas 600A and 600B can include a single transparent display module.

Alternatively, each of the first and second areas 600A and 600B can include an independent display module. In this case, the first area 600A can include a single transparent display module. And, the second area 600B can include a single transparent or non-transparent (normal) display module.

Referring to (65-2) of FIG. 65, the first and second bodies 200 and 205 become open mutually [S641]. In this case, both opposite sides (i.e., front side and backside) of the first area 600A of the touch screen can be arranged to be externally exposed. Hence, a background scene of the mobile terminal can be seen through the first area 600A. In the following description, for clarity and convenience of the following description, an image seen through the first area 600A will be named 'see through image'. And, at least one of the standby mode menu icons keeps being displayed by being overlapped with the see through image.

The second area 600B of the touch screen can be arranged to have only one face exposed externally even if the first and second bodies 200 and 205 become open mutually.

As mentioned in the foregoing description with reference to FIG. 3, the camera is provided to a backside of the mobile terminal 100. Position and photographic angle of the camera can be set up in a manner that a range of the see through image, which is viewed via the mobile terminal held in front conveniently by a user to take pictures, matches a range of a camera preview image actually captured by the camera. If so, the see through image can play a role as the camera preview image [S642].

In this case, after the first and second bodies 200 and 205 have been mutually opened, even if the camera is activated, the camera preview image captured by the camera needs not to be displayed on the touch screen. Therefore, power consumption can be saved correspondingly.

Referring to (65-3) of FIG. 65, if the shutter key is half pressed (half shutter), the standby mode menu icons turn semi-transparent or full transparent. And, the camera performs an auto-focus function for the preview image by the see through image. If the shutter key is full pressed (full shutter), the preview image by the see through image is captured or taken.

Fourth Embodiment

In the above-explained third embodiment of the present invention, it is possible that it could be difficult for the range of the see through image to match that of the camera preview image. This is because each terminal user tends to conveniently hold the mobile terminal in different posture to take a picture in front. A solution for solving that problem is described in the following description as a fourth embodiment of the present invention.

A method of controlling a mobile terminal according to a fourth embodiment of the present invention is explained with reference to FIG. 66 and FIG. 67. In the fourth embodiment, assume that the display module 151 includes a touch screen.

Figure 66:
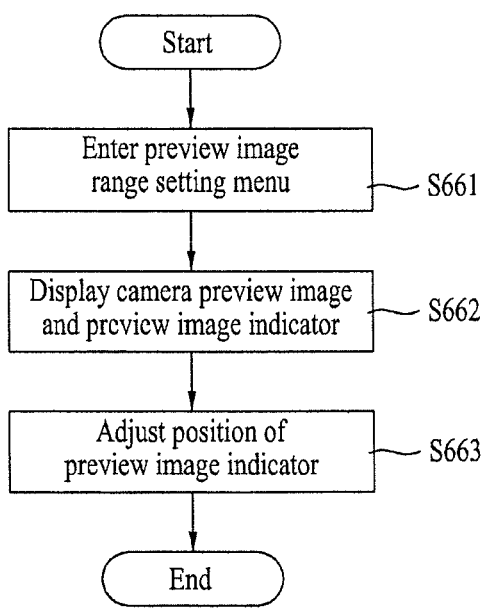
FIG. 66 is a flowchart for a method of controlling a mobile terminal according to a fourth embodiment of the present invention.
Figure 67:
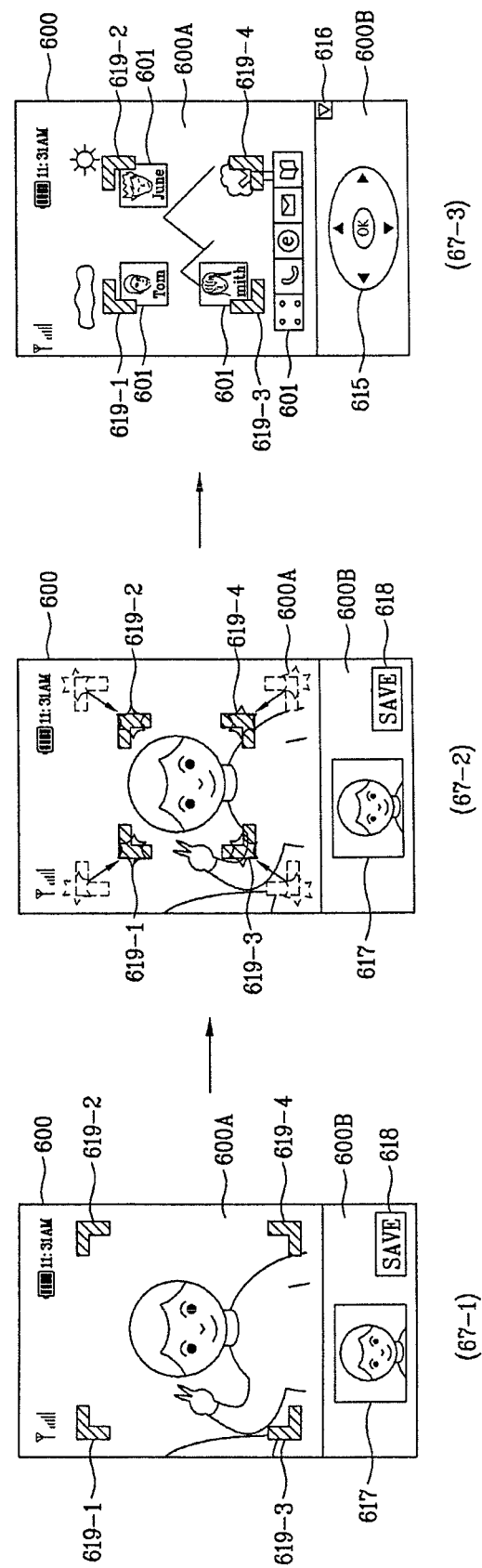
FIG. 67 is a diagram of display screen configuration for implementing a mobile terminal according to a fourth embodiment of the present invention.

FIG. 66 is a flowchart for a method of controlling a mobile terminal according to a fourth embodiment of the present invention, and FIG. 67 is a diagram of display screen configuration for implementing a mobile terminal according to a fourth embodiment of the present invention.

First of all, the mobile terminal 100 enters a preview image range setting menu through menu manipulation [S661]. The process for entering a specific menu through menu manipulation in a mobile terminal is generally apparent to those skilled in the art without separate explanation. For clarity and convenience of this disclosure, details for the specific menu entering process will be omitted in the following description.

Referring to (67-1) of FIG. 67, a camera preview image 617 taken by the camera is displayed on a second area 600B. And, a plurality of preview image indicators 619-1 to 619-4 on a see-through image are displayed on a first area 600A [S662].

FIG. 67 exemplarily shows that four preview image indicators responsible for four corner of a preview image are displayed. By non-limiting examples of the present embodiment, two preview image indicators responsible for left top and right bottom corners (or right top and left bottom corners) among four corners of a preview image can be configured to be displayed. Besides, it is able to configure that a rectangular indicator corresponding to the preview image is displayed.

Referring to (67-2) of FIG. 67, the preview image indicators 619-1 to 619-4 can be arranged around the see-through image in the range corresponding to the camera view image 617 while a terminal user refers to the camera view image 617 of the second area 600B [S663]. In this case, the preview image indicators 619-1 to 619-4 can be provided to a prescribed position by touch-and-drag for example. If a save icon 618 in the second area 600B is selected, the position of the preview image indicators 619-1 to 619-4 is saved. Hence, the setting is completed.

After completion of the setting, referring to (67-3) of FIG. 67, if the first and second bodies become mutually open, the preview image indicators 619-1 to 619-4 are displayed on the see-through image on the first area 600A. It is able to configure the preview image indicators 619-1 to 619-4 to keep being displayed even if the shutter is half pressed (half shutter). Therefore, the terminal user is facilitated to understand the range of a preview image, which will be taken via the camera, on the see-through image.

In the above description, although the preview image indicator is displayed rectangular, it is apparent to those skilled in the art that a range of the preview image indicator can be adjusted by touching and dragging each vertex or side.

Meanwhile, in the course of the preview image range setting, it s not mandatory for the camera preview image 617 to be displayed on the second area 600B. For instance, when the camera view image 617 and the see-through image are alternately displayed on the first area 600B, it is able to configure a position of the preview image indicator to be determined by comparing the camera preview image and the see-through image to each other.

Fifth Embodiment

Although the range of the preview image is displayed on the see-through image like the fourth embodiment of the present invention, if a terminal user changes a viewing angle aiming at a first area, the camera preview image may not match a preview image on the see-through image marked by a preview image indicator on the see-through image. In particular, a method of enabling the terminal user's viewing angle to be fixed in aiming at the first area is necessary. This method is described as a fifth embodiment of the present invention.

A method of controlling a mobile terminal according to a fifth embodiment of the present invention is explained with reference to FIG. 68 and FIG. 69 as follows.

Figure 68:
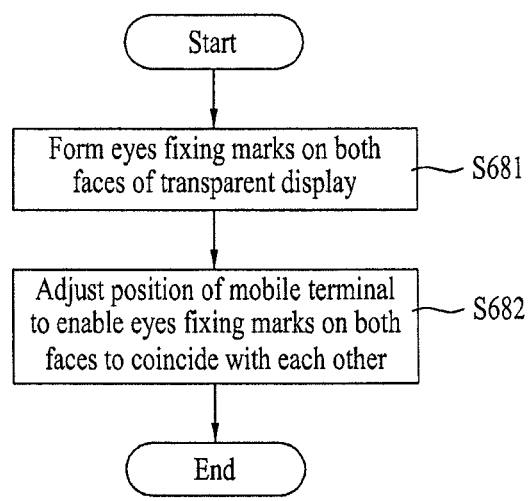
FIG. 68 is a flowchart for a method of controlling a mobile terminal according to a fifth embodiment of the present invention.
Figure 69:
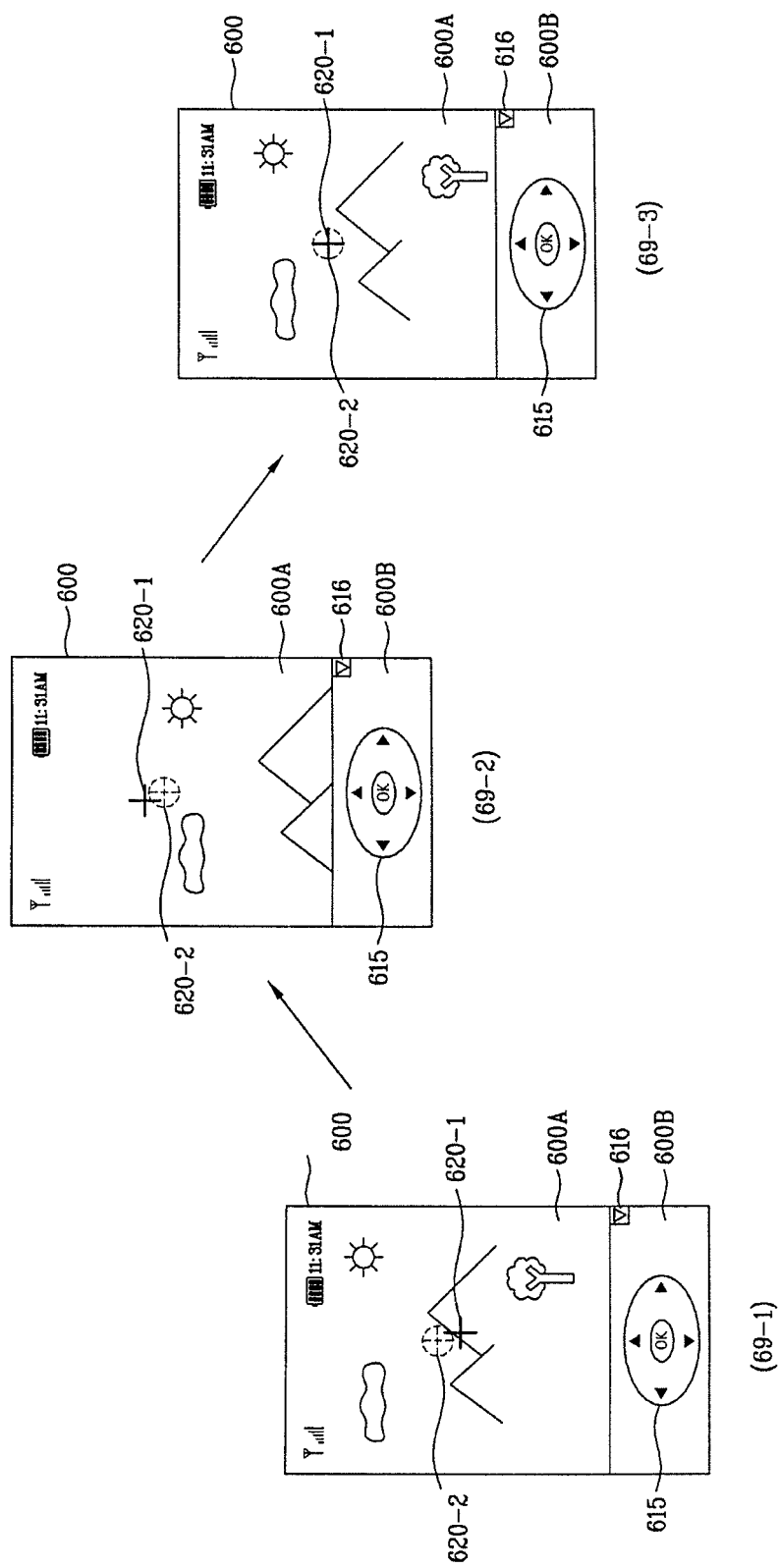
FIG. 69 is a diagram of display screen configuration for implementing a mobile terminal according to a fifth embodiment of the present invention.

FIG. 68 is a flowchart for a method of controlling a mobile terminal according to a fifth embodiment of the present invention, and FIG. 69 is a diagram of display screen configuration for implementing a mobile terminal according to a fifth embodiment of the present invention.

Referring to (69-1) of FIG. 69, first and second eyes-fixing indicators 620-1 and 620-2 are formed on both faces of the transparent display corresponding to a first area 600A [S681]. The first eyes-fixing indicator 620-1 is provided to a front side of the transparent display and the second eyes-fixing indicator 620-2 is provided to a backside of the transparent display.

The first and second eyes-fixing indicators 620-1 and 620-2 can be physically formed on both faces of the transparent display. Alternatively, one of the first and second eyes-fixing indicators 620-1 and 620-2 is physically formed on one of both faces and the other is formed as a graphic on the other face.

In (69-1) of FIG. 69, the first eyes-fixing indicator 620-1 lies below the second eyes-fixing indicator 620-2. This indicates that the display screen 600 (specifically, first area 600A) is positioned below the front eyes of terminal user.

If so, the terminal user adjusts the display screen 600 to be aligned with the front eyes of the terminal user in a manner of lifting a position of the mobile terminal 100 upward.

In (69-2) of FIG. 69, the first eyes-fixing indicator 620-1 lies above the second eyes-fixing indicator 620-2. This indicates that the display screen 600 (specifically, first area 600A) is positioned above the front eyes of terminal user.

If so, the terminal user adjusts the display screen 600 to be aligned with the front eyes of the terminal user in a manner of lowering a position of the mobile terminal 100 downward.

In (69-3) of FIG. 69, the first eyes-fixing indicator 620-1 coincides with the second eyes-fixing indicator 620-2. This indicates that the display screen 600 (specifically, first area 600A) is aligned with the front eyes of terminal user.

Thus, the terminal user is able to adjust the position of the mobile terminal to fix the viewing angle aiming at the first area [S682].

Sixth Embodiment

The former embodiment of the present invention relates to the method of replacing the camera preview image by the see-through image of the first area. Yet, if necessary, the camera preview image needs to be displayed on the first area as it is. This is explained as a sixth embodiment of the present invention.

A method of controlling a mobile terminal according to a sixth embodiment of the present invention is explained with reference to FIG. 70 and FIG. 71 as follows.

Figure 70:
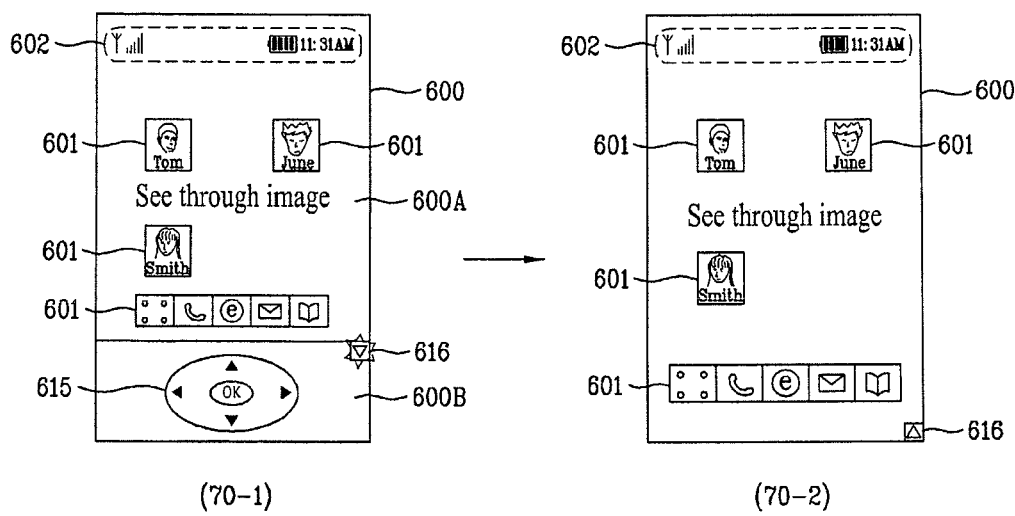
FIG. 70 and FIG. 71 are diagrams of display screen configurations for implementing a mobile terminal according to a sixth embodiment of the present invention.
Figure 71:
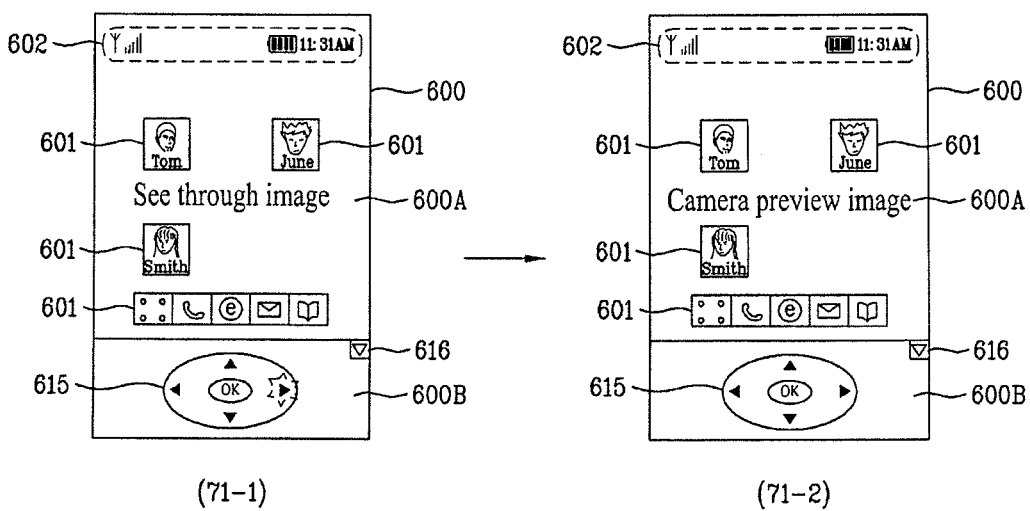

FIG. 70 and FIG. 71 are diagrams of display screen configurations for implementing a mobile terminal according to a sixth embodiment of the present invention.

Referring to (70-1) of FIG. 70, a see-through image is displayed on the first area 600A of the display screen 600, and the navigation key 615 and the area adjust icon 616 are displayed on the second area 600B of the display screen 600.

The area adjust icon 616 is selected.

If so, referring to (70-2) of FIG. 70, the first area 600A occupies the display screen 600 entirely as soon as the second area 600B disappears. And, a camera preview image captured by the camera is displayed all over the display screen 600.

Therefore, a terminal user is facilitated to view a preview image with a bigger screen.

In particular, when the terminal user views the preview image on the whole display screen 600, the camera preview image needs to be displayed on the display screen 600 as well.

Meanwhile, when the camera is zoomed in or out, the preview image of the see-through image fails to match the camera preview image. This is explained with reference to FIG. 71 as follows.

Referring to (71-1) of FIG. 71, a see-through image is displayed on the first area 600A of the display screen 600 and the navigation key 615 and the area adjust icon 616 are displayed on the second area 600B of the display screen 600.

In this case, the zoom adjustment of the camera is performed. Command for the zoom adjustment can be given in various ways. In (71-1) of FIG. 71, exemplarily shown is that the zoom adjustment is enabled using the navigation key 615.

If so, referring to (71-2) of FIG. 71, the camera preview image is displayed on the first area 600A.

Accordingly, the present invention provides the following effects or advantages.

First of all, the present invention enables a picture to be taken more quickly even if a mobile terminal is in a standby mode.

Secondly, a see-through image seen through a transparent display can become a preview image of photography. Therefore, although a preview image obtained by a camera needs not to be displayed on a display unit, whereby corresponding power consumption can be saved.

It will be apparent to those skilled in the art that the present invention can be specified into other forms without departing from the spirit or scope of the inventions.

For instance, it is understood that a touch-and-drag action can be replaced by a flick action.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example. And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
    a camera;
    a display;
    a user input having a camera shutter input; and
    a controller configured to when the mobile terminal is in a standby mode, display at least one icon,
    when the camera becomes activated, keep displaying the at least one icon by overlapping the at least one icon with a preview image obtained from the camera, and
    remove the at least one icon when the camera shutter input is half pressed, wherein the standby mode is a mode where the camera has not been activated, and
    wherein the at least one icon is non-transparent or semi-transparent.

2. The terminal of claim 1, wherein the at least one icon is non-transparent, and the controller is configured to remove the at least one icon by causing the at least one icon to become semi-transparent when the camera shutter input is half pressed.

3. The terminal of claim 1, wherein the controller is configured to cause the at least one icon to fade-out or to disappear instantaneously.

4. The terminal of claim 1, wherein the controller is further configured to execute an auto-focus function when the camera shutter input is half pressed.

5. The terminal of claim 1, comprising;
    a first body; and
    a second body,
    wherein the first and second bodies are configured to be opened and closed by sliding or swinging, and wherein the controller is configured to activate the camera when the first and second bodies shift to an open state from a closed state.

6. The terminal of claim 5, wherein the controller is configured to display a preset standby image instead of the preview image when the camera shutter input is not manipulated for a predetermined period of time after the first and second bodies shift to the open state from the closed state.

7. The terminal of claim 1, wherein the controller is configured to remove the at least one icon when a prescribed period of time expires after the camera shutter has been half pressed.

8. The terminal of claim 1, wherein the camera shutter input is configured to be manipulated in accordance with three steps.

9. The terminal of claim 8, wherein the control unit is further configured to perform at least one of the following functions overlap the at least one icons with the preview image when the camera shutter is manipulated as a first of the three steps, remove the at least one of the icon to and execute an auto-focus function when the camera shutter is manipulated as a second of the three steps, and cause a photographic function to be executed when the camera shutter is manipulated as a third of the three steps.

10. The terminal of claim 1, wherein the controller is configured to:
    display the at least one icon at a specific position on the display when the mobile terminal is in the standby mode;
    when the camera becomes activated, keep displaying the at least one icon substantially at the same specific position on the display by overlapping the at least one icon with a preview image obtained from the camera.

11. The terminal of claim 1, wherein the controller is configured to:
    display the at least one icon and at least one indicator when the mobile terminal is in the standby mode;
    when the camera becomes activated, keep displaying the at least one icon and the at least one indicator by overlapping the at least one icon and the at least one indicator with a preview image obtained from the camera.

12. The terminal of claim 1, wherein the controller is further configured to:
    simultaneously render the at least one icon to become semi-transparent or fully transparent and execute at least one of an auto-focus function and an auto-exposure function.

13. A method of controlling a mobile terminal having a camera, a user input having a camera shutter input, and a camera, the method comprising:
    displaying at least one icon, when the mobile terminal is in a standby mode, and
    keep displaying the at least one icon, when the camera is activated, by overlapping the at least one standby icon with a preview image obtained from the camera; and
    removing the at least one icon when the camera shutter input is half pressed,
    wherein the standby mode is a mode where the camera has not been activated, and
    wherein the at least one icon is non-transparent or semi-transparent.

14. The method of claim 13, wherein the at least one icon is non-transparent, and
    wherein the step of removing the at least one icon comprises changing the at least one icon to become semi-transparent. when the camera shutter input is half pressed.

15. The method of claim 13, the step of removing comprising one of:

fading out the at least one icon; and removing the at least one icon instantaneously.

16. The method of claim 13, further comprising: executing an auto-focus function when the camera shutter input is half pressed.

17. The method of claim 13, wherein the mobile terminal includes a first and second bodies configured to be opened and closed by sliding or swinging, the method further comprising:
   activating the camera when the first and second bodies shift to an open state from a closed state.

18. The method of claim 17, further comprising:
   displaying a preset standby image instead of the preview image when the camera shutter input is not manipulated for a predetermined period of time after the first and second bodies shift to the open state from the closed state.

19. The method of claim 13, the step of removing the at least one icon comprising:

removing the at least one icon when a prescribed period of time expires after the camera shutter has been half pressed.

20. The method of claim 13, further comprising:
manipulating the camera shutter input in accordance with three steps.

21. The method of claim 20, further comprising:
overlapping the at least one icons with the preview image when the camera shutter is manipulated as a first of the three steps, removing the at least one of the icon to and execute an auto-focus function when the camera shutter is manipulated as a second of the three steps, and executing a photographic function when the camera shutter is manipulated as a third of the three steps.

* * * * *